United States Patent
Yamamoto et al.

(10) Patent No.: US 10,473,820 B2
(45) Date of Patent: Nov. 12, 2019

(54) COMPOUND CONTAINING MESOGENIC GROUP, AND MIXTURE, COMPOSITION, AND OPTICALLY ANISOTROPIC BODY USING SAID COMPOUND

(71) Applicant: DIC Corporation, Tokyo (JP)

(72) Inventors: Mika Yamamoto, Kita-adachi-gun (JP); Yasuhiro Kuwana, Kita-adachi-gun (JP); Hidetoshi Nakata, Kita-adachi-gun (JP); Koichi Endou, Kita-adachi-gun (JP); Kunihiko Kotani, Kita-adachi-gun (JP); Hiroshi Hasebe, Kita-adachi-gun (JP); Yoshiyuki Ono, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/107,422

(22) PCT Filed: Dec. 18, 2014

(86) PCT No.: PCT/JP2014/083584
§ 371 (c)(1),
(2) Date: Jun. 22, 2016

(87) PCT Pub. No.: WO2015/098702
PCT Pub. Date: Jul. 2, 2015

(65) Prior Publication Data
US 2017/0003418 A1 Jan. 5, 2017

(30) Foreign Application Priority Data
Dec. 25, 2013 (JP) .................................. 2013-266991

(51) Int. Cl.
| | | |
|---|---|---|
| *G02B 5/30* | (2006.01) | |
| *C09K 19/38* | (2006.01) | |
| *G02F 1/13363* | (2006.01) | |
| *G02B 1/08* | (2006.01) | |
| *G02B 1/14* | (2015.01) | |
| *C08F 22/20* | (2006.01) | |
| *C08F 22/24* | (2006.01) | |
| *C09D 135/02* | (2006.01) | |

(52) U.S. Cl.
CPC ............... *G02B 1/08* (2013.01); *C08F 22/20* (2013.01); *C08F 22/24* (2013.01); *C09D 135/02* (2013.01); *G02B 1/14* (2015.01); *G02B 5/305* (2013.01); *G02B 5/3083* (2013.01); *C08F 2800/20* (2013.01); *G02F 2001/133633* (2013.01)

(58) Field of Classification Search
CPC .......... G02B 1/08; G02B 5/3083; G02B 1/14; C08F 22/20; C08F 22/24; C08F 2800/20; C09D 135/02
See application file for complete search history.

(56) References Cited

U.S. PATENT DOCUMENTS

| | | | | |
|---|---|---|---|---|
| 5,331,049 A | * | 7/1994 | Audett | .................. C09J 143/04 156/321 |
| 7,754,912 B2 | | 7/2010 | Irisawa et al. | |
| 8,268,046 B2 | * | 9/2012 | Watanabe | .............. B01D 53/38 95/116 |
| 2004/0029361 A1 | * | 2/2004 | Heerman | ................. H01L 23/13 438/460 |

FOREIGN PATENT DOCUMENTS

| | | | | |
|---|---|---|---|---|
| EP | 0863127 A2 | | 9/1998 | |
| EP | 2754650 A1 | | 7/2014 | |
| JP | 64-87685 | * | 3/1989 | ............. C09K 19/00 |
| JP | 64-87685 A | | 3/1989 | |
| JP | 6-212156 A | | 8/1994 | |
| JP | 9-291281 A | | 11/1997 | |
| JP | 2002-350641 A | | 12/2002 | |
| JP | 2006-265453 | * | 10/2006 | ............. C09K 19/42 |
| JP | 2007-186430 A | | 7/2007 | |
| JP | 2012-006996 A | | 1/2012 | |
| JP | 2012-168295 A | | 9/2012 | |
| JP | WO2013021826 | * | 2/2013 | ............... G02B 5/30 |
| JP | 2013-166879 A | | 8/2013 | |
| WO | 2013/021826 A1 | | 2/2013 | |
| WO | 2013/039053 A1 | | 3/2013 | |

OTHER PUBLICATIONS

International Search Report dated Mar. 24, 2015, issued in counterpart International Application No. PCT/JP2014/083584 (2 pages).

* cited by examiner

*Primary Examiner* — Bijan Ahvazi
(74) *Attorney, Agent, or Firm* — Westerman, Hattori, Daniels & Adrian, LLP

(57) ABSTRACT

There is provided a compound containing a mesogenic group, which includes a silicon compound at a low concentration, a polymerizable compound containing the mesogenic group, a mixture and a composition using these compounds, a polymerizable mixture having the polymerizable compound, and a polymer, an optically anisotropic body, and a phase difference film using the polymerizable composition. It is possible to obtain the optically anisotropic body and the phase difference film having satisfactory scratch resistance and adhesion, by using the polymerizable composition composed of the compound containing a mesogenic group, which includes a silicon compound at a low concentration.

11 Claims, No Drawings

100
COMPOUND CONTAINING MESOGENIC GROUP, AND MIXTURE, COMPOSITION, AND OPTICALLY ANISOTROPIC BODY USING SAID COMPOUND

TECHNICAL FIELD

The present invention relates to a compound containing a mesogenic group, which includes a silicon compound at a low concentration, a polymerizable compound containing the mesogenic group, a mixture and a composition using these compounds, a polymerizable mixture having the polymerizable compound, and a polymer, an optically anisotropic body, and a phase difference film using the polymerizable composition.

BACKGROUND ART

A polymerizable liquid crystal composition is useful as a constituent member of an optically anisotropic body, and the optically anisotropic body has been applied to various liquid crystal displays, for example, as a polarizing film or a phase difference film. The polarizing film or the phase difference film is obtained by heating a polymerizable liquid crystal composition in a state where the polymerizable liquid crystal composition is applied onto a base material and aligned by an alignment film or the like, or irradiating the polymerizable liquid crystal composition with active energy rays to cure the polymerizable liquid crystal composition. In addition, the obtained optically anisotropic body is required to have satisfactory scratch resistance. As a method for obtaining an optically anisotropic body to which scratch resistance is imparted, a method for coating a phase difference film with a hard coat layer has been suggested (PTL 1). However, in the method for coating a phase difference film with a hard coat layer, there is a problem in that use of the method leads to an increase in film thickness and cost, or insufficient adhesion between the phase difference film and the hard coat layer. Also, it has been reported that if the polymerizable liquid crystal composition containing a polyfunctional polymerizable compound is used, an optically anisotropic body having excellent scratch resistance is obtained. However, hardening shrinkage is considerable depending on the type of the polymerizable compound to be used, and adhesion between a base material layer and an optically anisotropic body layer or adhesion between the optically anisotropic body layer and an upper layer thereof is insufficient (PTL 2).

As from the above, in the case where the polymerizable liquid crystal composition is made into an optically anisotropic body, a development of the polymerizable liquid crystal composition being excellent in scratch resistance and adhesion with other layers has been demanded.

CITATION LIST

Patent Literature

[PTL 1] JP-A-2012-168295
[PTL 2] JP-A-2002-350641

SUMMARY OF INVENTION

Technical Problem

An object of the present invention is to provide a polymerizable composition having satisfactory scratch resistance and adhesion, in the case where the polymerizable composition is applied onto a base material to be made into an optically anisotropic body; and an optically anisotropic body using the polymerizable composition.

Solution to Problem

As a result of focusing on a compound containing a mesogenic group which constitutes a polymerizable composition and a mixture having polymerization performance by a thorough study, the present invention has found that the content of a silicon compound in the mixture including the compound containing a mesogenic group, which is included in the polymerizable composition, affects scratch resistance and adhesion in the case where the polymerizable composition is applied onto a base material to make an optically anisotropic body.

Specifically, the compound containing a mesogenic group is obtained by going through many synthesis steps, and every time the synthesis reaction of each step is finished, purification is performed by silica gel column chromatography, alumina column chromatography, or an activated carbon treatment. Therefore, in the case where a purification method using silica gel column chromatography is used, in a filtration step after the purification, a silicon compound derived from a silica gel cannot be removed completely and the silicon compound may remain in the raw material compound. However, it has been found that an optically anisotropic body prepared by the polymerizable composition using the raw material compound having the remaining silicon compound has satisfactory scratch resistance and adhesion, rather than the optically anisotropic body prepared by the polymerizable composition using a raw material compound not having the remaining silicon compound, which is prepared by using a compound other than the silicon compound such as a silica gel as an adsorbent; and an optically anisotropic body prepared by the polymerizable composition having the residual amount of the silicon compound exceeding a particular ratio has decreased alignment performance.

Namely, the present invention is to provide a compound containing a mesogenic group, which includes a silicon compound at a low concentration, and a mixture, a composition, and a polymerizable composition using the compound; and an optically anisotropic body and a phase difference film having satisfactory scratch resistance and adhesion, which are prepared by using the polymerizable composition.

Advantageous Effects of Invention

It is possible to obtain an optically anisotropic body and a phase difference film each having satisfactory scratch resistance and adhesion, by using the polymerizable composition of the present invention including a compound containing a mesogenic group, which includes a silicon compound at a low concentration.

DESCRIPTION OF EMBODIMENTS

Hereinafter, the most preferable embodiment of the present invention will be described.

With respect to the "compound containing a mesogenic group, which includes a silicon compound at a low concentration" in the present invention, it is understood in the related art that the "compound containing a mesogenic group" does not contain so-called impurities such as a silicon compound, because the compound is often prepared by going through a filtration step so far; however, the compound containing impurities is actually prescribed as a compound (simple substance), and therefore, with respect to the compound which contains a silicon compound incorporated in a purification step, the compound is not referred to as a mixture containing a silicon compound but simply referred to as a compound containing a mesogenic group.

In addition, in the following, a polymerizable composition may be referred to as a polymerizable liquid crystal composition, but the "liquid crystal" means that the composition exhibits crystallinity when polymerization is performed by irradiating a polymerizable liquid crystal composition with light such as an ultraviolet ray or heating after the polymerizable liquid crystal composition is applied onto a base material and dried.

The compound containing a mesogenic group of the present invention is characterized in that the compound includes a silicon compound at a low concentration. The content of the silicon compound incorporated in the compound containing a mesogenic group can be measured by an X-ray fluorescence analyzer and an ICP emission analyzer. The content of the incorporated silicon compound, in the case where two or more types of the compounds containing a mesogenic group are only included to constitute a mixture, the content of the silicon is preferably adjusted to 0.7 ppm % by weight to 1,000 ppm % by weight, more preferably 0.8 ppm % by weight to 500 ppm % by weight, still more preferably 1 ppm % by weight to 200 ppm % by weight, and particularly preferably 1 ppm % by weight to 50 ppm % by weight with respect to the total amount of the mixture.

The content of the incorporated silicon compound, in the case where two or more types of the compounds containing a mesogenic group are included in the composition, the content of the silicon is preferably adjusted to 0.7 ppm % by weight to 1,000 ppm % by weight, more preferably 0.8 ppm % by weight to 500 ppm % by weight, still more preferably 1 ppm % by weight to 200 ppm % by weight, and particularly preferably 1 ppm % by weight to 50 ppm % by weight with respect to the total amount of the composition.

Even with respect to a each compound containing a mesogenic group as a simple substance, the content of the silicon is preferably adjusted to 0.7 ppm % by weight to 1,000 ppm % by weight, more preferably 1 ppm % by weight to 300 ppm % by weight, still more preferably 1 ppm % by weight to 500 ppm % by weight, and particularly preferably 1 ppm % by weight to 200 ppm % by weight.

As the compound containing a mesogenic group, any compound can be used without any particular limitation as long as it is recognized in the present technical field that plural compounds containing a mesogenic group form a mixture which exhibits crystallinity, namely, the compound may be a compound having one or more polymerizable functional groups in a molecule or a compound not having any polymerizable functional groups in a molecule. Here, a mesogenic group means a moiety that includes a ring structure and a linking group linked to the ring structure; and that is composed of two or more ring structures in which a linking portion which the ring structure and the ring structure are bonded through is a linking group having equal to or less than two atoms or a single bond.

Among the compounds containing a mesogenic group, a compound having one polymerizable functional group within a molecule is preferable, since it is easy to prepare a mixture having a low temperature range, which is lower or higher than room temperature, as a liquid crystal temperature range, when the compound is included as the mixture.

Examples of the compound include a rodlike polymerizable liquid crystal compound having a rigid moiety, which is a mesogenic group in which a plurality of structures such as a 1,4-phenylene group, 1,4-cyclohexylene group are linked to each other, and a polymerizable functional group such as a vinyl group, an acryloyl group, and a (meth)acryloyl group, as disclosed in Handbook of Liquid Crystals (edited by D. Demus, J. W. Goodby, G. W. Gray, H. W. Spiess, V. Vill, and published by Wiley-VCH, 1998), Kikan Kagaku Sosetsu, No. 22, Chemistry of Liquid Crystal (edited by The Chemical Society of Japan, 1994), or JP-A-7-294735, JP-A-8-3111, JP-A-8-29618, JP-A-11-80090, JP-A-11-116538, JP-A-11-148079, or the like; and a rodlike polymerizable liquid crystal compound having a maleimide group as disclosed in JP-A-2004-2373 and JP-A-2004-99446.

Specifically, the compound having one or more polymerizable functional groups is preferably a compound represented by the following General Formula (1).

[Chem. 1]

$$P\text{-}(Sp)_m\text{-}MG\text{-}R^1 \quad (1)$$

In the formula, P represents a polymerizable functional group,

Sp represents an alkylene group having 0 to 18 carbon atoms (the alkylene group may be substituted with one or more halogen atoms or CN, and one $CH_2$ group or two or more $CH_2$ groups not adjacent to each other, which are present in the alkylene group, each independently may be substituted with —O—, —S—, —NH—, —N(CH$_3$)—, —CO—, —COO—, —OCO—, —OCOO—, —SCO—, —COS—, or —C≡C— as long as oxygen atoms are not directly bonded to each other), m represents 0 or 1, MG represents a mesogenic group, and $R^1$ represents a hydrogen atom, a halogen atom, a cyano group, or an alkyl group having 1 to 18 carbon atoms, the alkyl group may be substituted with one or more halogen atoms or CN's, and one $CH_2$ group or two or more $CH_2$ groups not adjacent to each other, which are present in the alkyl group, each independently may be substituted with —O—, —S—, —NH—, —N(CH$_3$)—, —CO—, —COO—, —OCO—, —OCOO—, —SCO—, —COS—, or —C≡C— as long as oxygen atoms are not directly bonded to each other, or $R^1$ represents a structure represented by General Formula (1-a).

[Chem. 2]

$$\text{-}(Sp)_m\text{-}P \quad (1\text{-}a)$$

In the formula, P represents a reactive functional group, Sp represents a spacer group having 0 to 18 carbon atoms, and m represents 0 or 1.

Here, as the polymerizable functional group, a vinyl group, a vinylether group, an acryl group, a (meth)acryl group, a glycidyl group, an oxetanyl group, a maleimide group, and a thiol group are preferable, a vinyl group, a vinylether group, an acryl group, a (meth)acryl group, and a glycidyl group are more preferable, a vinyl group, a vinylether group, an acryl group, and a (meth)acryl group are still more preferable, and an acryl group and a (meth)acryl group are particularly preferable, from a viewpoint of productivity.

In addition, a mesogenic group represented by MG is represented by General Formula (1-b).

[Chem. 3]

$$\text{—}Z0\text{-}(A1\text{-}Z1)_n\text{-}A2\text{-}Z2\text{-}A3\text{-}Z3\text{-} \quad (1\text{-}b)$$

In the formula, A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, and may have, as a substituent, one or more F's, Cl's, $CF_3$'s, $OCF_3$'s, CN groups, alkyl groups having 1 to 8 carbon atoms, alkoxy groups, alkanoyl groups, alkanoyloxy groups, alkenyl groups having 2 to 8 carbon atoms, alkenyloxy groups, alkenoyl groups, alkenoyloxy groups, or General Formula (1-c):

[Chem. 4]

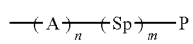

(1-c)

(in the formula, P represents a reactive functional group, A represents —O—, —COO—, —OCO—, —OCH$_2$—, —CH$_2$O—, —CH$_2$CH$_2$OCO—, —COOCH$_2$CH$_2$—, —OCOCH$_2$CH$_2$—, or a single bond, Sp represents a spacer group having 0 to 18 carbon atoms, n represents 0 or 1, and m represents 0 or 1), Z0, Z1, Z2, and Z3 each independently represent —COO—, —OCO—, —CH$_2$CH$_2$—, —OCH$_2$—, —CH$_2$O—, —CH=CH—, —C≡C—, —CH=CHCOO—, —CF=CF—, —CF$_2$O—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group which may have a halogen atom having 2 to 10 carbon atoms, or a single bond, and n represents 0, 1, or 2.

Among the compounds represented by General Formula (1), as the monofunctional compound having one polymerizable functional group in a molecule, compounds represented by the following General Formula (1-1), and General Formula (1-2) are exemplified.

[Chem. 5]

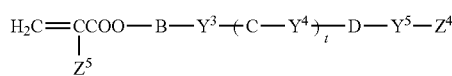

(1-1)

In the formula, $Z^4$ represents a hydrogen atom, a halogen atom, a cyano group, or a hydrocarbon group having 1 to 18 carbon atoms, $Z^5$ represents a hydrogen atom or a methyl group, t represents 0 or 1, B, C, and D each independently represent a 1,4-phenylene group, a 1,4-phenylene group in which a CH group not adjacent to another CH group is substituted with a nitrogen atom, a 1,4-cyclohexylene group, a 1,4-cyclohexylene group in which one or two CH$_2$ groups not adjacent to each other are substituted with an oxygen atom or a sulfur atom, a 1,4-cyclohexenyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, or a 1,4-naphthylene group; and one or more of these groups may be substituted with an alkyl group having 1 to 7 carbon atoms, an alkoxy group, an alkanoyl group, a cyano group, or a halogen atom, $Y^3$ and $Y^4$ each independently represent a single bond, —CH$_2$CH$_2$—, —CH$_2$O—, —OCH$_2$—, —COO—, —OCO—, —C≡C—, —CH=CH—, —CF=CF—, —CF$_2$O—, —(CH$_2$)$_4$—, —CH$_2$CH$_2$CH$_2$O—, —OCH$_2$CH$_2$CH$_2$—, —CH=CHCH$_2$CH$_2$—, —CH$_2$CH$_2$CH=CH—, —CH=CHCOO—, —OCOCH=CH—, —CH$_2$CH$_2$COO—, —CH$_2$CH$_2$OCO—, —COOCH$_2$CH$_2$—, or —OCOCH$_2$CH$_2$—, and $Y^5$ represents a single bond, —O—, —COO—, —OCO—, or —CH=CHCOO—.

[Chem. 6]

(1-2)

In the formula, $Z^6$ represents a hydrogen atom, a halogen atom, a cyano group, or a hydrocarbon group having 1 to 18 carbon atoms, $Z^7$ represents a hydrogen atom or a methyl group, $W^3$ represents a single bond, —OCH$_2$—, —COO—, —OCO—, —C≡C—, —CH=CH—, —CF=CF—, —CF$_2$O—, —OCH$_2$CH$_2$CH$_2$—, —CH=CHCH$_2$CH$_2$—, —CH=CHCOO—, —OCOCH=CH—, —COOCH$_2$CH$_2$—, —OCOCH$_2$CH$_2$—, or —O—, v represents an integer of 1 to 18, u represents 0 or 1, E, F, and G each independently represent a 1,4-phenylene group, a 1,4-phenylene group in which a CH group not adjacent to another CH group is substituted with a nitrogen atom, a 1,4-cyclohexylene group, a 1,4-cyclohexylene group in which one or two CH$_2$ groups not adjacent to each other are substituted with an oxygen atom or a sulfur atom, a 1,4-cyclohexenyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, or a 1,4-naphthylene group and one or more of these groups may be substituted with an alkyl group having 1 to 7 carbon atoms, an alkoxy group, an alkanoyl group, a cyano group, or a halogen atom, and $Y^6$ and $Y^7$ each independently represent a single bond, —CH$_2$CH$_2$—, —CH$_2$O—, —OCH$_2$—, —COO—, —OCO—, —C≡C—, —CH=CH—, —CF=CF—, —CF$_2$O—, —(CH$_2$)$_4$—, —CH$_2$CH$_2$CH$_2$O—, —OCH$_2$CH$_2$CH$_2$—, —CH=CHCH$_2$CH$_2$—, —CH$_2$CH$_2$CH=CH—, —CH=CHCOO—, —OCOCH=CH—, —CH$_2$CH$_2$COO—, —CH$_2$CH$_2$OCO—, —COOCH$_2$CH$_2$—, or —OCOCH$_2$CH$_2$—, and $Y^8$ represents a single bond, —O—, —COO—, —OCO—, or —CH=CHCOO—.

Exemplary compounds represented by General Formula (1-1) and General Formula (1-2) are shown below but the exemplary compounds are not limited to these.

[Chem. 7]
(1-3)
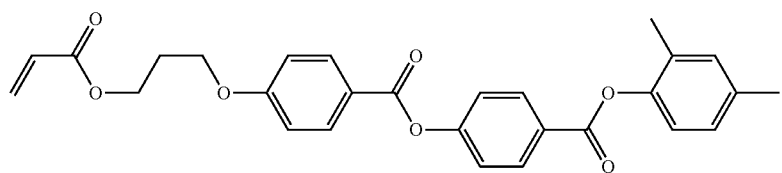
(1-4)
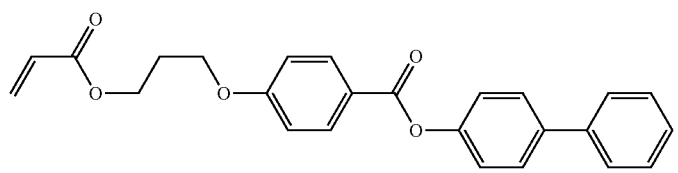
(1-5)
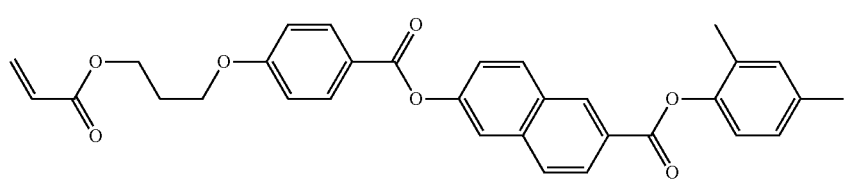
(1-6)
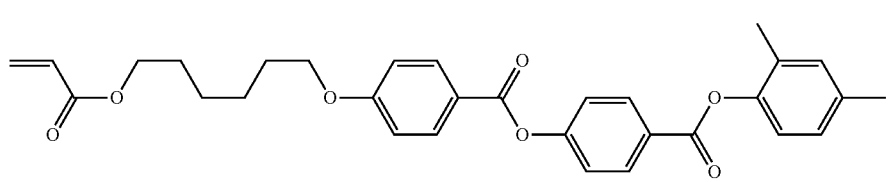
(1-7)
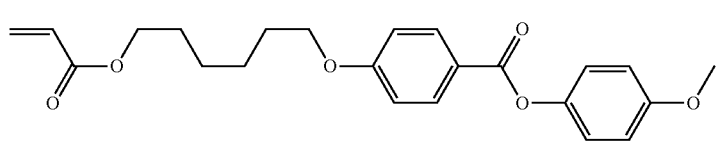
(1-8)
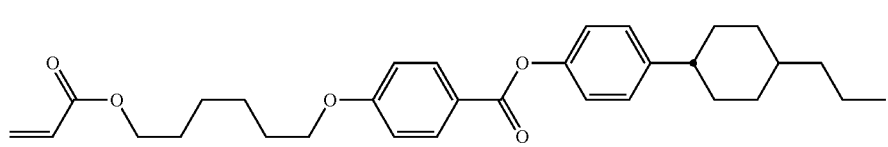
(1-9)
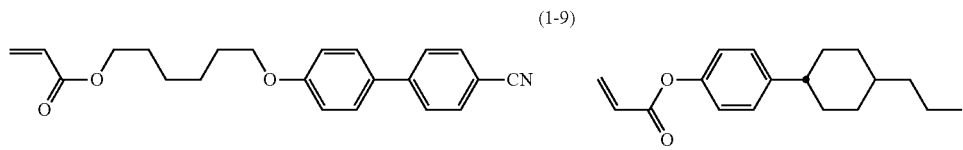
(1-10)
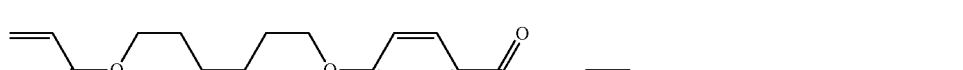
(1-11)
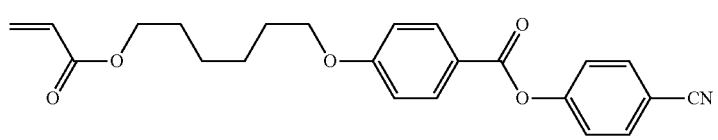
(1-12)
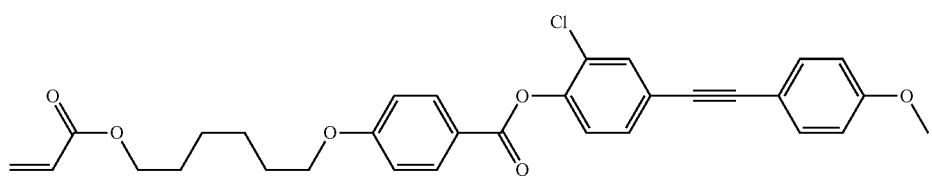

-continued
(1-13)
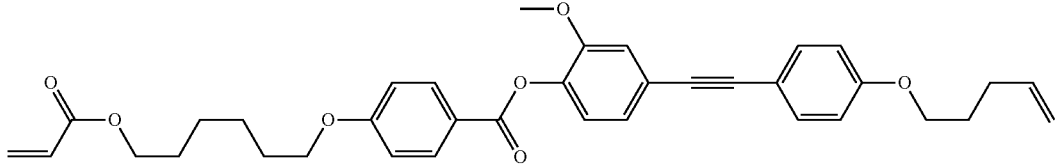
[Chem. 8]
(1-14)
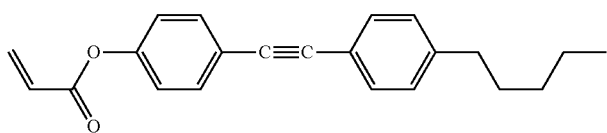
(1-15)
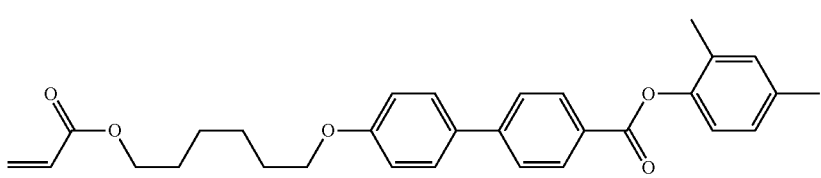
(1-16)
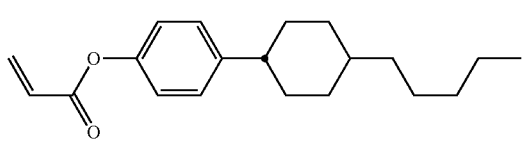
[Chem. 9]
(1-17)
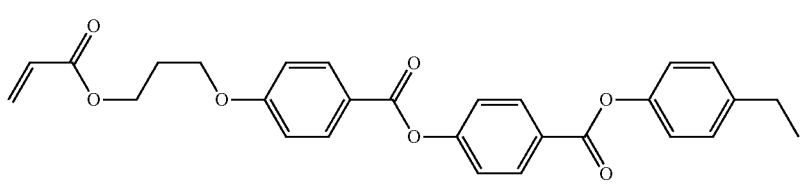
(1-18)
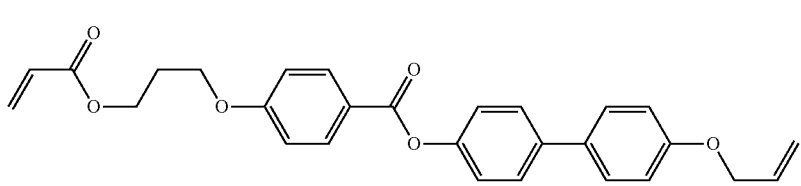
(1-19)
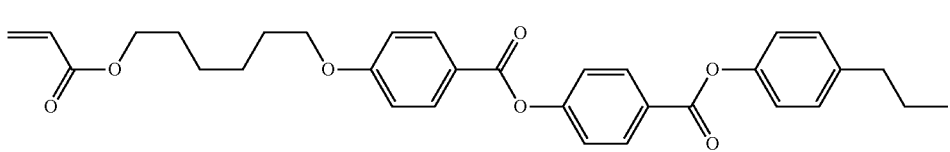
(1-20)
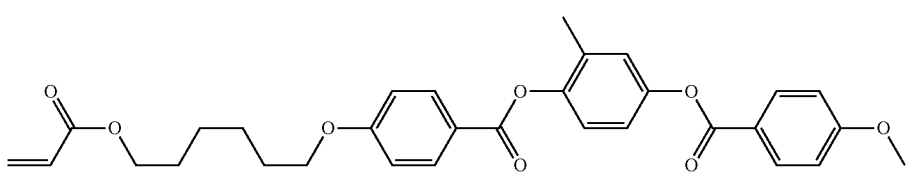
(1-21)
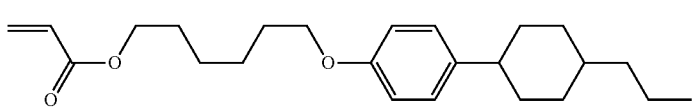

-continued
(1-22)
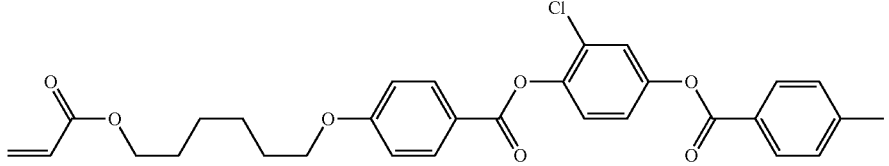
(1-23)
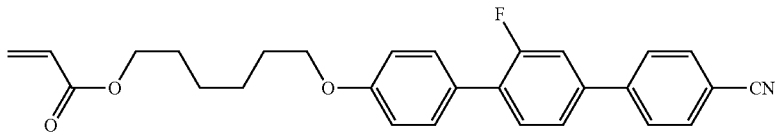
(1-24)
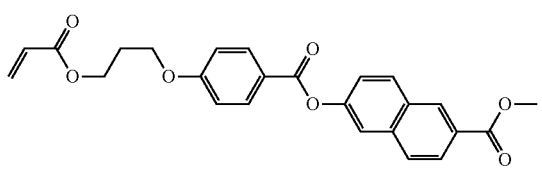
(1-25)
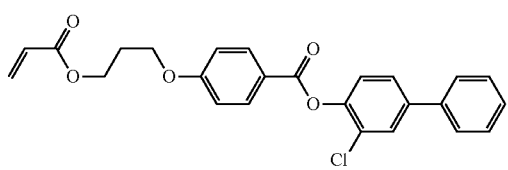
[Chem. 10]
(1-26)
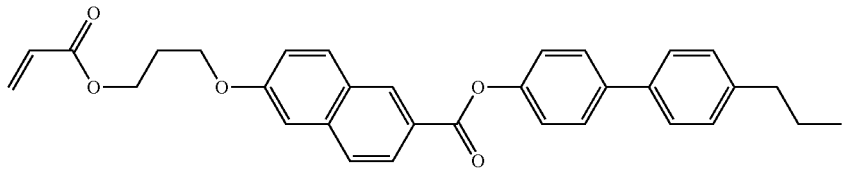
(1-27)
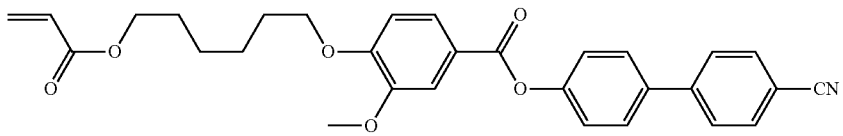
(1-28)
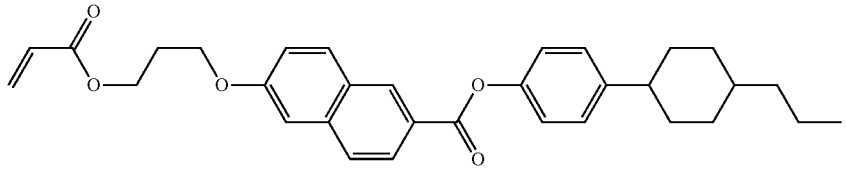
(1-29)
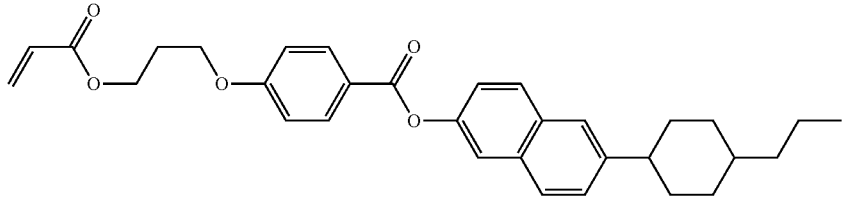
(1-30)
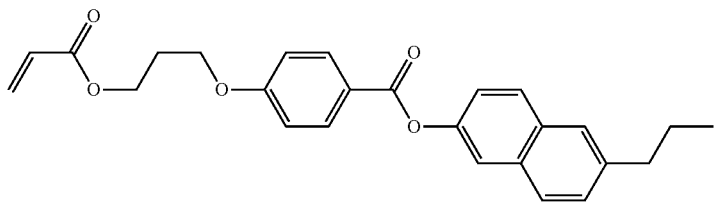

-continued

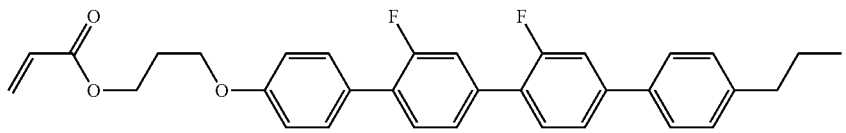
(1-31)

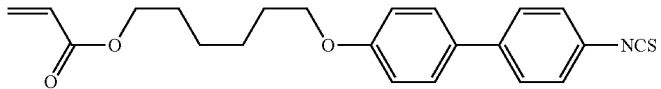
(1-32)

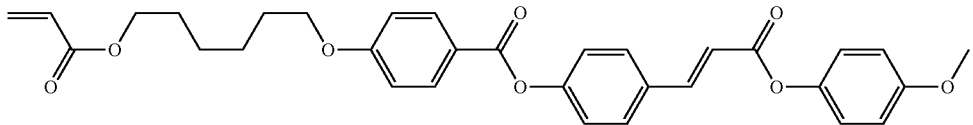
(1-33)

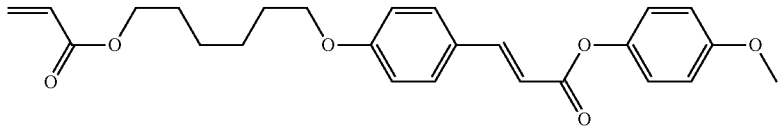
(1-34)

These compounds may be used alone or two or more thereof may be used in combination.

The total content of the monofunctional compound having one polymerizable functional group in a molecule is preferably 0 to 95% by mass, more preferably 0 to 90% by mass, and particularly preferably 0 to 85% by mass with respect to the total content of the polymerizable composition.

Among the compounds represented by General Formula (1), as the bifunctional compound having two polymerizable functional groups in a molecule in which $R^1$ is represented by General Formula (1-a), a compound represented by the following General Formula (2-1) is exemplified.

[Chem. 11]

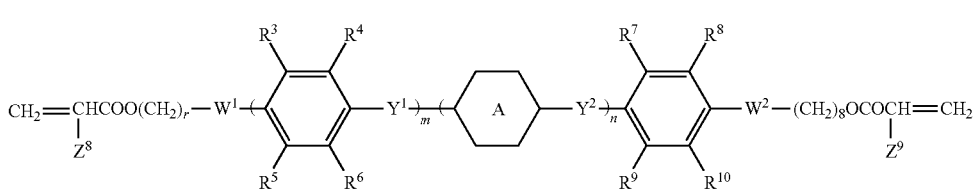
(2-1)

In the formula, m represents 0 or 1, n represents 0, 1, or 2, $W^1$ and $W^2$ each independently represent a single bond, —OCH$_2$—, —COO—, —OCO—, —C≡C—, —CH=CH—, —CF=CF—, —CF$_2$O—, —OCH$_2$CH$_2$CH$_2$—, —CH=CHCH$_2$CH$_2$—, —CH=CHCOO—, —OCOCH=CH—, —COOCH$_2$CH$_2$—, or —OCOCH$_2$CH$_2$—, or —O—, $Y^1$ and $Y^2$ each independently represent a single bond, —CH$_2$CH$_2$—, —CH$_2$O—, —OCH$_2$—, —COO—, —OCO—, —C≡C—, —CH=CH—, —CF=CF—, —CF$_2$O—, —(CH$_2$)$_4$—, —CH$_2$CH$_2$CH$_2$O—, —OCH$_2$CH$_2$CH$_2$—, —CH=CHCH$_2$CH$_2$—, —CH$_2$CH$_2$CH=CH—, —CH=CHCOO—, —OCOCH=CH—, —CH$_2$CH$_2$COO—, —CH$_2$CH$_2$OCO—, —COOCH$_2$CH$_2$—, or —OCOCH$_2$CH$_2$—, in the case where a plurality of $Y^2$'s are present, they may be the same as or different from each other, A represents a 1,4-phenylene group, a 1,4-cyclohexylene group, or a naphthalene-2,6-diyl group, in the case where a plurality of A's are present, they may be the same as or different from each other, $Z^8$ and $Z^9$ represent a hydrogen atom or a methyl group, r and s each independently represent an integer of 1 to 18, and $R^3$ to $R^{10}$ respectively are selected from a hydrogen atom, an alkyl group having 1 to 7 carbon atoms, an alkoxy group, an alkanoyl group, a cyano group, or a halogen atom.

Exemplary compounds represented by General Formula (2-1) are shown below but the exemplary compounds are not limited to these.

[Chem. 12]
(2-2)
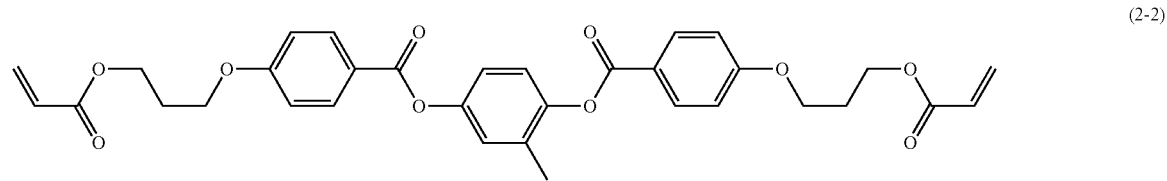
(2-3)
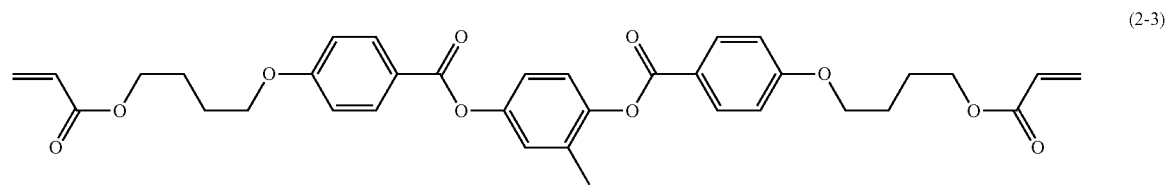
(2-4)
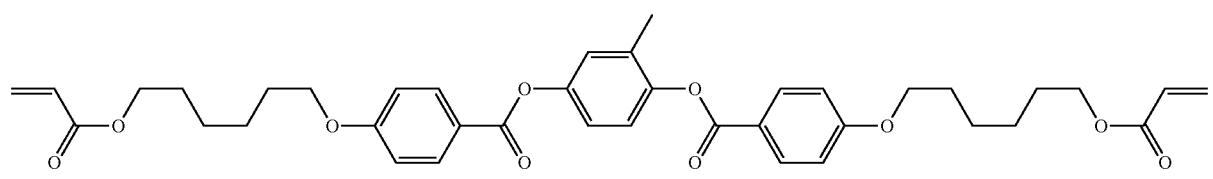
(2-5)
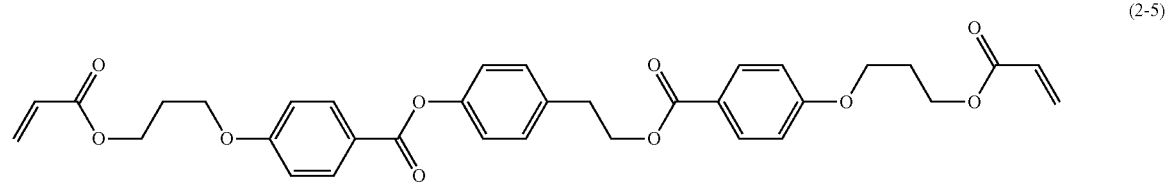
(2-6)
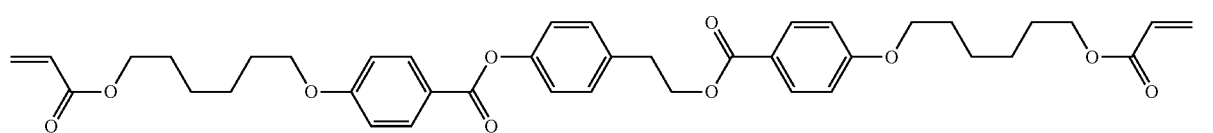
(2-7)
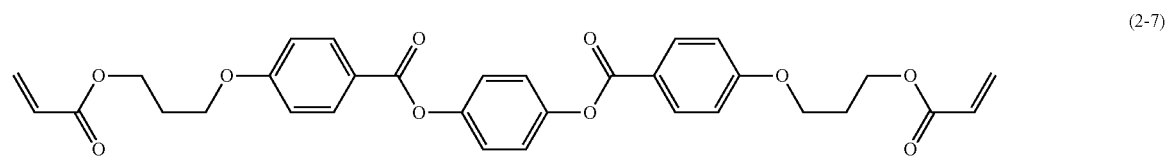
(2-8)
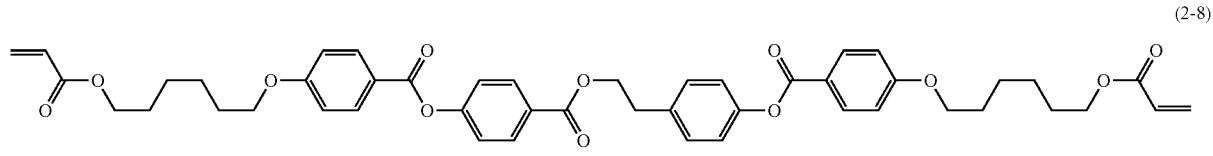
(2-9)
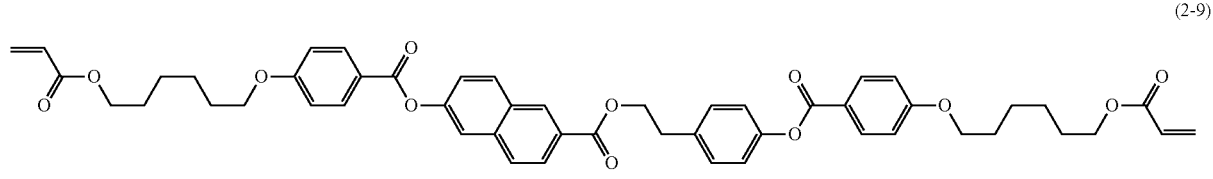
(2-10)
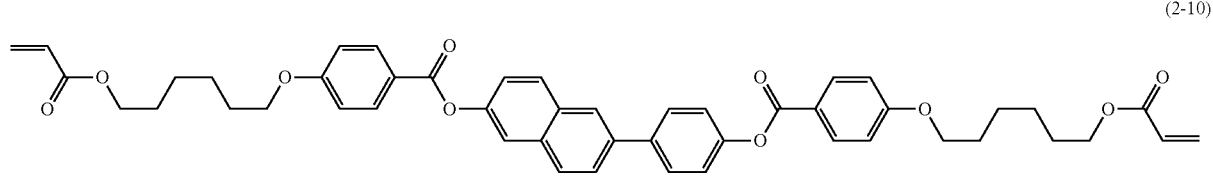

(2-11)
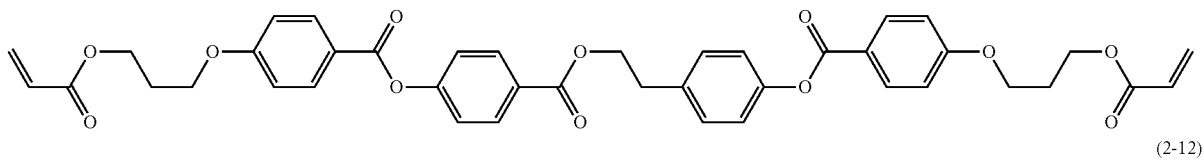
(2-12)
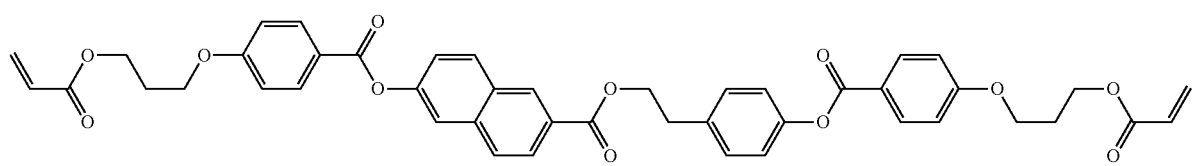
[Chem. 13]
(2-13)
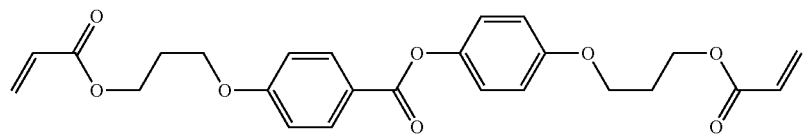
(2-14)
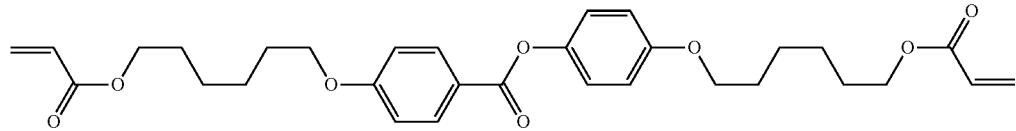
(2-15)
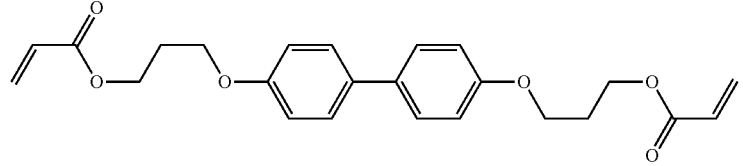
(2-16)
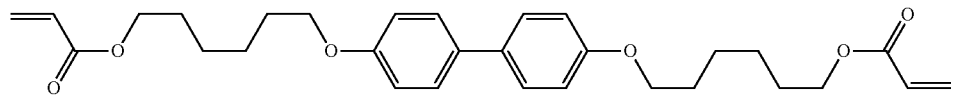
(2-17)
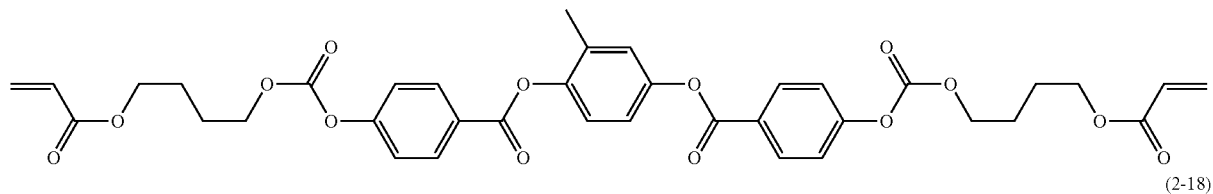
(2-18)
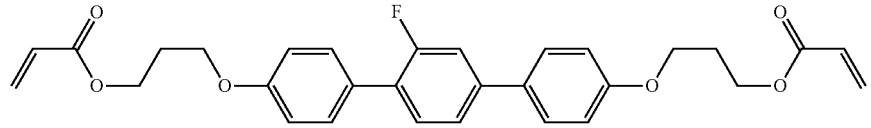
(2-19)
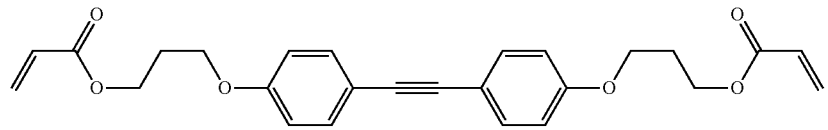
(2-20)
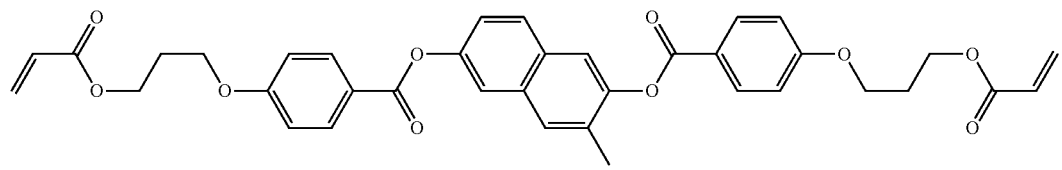

(2-21)
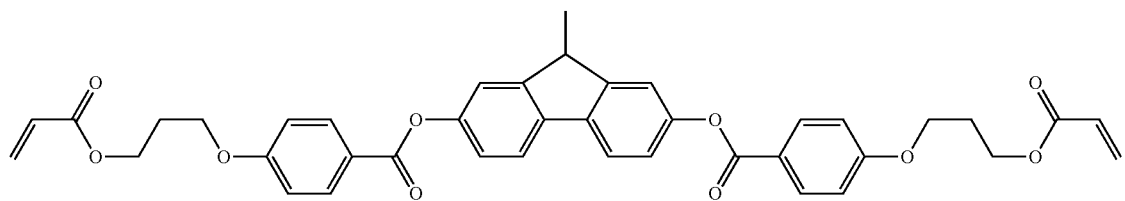
[Chem. 14]
(2-22)
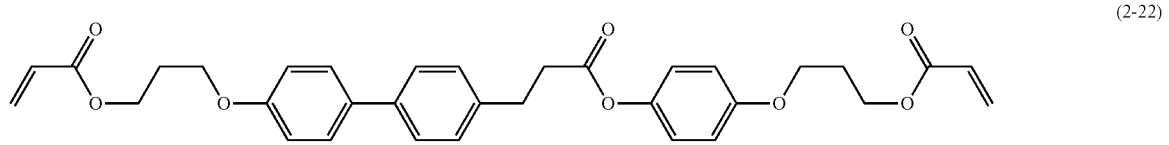
(2-23)
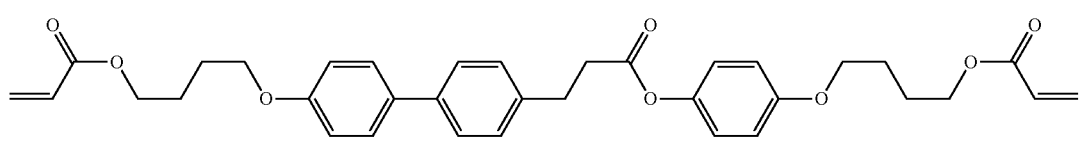
(2-24)
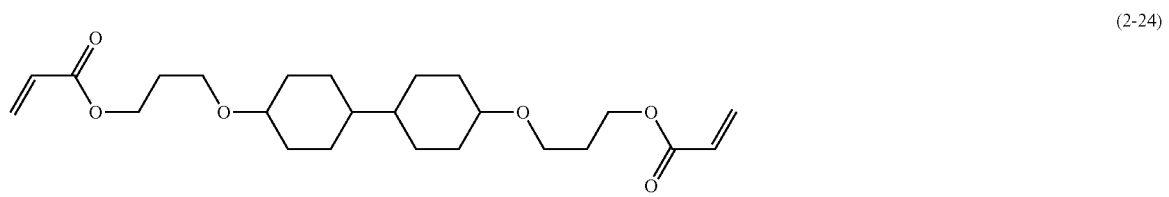
(2-25)
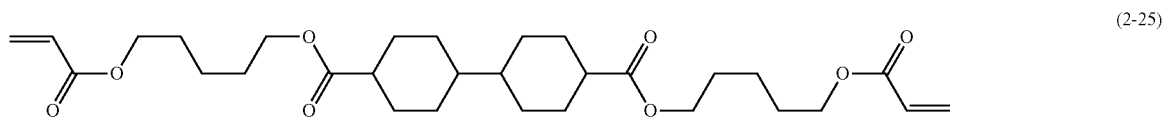
(2-26)
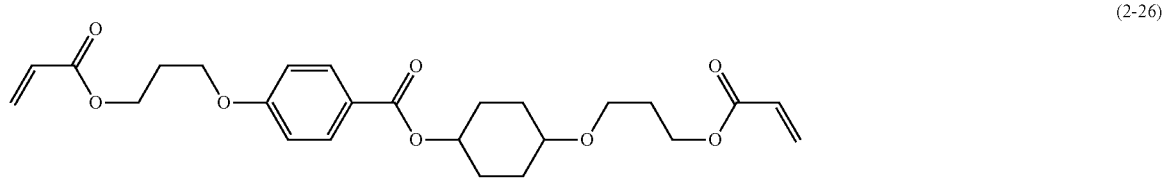
(2-27)
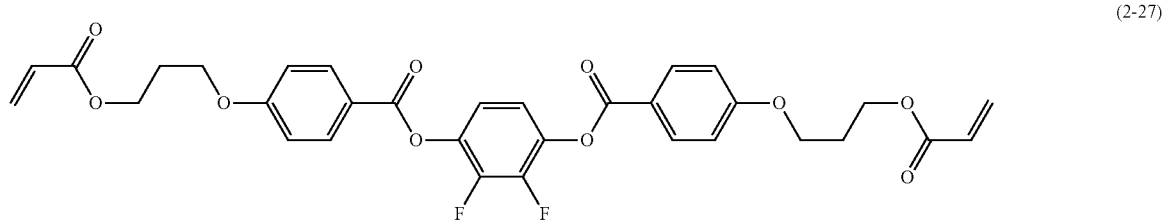
(2-28)
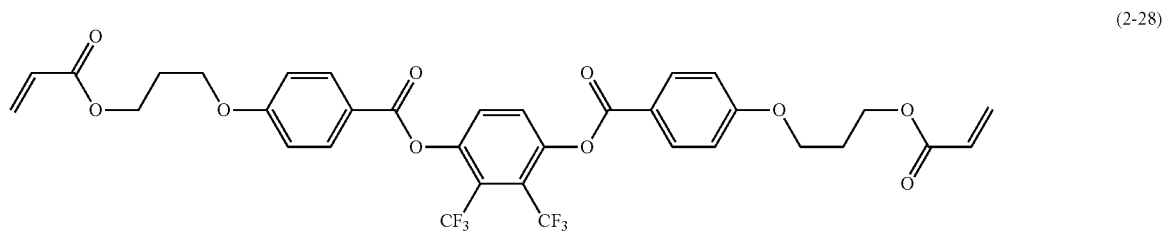

(2-29)

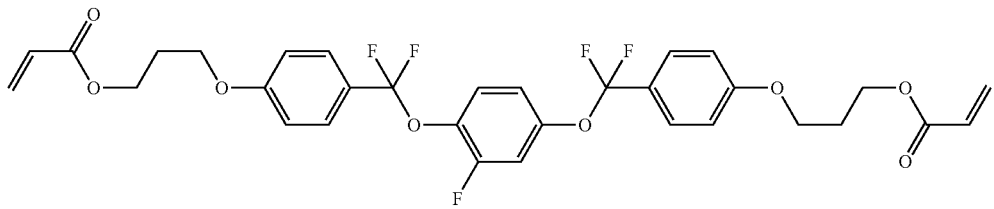

(2-30)

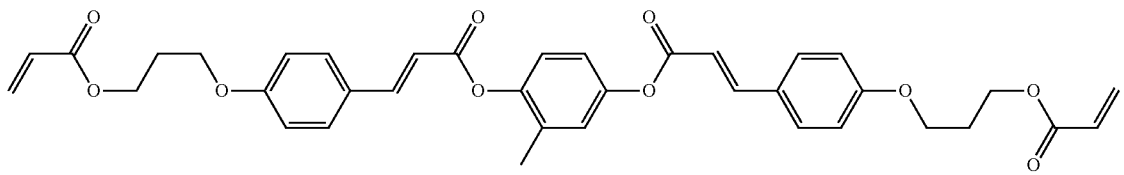

The total content of the compound represented by General Formula (2-1) is preferably 5 to 100% by mass, more preferably 8 to 100% by mass, and particularly preferably 10 to 100% by mass with respect to the total content of the polymerizable composition.

In addition, in recent years, in a phase difference film, wavelength dispersion properties of birefringence (Δn) is required to be small or reverse, in order to enhance a viewing angle of a liquid crystal display or reflection prevention properties of an organic EL display. A so-called reverse dispersion type polymerizable liquid crystal compound having these properties can be contained in the polymerizable composition of the present invention. Specific examples thereof include compounds represented by the following General Formula (3-1).

[Chem. 15]

(3-1)

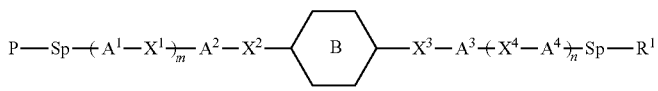

In the formula, P represents a polymerizable functional group, Sp represents a spacer group or a single bond, $A^1$, $A^2$, $A^3$, and $A^4$ each independently represent a divalent alicyclic hydrocarbon group or an aromatic hydrocarbon group, $X^1$, $X^2$, $X^3$, and $X^4$ each independently represent a divalent linking group or a single bond, $R^1$ represents an alkyl group having 1 to 12 carbon atoms, an alkoxy group, or "*-Sp-P" (* represents bonding to $A^4$ or $A^3$), m and n each independently represent an integer of 0 to 4, with the proviso that the total number of m and n is an integer of 2 or more, and B represents a group represented by the following Formula (i) or Formula (ii).

[Chem. 16]

(i)

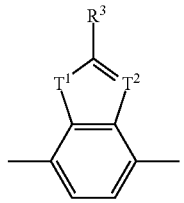

(ii)

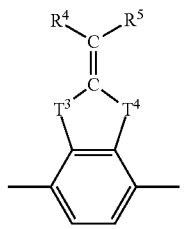

In Formula (i), $T^1$ represents —S—, —O—, —CH$_2$—, —NH—, —CO—, —SO—, or —CS—, $T^2$ represents =CR$^2$— or =N—, $R^2$ represents a hydrogen atom, a halogen atom, an alkyl group having 1 to 6 carbon atoms, an alkoxy group having 1 to 6 carbon atoms, a cyano group, a nitro group, or a hydroxyl group, and $R^3$ represents an alkyl group having 1 to 6 carbon atoms, an alicyclic hydrocarbon group, or an aromatic hydrocarbon group. In Formula (ii), $T^3$ and $T^4$ each independently represent —S—, —O—, —$NR^6$—, —$CH_2$—, —NH—, —CO—, —SO—, or —CS—, where, $R^6$ represents a hydrogen atom, a halogen atom, an alkyl group having 1 to 6 carbon atoms, an alkoxy group having 1 to 6 carbon atoms, a cyano group, a nitro group, or a hydroxyl group, and $R^4$ and $R^5$ each independently represent a monovalent substituent, or form a ring via Y linking $R^4$ and $R^5$.

The compound represented by General Formula (3-1) preferably has crystallinity before polymerization. In other words, the compound represented by General Formula (3-1) is preferably a polymerizable liquid crystal compound.

As the polymerizable functional group represented by P in General Formula (1), the conventional group used for the polymerizable liquid crystal compound can be applied without limitation, and examples thereof include a vinyl group, a p-stilbene group, an acryl group (an acryloyl group), a methacryl group (a methacryloyl group), an acryloyloxy group, a methacryloyloxy group, a carboxyl group, a methylcarbonyl group, a hydroxyl group, an amide group, an alkylamino group having 1 to 4 carbon atoms, an amino group, an epoxy group, an oxetanyl group, an aldehyde group, an isocyanate group, or a thioisocyanate group.

Preferred examples of the polymerizable functional group P include a substituent selected from the group consisting of substituents represented by the following General Formula (II-c), General Formula (II-d), and General Formula (II-e).

[Chem. 17]

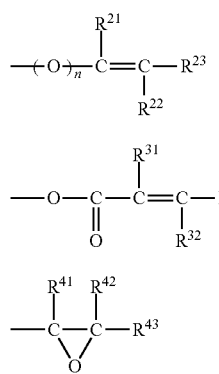

In General Formula (II-c), General Formula (II-d), and General Formula (II-e), $R^{21}$, $R^{22}$, $R^{23}$, $R^{32}$, $R^{33}$, $R^{41}$, $R^{42}$, and $R^{43}$ each independently represent a hydrogen atom, a halogen atom, or an alkyl group having 1 to 5 carbon atoms, and n represents 0 or 1. Also, $R^{31}$ of General Formula (II-d) represents a hydrogen atom, a halogen atom, an alkyl group having 1 to 5 carbon atoms, or a halogenated alkyl group having 1 to 5 carbon atoms.

The left terminals of the polymerizable functional groups represented by general formulas shown above each is bonded to Sp of General Formula (3-1).

The alkyl group is preferably a linear or branched alkyl group, and the linear alkyl group is more preferable. A part or all of hydrogen atoms bonded to the alkyl group may be substituted with a halogen atom.

Among the polymerizable functional groups represented by general formulas shown above, a group selected from the group consisting of the groups represented by General Formula (II-c) and General Formula (II-d) is preferable, and a group selected from the group consisting of the group represented by General Formula (II-d) is more preferable from a viewpoint of increasing polymerization performance and storage stability.

Examples of the polymerizable functional group represented by General Formula (II-c), General Formula (II-d), or General Formula (II-e) include the following reactive functional groups (P-1) to (P-8). Among these reactive functional groups, the following (P-1) or (P-2) is preferable and the following (P-1) is more preferable, from a viewpoint of increasing polymerization performance and storage stability. The right terminals of the polymerizable functional groups represented by the following (P-1) to (P-8) each is bonded to Sp of General Formula (3-1).

[Chem. 18]

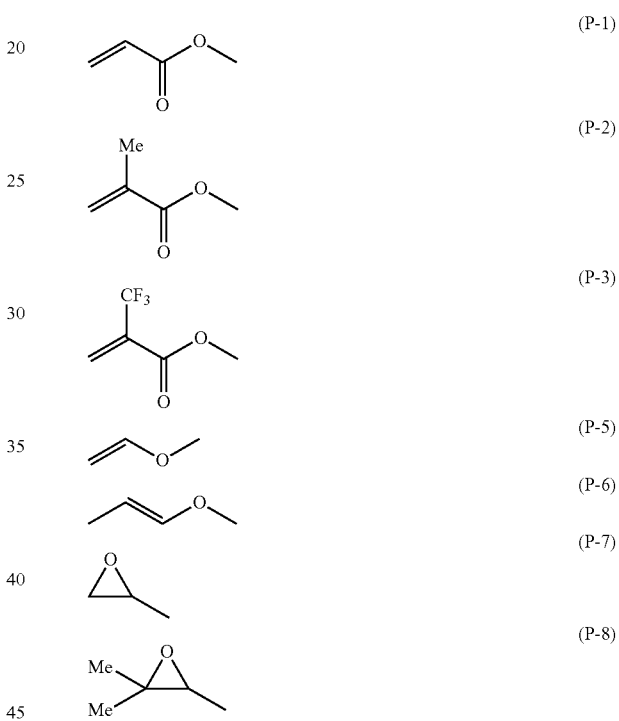

Sp in General Formula (3-1) represents a spacer group or a single bond. The spacer group represents a divalent linking group which can link the polymerizable functional group P with $A^1$ or $A^2$, and a linking group not impairing crystallinity of the compound represented by General Formula (3-1) is preferable.

Preferred examples of Sp include a linear alkylene group having 1 to 20 carbon atoms. One $CH_2$ group or two or more $CH_2$ groups not adjacent to each other, which are present in the alkylene group, each independently may be substituted with —O—, —S—, —NH—, —N($CH_3$)—, —CO—, —COO—, —OCO—, —OCOO—, —SCO—, —COS—, —CH=CH—, or —C≡C—, as long as oxygen atoms, sulfur atoms, and an oxygen atom and a sulfur atom are not directly bonded to each other. The number of carbon atoms of the alkylene group is preferably 2 to 10, more preferably 3 to 8, and still more preferably 3 to 6, from a viewpoint of improving crystallinity.

Cyclic groups $A^1$, $A^2$, $A^3$, and $A^4$ of General Formula (3-1) each independently represent a divalent alicyclic hydrocarbon group or an aromatic hydrocarbon group. In addition, the aforementioned cyclic group may be an aromatic heterocyclic group.

Examples of the cyclic group include a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, or a fluorene 2,7-diyl group.

One or more hydrogen atoms bonded to the 1,4-phenylene group, the 1,4-cyclohexylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene 2,7-diyl group, and the fluorene 2,7-diyl group may be substituted with F, Cl, $CF_3$, $OCF_3$, a cyano group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 3 carbon atoms, an alkenyloxy group having 2 to 8 carbon atoms, an alkenoyl group having 2 to 8 carbon atoms, or an alkenoyloxy group having 2 to 8 carbon atoms.

Cyclic groups $A^1$, $A^2$, $A^3$, and $A^4$ of General Formula (3-1) each independently are preferably a 1,4-phenylene group or a 1,4-cyclohexylene group described above. In the case of this cyclic group, crystallinity of the polymerizable compound of the present embodiment can be easily improved and aligning properties of a polymer can be easily improved.

$X^1$, $X^2$, $X^3$, and $X^4$ of General Formula (3-1) each independently represent a divalent linking group or a single bond.

Preferred examples of $X^1$, $X^2$, $X^3$, and $X^4$ each independently include —$(CH_2)_u$—O—COO—, —$(CH_2)_u$—OCO—, —$(CH_2)_u$—COO—, —$(CH_2)_u$—O—, —O—COO—$(CH_2)_u$—, —OCO—$(CH_2)_u$—, —COO—$(CH_2)_u$—, —O—$(CH_2)_u$—, —O—$(CH_2)_v$—O—, —CH=CH—, —C≡C—, —CH=CHCOO—, —OCOCH=CH—, —N=N—, —C=N—, —N=C—, —C=N—N=C—, —$CH_2CH_2$—, and a single bond. Here, u represents any one of integers of 0 to 2, and v represents 1 or 2. In the case where u represents 0, —$(CH_2)_u$—O—COO— and —O—COO—$(CH_2)$u- represent —O—COO—, —$(CH_2)_u$—O— and —O—$(CH_2)_u$— represent —O—, —$(CH_2)_u$—COO— and —COO—$(CH_2)_u$— represent —COO—, and —$(CH_2)_u$—OCO— and —OCO—$(CH_2)_u$— represent —OCO—.

m and n of General Formula (3-1) each independently represent an integer of 0 to 4, and the total number of m and n is an integer of 2 or more.

m and n each independently preferably represent 0 to 3, more preferably 0 to 2, and still more preferably 1 or 2, from a viewpoint of improving crystallinity of the polymerizable compound of the present embodiment. Also, m and n are preferably the same integer.

A terminal group $R^1$ of General Formula (3-1) represents an alkyl group having 1 to 12 carbon atoms, an alkoxy group having 1 to 12 carbon atoms, or "*-Sp-P". Here, "*" represents bonding to $A^4$ in the case where n is an integer of 1 or more, and represents bonding to $A^3$ in the case where n is 0.

Sp of "*-Sp-P" and the polymerizable functional group P are the same as described above. In the case where two Sp's are present in a molecule, they may be the same as or different from each other, and preferably the same as each other. Also, in the case where two P's are present in a molecule, they may be the same as or different from each other, and preferably the same as each other.

The alkyl group may be any one of a linear, branched, and cyclic alkyl group, a linear or branched alkyl group is preferable, and a linear alkyl group is more preferable. The number of carbon atoms of the alkyl group is more preferably 2 to 10, more preferably 3 to 8, and still more preferably 3 to 6.

As an alkyl group which constitutes the alkoxy group, the same group exemplified in the alkyl group can be mentioned. The number of carbon atoms of the alkyl group which constitutes the alkoxy group is preferably 1 to 8, more preferably 1 to 6, and still more preferably 1 to 3.

The terminal group $R^1$ is preferably "*-Sp-P" from a viewpoint of improving crystallinity and aligning properties of the polymerizable compound of the present embodiment, and improving optical properties of an optically anisotropic body of a phase difference film using the polymerizable compound. In this preferable case, two Sp's present in a molecule may be different from each other and preferably the same as each other. Two P's present in a molecule may be the same as or different from each other, and preferably the same as each other.

A central skeleton B of General Formula (3-1) is a group represented by the following Formula (i) or Formula (ii).

[Chem. 19]

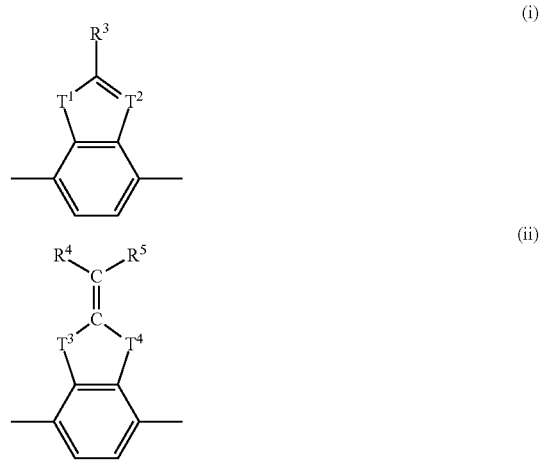

In General Formula (i), $T^1$ represents —S—, —O—, —$CH_2$—, —NH—, —CO—, —SO—, or —CS—, preferably —NH— or —S—, and more preferably —S—.

In General Formula (i), $T^2$ represents "=$CR^2$—" or "=N—", and $R^2$ represents a hydrogen atom, a halogen atom, an alkyl group having 1 to 6 carbon atoms, an alkoxy group having 1 to 6 carbon atoms, a cyano group, a nitro group, or a hydroxyl group. Also, "=$CR^2$—" represents "=C(—$R^2$)—", and a hydrogen atom is not bonded to the carbon atom C where $R^2$ is bonded.

In General Formula (i), $T^2$ preferably represents =CH—, =C(—$CH_3$)—, =C(—$OCH_3$)—, or =N—, and =N— is more preferable.

In the case where R² represents an alkyl group or an alkoxy group, examples of the alkyl group of R² and an alkyl group which constitutes the alkoxy group of R² include a methyl group, an ethyl group, a propyl group, an isopropyl group, a butyl group, an isobutyl group, a sec-butyl group, a tert-butyl group, a pentyl group, and a hexyl group. The number of carbon atoms of the alkyl group is preferably 1 to 4, more preferably 1 or 2, and still more preferably 1.

In the case where R² is a halogen atom, a fluorine atom, or a chlorine atom is preferable.

A preferable combination of T¹ and T² is represented by the following General Formulas (i-1) to (i-5).

[Chem. 20]

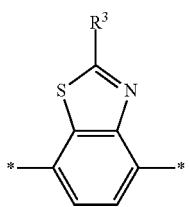
(i-1)

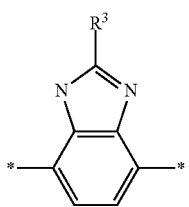
(i-2)

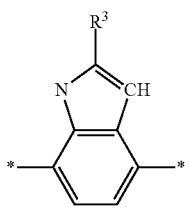
(i-3)

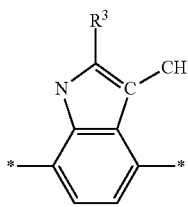
(i-4)

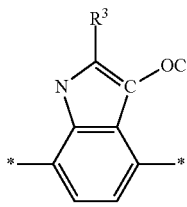
(i-5)

In the formulas, each "*" represents bonding to X² and X³ of General Formula (i) and R³ is the same as the R³ of General Formula (i).

In General Formula (i), R³ represents an alkyl group having 1 to 6 carbon atoms, an alicyclic hydrocarbon group, or an aromatic hydrocarbon group. Among these, R³ is preferably an alicyclic hydrocarbon group or an aromatic hydrocarbon group, and more preferably an aromatic hydrocarbon group from a viewpoint of improving crystallinity and optical properties.

A hydrogen atom included in the alicyclic hydrocarbon group and the aromatic hydrocarbon group may be substituted with an alkyl group having 1 to 6 carbon atoms, an alkoxy group having 1 to 6 carbon atoms, a halogen atom, a cyano group, a nitro group, a —C≡C—CH₃ group, or a hydroxyl group. Among the substituents exemplified herein, a nitro group, a cyano group, and a —C≡C—CH₃ group are preferable from a viewpoint of improving crystallinity and aligning properties of the polymerizable compound.

Examples of the alkyl group and an alkyl group which constitutes the alkoxy group include a methyl group, an ethyl group, a propyl group, an isopropyl group, a butyl group, an isobutyl group, a sec-butyl group, a tert-butyl group, a pentyl group, and a hexyl group. The number of carbon atoms of the alkyl group is preferably 1 to 4, more preferably 1 or 2, and still more preferably 1.

The number of carbon atoms of the alicyclic hydrocarbon group is preferably 4 to 10 and more preferably 5 to 8. Examples of the alicyclic hydrocarbon group include groups represented by the following Formulas (i-6-1) to (i-6-4). Also, a part of the carbon atom constituting this alicyclic hydrocarbon group may be substituted with a hetero atom such as a nitrogen atom, an oxygen atom, and a sulfur atom. Examples of this alicyclic group include groups represented by the following Formulas (i-6-5) to (i-6-10). In the formula, "*" represents bonding to the carbon atom where R³ of General Formula (i) is bonded.

[Chem. 21]

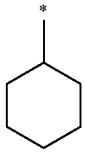
(i-6-1)

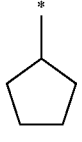
(i-6-2)

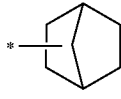
(i-6-3)

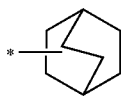
(i-6-4)

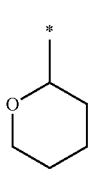
(i-6-5)

Among the aforementioned groups (i-6-1) to (i-6-10), the group (i-6-1) or (i-6-2) is preferable. The group (i-6-1) and (i-6-2) may have a substituent, and as the substituent, a nitro group, a cyano group, and a —C≡C—CH$_3$ group are preferable. The substituent is preferably bonded to the 4th position of the group (i-6-1) or the third position of the group (i-6-2). Here, a carbon atom bonded to the "*" among the carbon atoms constituting the ring is the first position.

The number of carbon atoms of the aromatic hydrocarbon group is preferably 6 to 20 and more preferably 6 to 14. Examples of the aromatic hydrocarbon group include groups represented by the following Formulas (i-7-1) to (i-7-13). In the formulas, "*" represents bonding to the carbon atom where R$^3$ of General Formula (i) is bonded.

[Chem. 22]

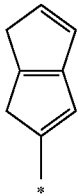

(i-7-11)

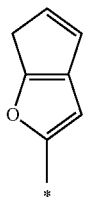

(i-7-12)

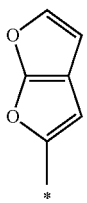

(i-7-13)

Among the aforementioned groups (i-7-1) to (i-7-13), the groups (i-7-1) to (i-7-4) and (i-7-7) to (i-7-10) are preferable. In addition, the ring structure preferably has the substituent, and as the substituent, a nitro group, a cyano group, and a —C≡C—CH$_3$ group are preferable.

In General Formula (ii), T$^3$ and T$^4$ each independently represent —S—, —O—, —NR$^2$—, —CH$_2$—, —NH—, —CO—, —SO—, or —CS—. Here, R$^6$ represents a hydrogen atom, a halogen atom, an alkyl group having 1 to 6 carbon atoms, an alkoxy group having 1 to 6 carbon atoms, a cyano group, a nitro group, or a hydroxyl group. T$^3$ and T$^4$ may be the same as or different from each other. In the case where all of the T$^3$ and T$^4$ are —NR$^6$—, two R$^6$'s may be the same as or different from each other.

T$^3$ is preferably —O—, —NR$^6$—, or —S—, more preferably —NR$^6$— or —S—, and still more preferably —S—.

T$^4$ is preferably —O—, —NR$^6$—, or —S—, more preferably —NR$^6$— or —S—, and still more preferably —S—.

In the case where R$^6$ represents an alkyl group or an alkoxy group, examples of the alkyl group and an alkyl group constituting the alkoxy group of R$^6$ include a methyl group, an ethyl group, a propyl group, an isopropyl group, a butyl group, an isobutyl group, a sec-butyl group, a tert-butyl group, a pentyl group, and a hexyl group. The number of carbon atoms of the alkyl group is preferably 1 to 4, more preferably 1 or 2, and still more preferably 1.

In the case where R$^6$ represents a halogen atom, a fluorine atom or a chlorine atom is preferable.

In General Formula (ii), R$^4$ and R$^5$ each independently represent a monovalent substituent, or form a ring via Y linking R$^4$ with R$^5$.

Examples of the monovalent substituent of R$^4$ and R$^5$, each independently, include an alkyl group, a cycloalkyl group, a bicycloalkyl group, an alkenyl group, a cycloalkenyl group, a bicycloalkenyl group, an alkynyl group, an aryl group, a heteroring group, a cyano group, a carboxyl group, a hydroxyl group, a nitro group, a halogen atom, an alkoxy group, an aryloxy group, a silyloxy group, a heteroring oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heteroring thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heteroring azo group, an imide group, a phosphino group, a phosphinyl group, a phosphinyloxy group, a phosphinylamino group, and a silyl group.

In the case of the following General Formula (ii-1) in which R$^4$ and R$^5$ form a ring via Y linking R$^4$ with R$^5$:

[Chem. 23]

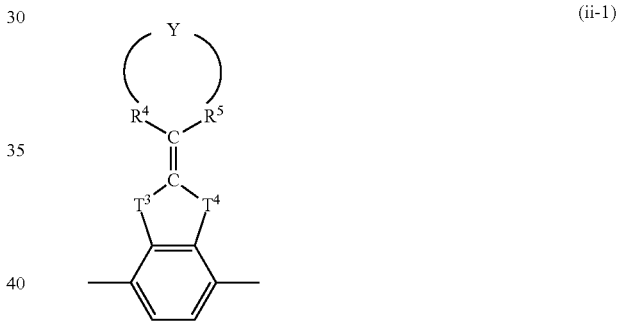

(ii-1)

R$^4$ and R$^5$ each independently represent any one of the groups selected from the group consisting of —O—, —S—, —SO—, —SO$_2$—, —NR— (R represents a hydrogen atom or a monovalent substituent), =N—, =N(+)R— (where R represents a hydrogen atom or a monovalent substituent), —CO—, —CS—, and =CR— (R represents a hydrogen atom or a monovalent substituent). Here, in the case where R is a monovalent substituent, as the monovalent substituent, the groups exemplified in the aforementioned monovalent substituent for R$^4$ and R$^5$ can be mentioned.

Y represents 2 to 4 atoms selected from the group consisting of a carbon atom and group 14 to 16 nonmetal atoms, and forms a 5- to 7-membered ring (hereinafter, may be referred to as ring Y) with R$^4$—C—R$^5$ shown in General Formula (ii-1) shown above. In the case where an atom constituting the ring Y has a substitutable hydrogen atom, the hydrogen atom may be substituted with a substituent R$^Y$. As an example of R$^Y$, the groups exemplified in the aforementioned monovalent substituent for R$^4$ and R$^5$ can be mentioned.

Exemplary compounds represented by General Formula (3-1) are shown below, but the exemplary compounds are not limited to these.

[Chem. 24]
(3-1-1)
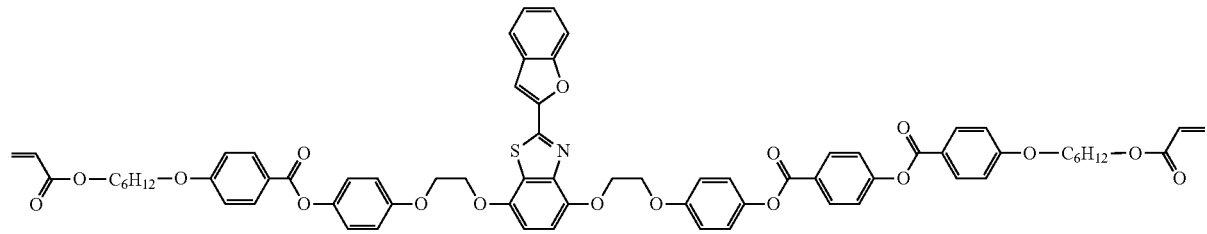
(3-1-2)
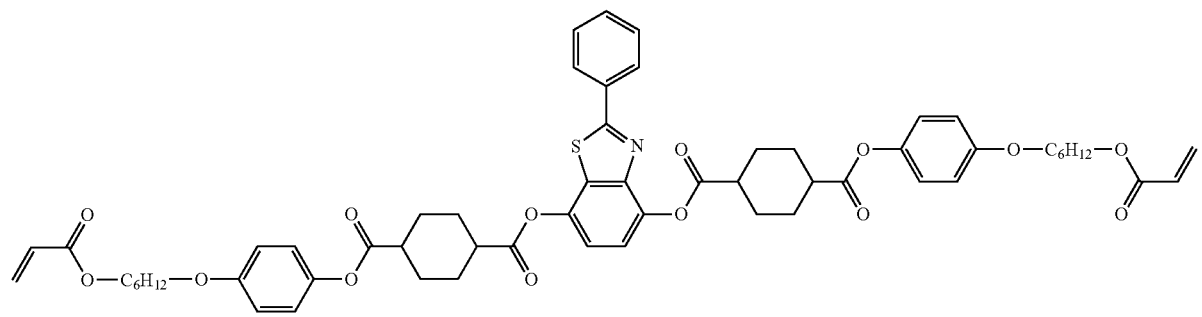
(3-1-3)
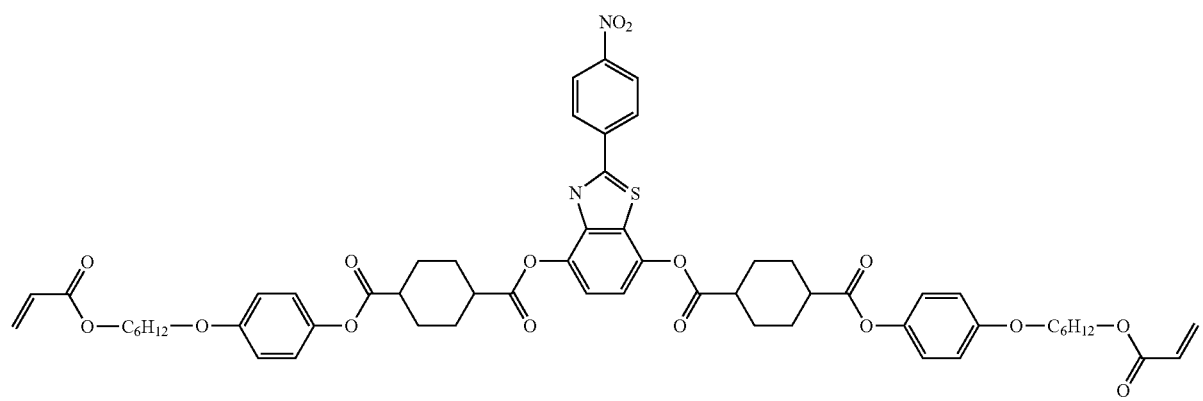
(3-1-4)
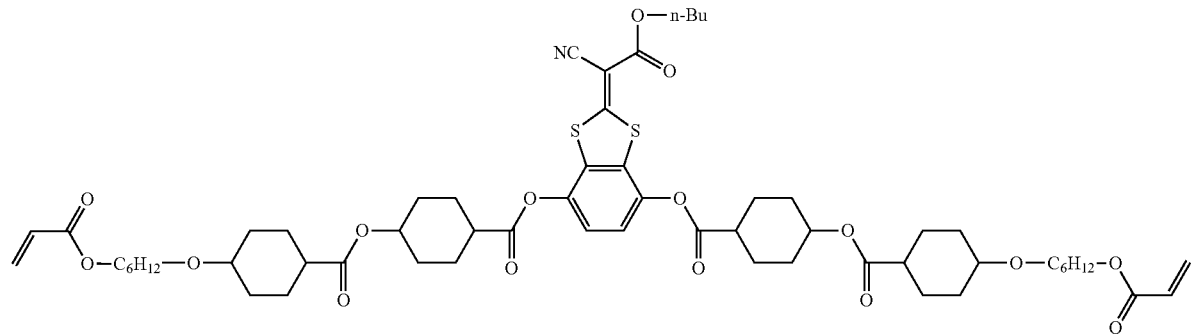

-continued (3-1-5)

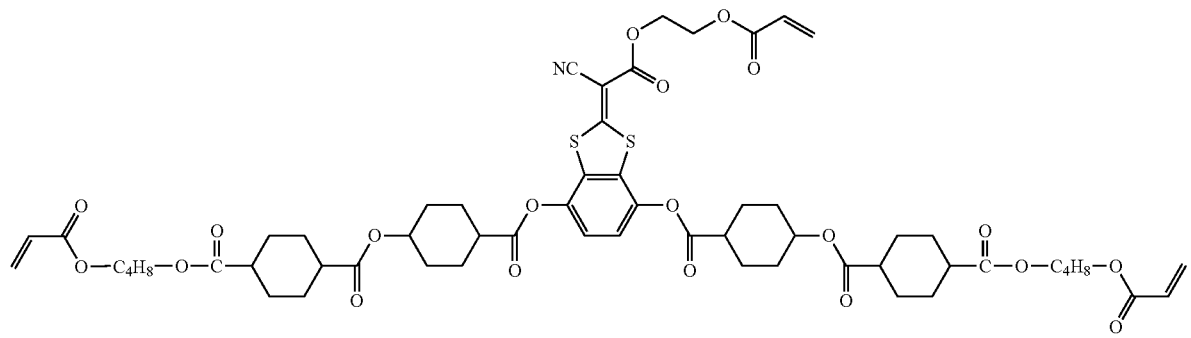

In addition, a compound represented by General Formula (3-2) other than the aforementioned compounds is exemplified.

[Chem. 25]

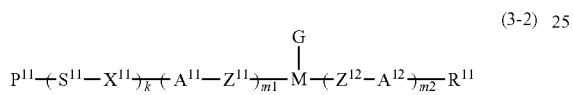

(3-2)

In the formula, $P^{11}$ represents a polymerizable group, $S^{11}$ represents a spacer group or a single bond, in the case where a plurality of $S^{11}$'s are present, they may be the same as or different from each other, $X^{11}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond, in the case where a plurality of $X^{11}$'s are present, they may be the same as or different from each other (however, $P^{11}$—($S^{11}$—$X^{11}$)$_k$— does not include —O—O— bonding), $A^{11}$ and $A^{12}$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, but these groups may be unsubstituted or substituted with one or more L's, in the case where a plurality of $A^{11}$'s and/or $A^{12}$'s are present, they may be the same as or different from each other, $Z^{11}$ and $Z^{12}$ each independently represent —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C—, or a single bond, in the case where a plurality of $Z^{11}$'s and/or $Z^{12}$'s are present, they may be the same as or different from each other, and M represents a group selected from the following Formula (M-1) to Formula (M-10).

[Chem. 26]

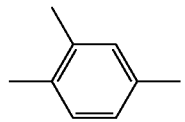
(M-1)

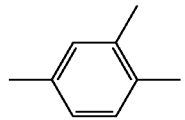
(M-2)

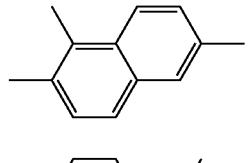
(M-3)

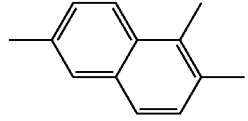
(M-4)

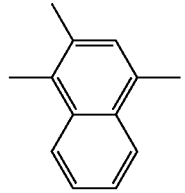
(M-5)

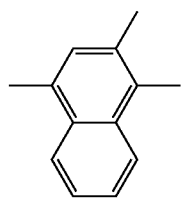
(M-6)

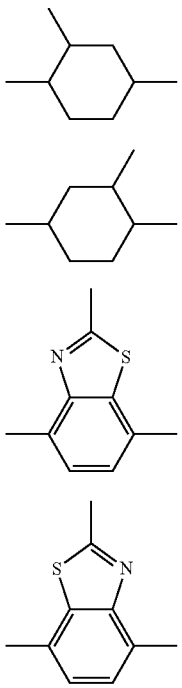

(M-7)

(M-8)

(M-9)

(M-10)

These groups may be unsubstituted or substituted with one or more L's, $R^{11}$ represents a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group having 1 to 20 carbon atoms in which one —CH$_2$— or two or more —CH$_2$— not adjacent to each other each independently may be substituted with —O—, —S—, —CO—, —COO—, —OCO—, —CO—S—, —S—CO—, —O—CO—O—, —CO—NH—, —NH—CO—, or —C≡C—, and an arbitrary hydrogen atom in the alkyl group may be substituted with a fluorine atom, G represents a group selected from the following Formula (G-1) or Formula (G-3):

[Chem. 27]

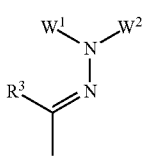

(G-1)

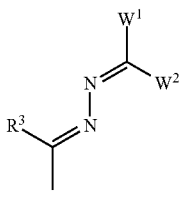

(G-2)

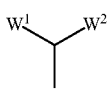

(G-3)

(In the formulas, $R^3$ represents a hydrogen atom or a linear or branched alkyl group having 1 to 20 carbon atoms in which one —CH$_2$— or two or more —CH$_2$— not adjacent to each other each independently may be substituted with —O—, —S—, —CO—, —COO—, —OCO—, —CO—S—, —S—CO—, —O—CO—O—, —CO—NH—, —NH—CO—, or —C≡C—, and an arbitrary hydrogen atom in the alkyl group may be substituted with a fluorine atom, $W^1$ represents a group having 6 to 30 carbon atoms having at least one aromatic group, but the group may be unsubstituted or substituted with one or more L's, $W^2$ represents a hydrogen atom or a linear or branched alkyl group having 1 to 20 carbon atoms in which one —CH$_2$— or two or more —CH$_2$— not adjacent to each other each independently may be substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and an arbitrary hydrogen atom in the alkyl group may be substituted with a fluorine atom, or $W^2$ may represent the same as $W^1$, or $W^1$ and $W^2$ together may form a ring structure), an arbitrary hydrogen atom in the alkyl group may be substituted with a fluorine atom, k represents an integer of 0 to 8, m1 and m2 each independently represent an integer of 0 to 5, with the proviso that the total number of m1 and m2 is an integer of 1 to 5, and L represents a fluorine atom, a chlorine atom, a bromine atom, an iodine atom, a pentafluorosulfuranyl group, a nitro group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, but the alkyl group may be linear or branched, an arbitrary hydrogen atom may be substituted with a fluorine atom, one —CH$_2$— or two or more —CH$_2$— not adjacent to each other in the alkyl group each independently may be substituted with a group selected from —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, but in the case where a plurality of L's are present in the compound, they may be the same as or different from each other.

In General Formula (3-2), $P^{11}$ preferably represents a group selected from the following Formula (P-1) to Formula (P-20).

[Chem. 28]

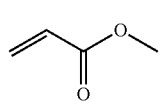

(P-1)

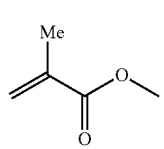

(P-2)

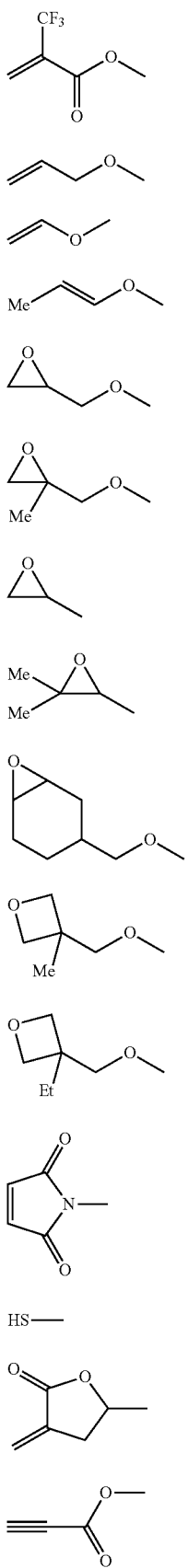
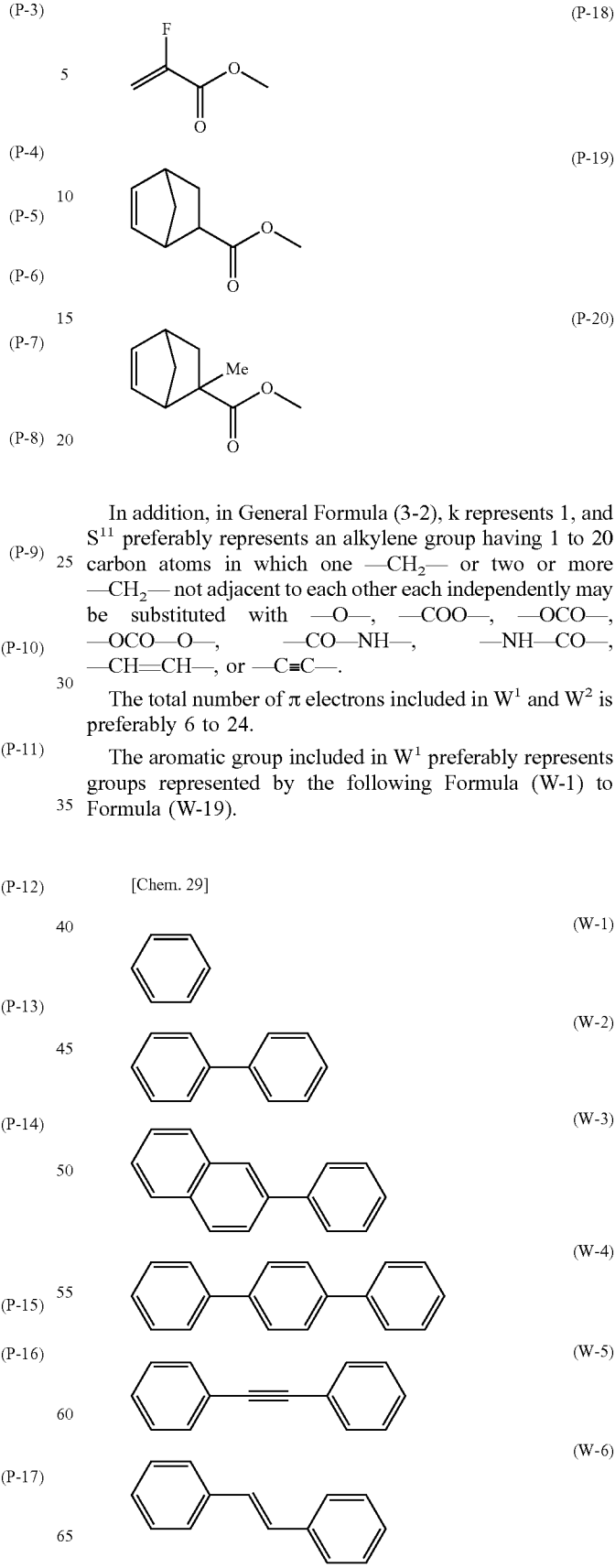

In addition, in General Formula (3-2), k represents 1, and $S^{11}$ preferably represents an alkylene group having 1 to 20 carbon atoms in which one —$CH_2$— or two or more —$CH_2$— not adjacent to each other each independently may be substituted with —O—, —COO—, —OCO—, —OCO—O—, —CO—NH—, —NH—CO—, —CH=CH—, or —C≡C—.

The total number of π electrons included in $W^1$ and $W^2$ is preferably 6 to 24.

The aromatic group included in $W^1$ preferably represents groups represented by the following Formula (W-1) to Formula (W-19).

[Chem. 29]

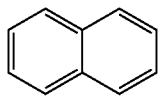 (W-7)

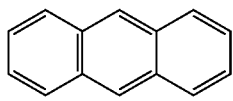 (W-8)

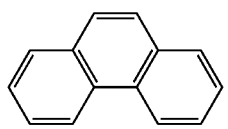 (W-9)

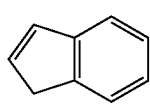 (W-10)

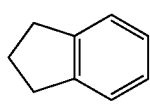 (W-11)

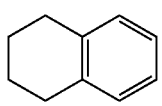 (W-12)

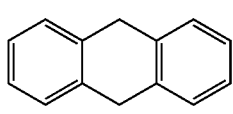 (W-13)

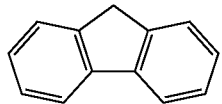 (W-14)

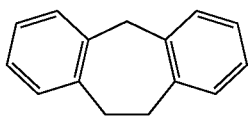 (W-15)

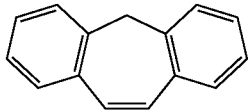 (W-16)

(W-17)

 (W-18)

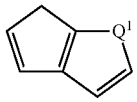 (W-19)

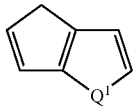

In the formulas, these groups may have a valence bond on an arbitrary position, and $Q^1$ represents —O—, —S—, —NR$^3$— (where R$^3$ represents a hydrogen atom or an alkyl group having 1 to 8 carbon atoms), or —CO—. —CH= in these aromatic groups each independently may be substituted with —N=, —CH$_2$— each independently may be substituted with —O—, —S—, —NR$^4$— where R$^4$ represents a hydrogen atom or an alkyl group having 1 to 8 carbon atoms), or —CO—, without forming a —O—O— bonding. Also, these aromatic groups may be unsubstituted or substituted with one or more L's, and may form a group in which two or more aromatic groups selected from these groups are linked by a single bond.

Exemplary compounds represented by General Formula (3-2) are shown below, but the exemplary compounds are not limited to these.

[Chem. 30]

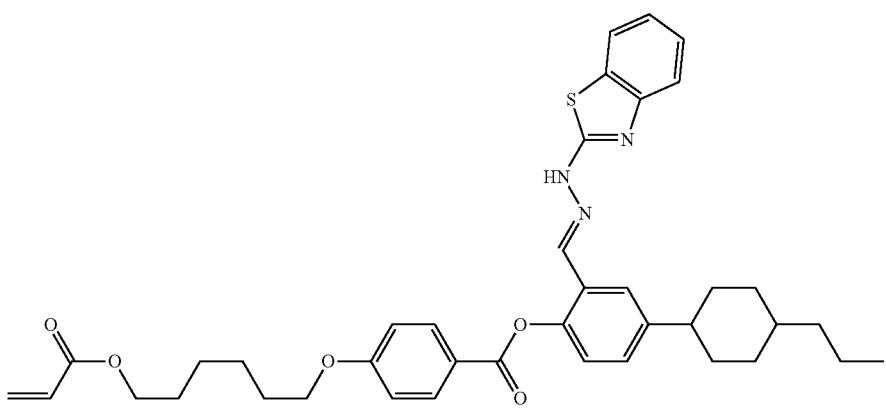 (3-2-1)

[Chem. 31]

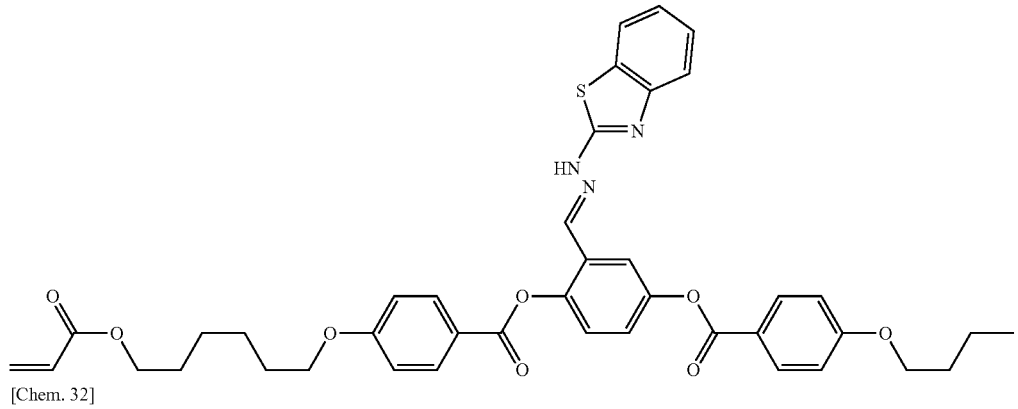

(3-2-2)

[Chem. 32]

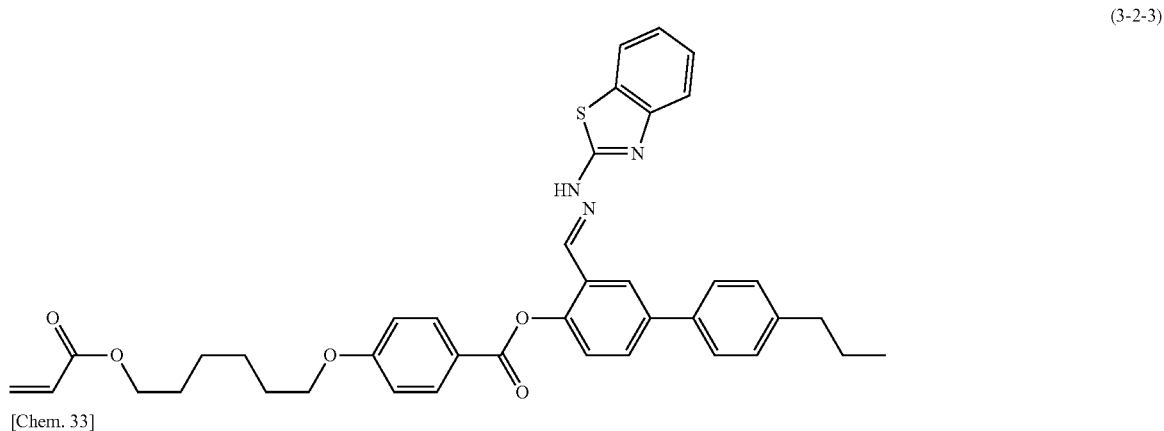

(3-2-3)

[Chem. 33]

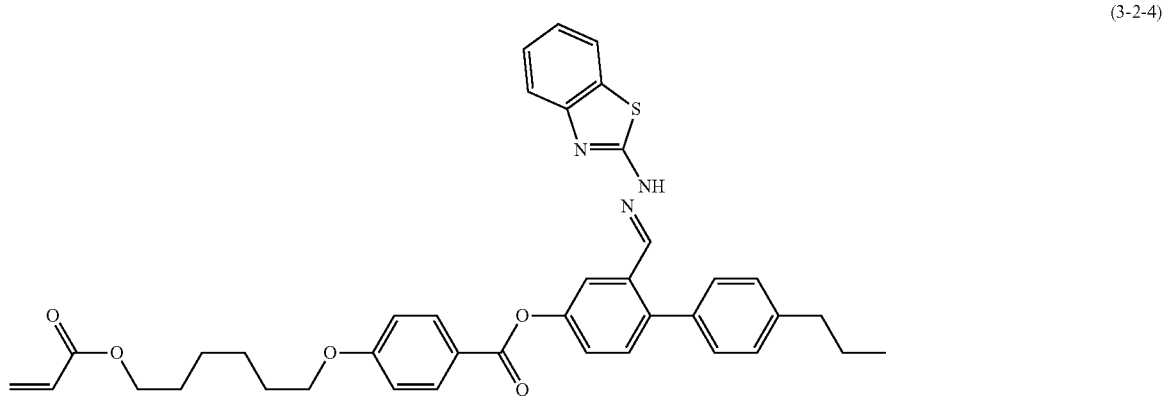

(3-2-4)

In addition, in the same manner, a compound represented by General Formula (3-3) is exemplified.

(3-3)

In the formula, $P^{21}$ and $P^{22}$ each independently represent a polymerizable group, $S^{21}$ and $S^{22}$ each independently represent a spacer group or a single bond, but in the case where a plurality of $S^{21}$'s and $S^{22}$'s are present, each of them may be the same as or different from each other, $X^{21}$ and $X^{22}$ each independently represent —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond, but in the case where a plurality of $X^{21}$'s and $X^{22}$'s are present, each of them may be the same as or different from each other (however, —O—O— is not included in each P—(S—X)— bonding), MG²¹ represents a mesogenic group, and m2 and n2 each independently represent an integer of 0 to 5.

The mesogenic group MG²¹ is preferably a group represented by Formula (8-a).

[Chem. 34]

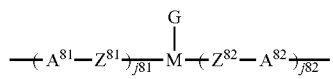
(8-a)

In the formula, A⁸¹ and A⁸² each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, but these groups may be unsubstituted or substituted with one or more L's, in the case where a plurality of A⁸¹'s and/or A⁸²'s are present, each of them may be the same as or different from each other, Z⁸¹ and Z⁸² each independently represent —O—, —S—, —OCH₂—, —CH₂O—, —CH₂CH₂—, —CO—, —COO—, —OCO—, —CO—S—, —S—CO—, —O—CO—O—, —CO—NH—, —NH—CO—, —SCH₂—, —CH₂S—, —CF₂O—, —OCF₂—, —CF₂S—, —SCF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—, —N=CH—, —CH=N—N=CH—, —CF=CF—, —C≡C—, or a single bond, but in the case where a plurality of Z⁸¹'s and/or Z⁸²'s are present, each of them may be the same as or different from each other, and M represents groups selected from the following Formula (M-1) to Formula (M-8).

[Chem. 35]

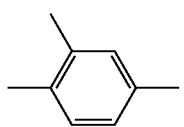
(M-1)

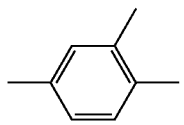
(M-2)

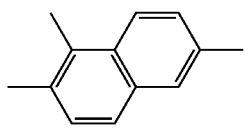
(M-3)

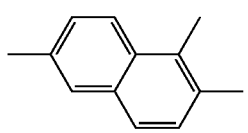
(M-4)

-continued

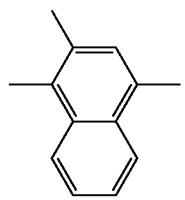
(M-5)

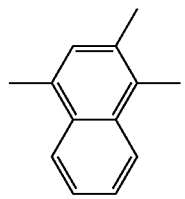
(M-6)

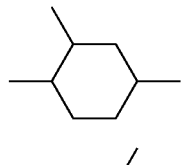
(M-7)

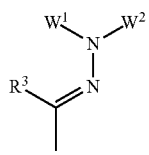
(M-8)

These groups may be unsubstituted or substituted with one or more L's,

G represents a group selected from the following Formula (G-1) or Formula (G-2):

[Chem. 36]

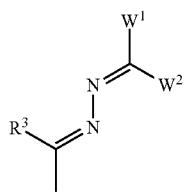
(G-1)

(G-2)

(In the formulas, R³ represents a hydrogen atom or an alkyl group having 1 to 20 carbon atoms, the alkyl group may be linear or branched, an arbitrary hydrogen atom in the alkyl group may be substituted with a fluorine atom, one —CH₂— or two or more —CH₂— not adjacent to each other in the alkyl group each independently may be substituted with —O—, —S—, —CO—, —COO—, —OCO—, —CO—S—, —S—CO—, —O—CO—O—, —CO—NH—, —NH—CO—, or —C≡C—, W¹ represents a group having 2 to 30 carbon atoms having at least one aromatic group, but the group may be unsubstituted or substituted with one or more L's, W² represents a hydrogen atom or an alkyl group having 1 to 20 carbon atoms, but the alkyl group may be linear or branched, an arbitrary hydrogen atom in the alkyl group may be substituted with a fluorine atom, one —CH₂— or two or more —CH₂— not adjacent to each other in the alkyl group each independently may be substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, or W² and W¹ may represent the same, or W¹ and W² may be linked to each other to form the same ring structure), L represents a fluorine atom, a chlorine atom, a bromine atom, an iodine atom, a pentafluorosulfuranyl group, a nitro group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, but the alkyl group may be linear or branched, an arbitrary hydrogen atom may be substituted with a fluorine atom, one —CH₂— or two or more —CH₂— not adjacent to each other in the alkyl group each independently may be substituted with a group selected from —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, in the case where a plurality of L's are present in the compound, they may be the same as or different from each other, and j81 and j82 each independently represent, an integer of 0 to 5, with the proviso that the total number of j81 and j82 is an integer of 1 to 5.

The polymerizable groups P²¹ and P²² each independently represent groups represented by General Formulas (P-1) to (P-20).

[Chem. 37]

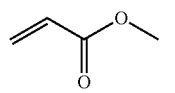

(P-1)

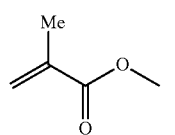

(P-2)

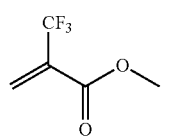

(P-3)

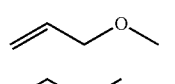

(P-4)

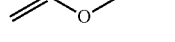

(P-5)

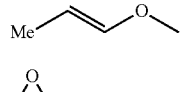

(P-6)

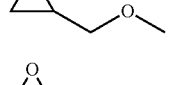

(P-7)

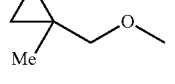

(P-8)

-continued

(P-9)

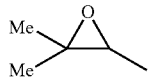

(P-10)

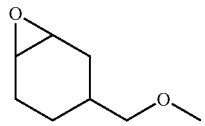

(P-11)

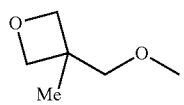

(P-12)

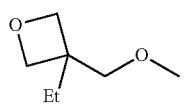

(P-13)

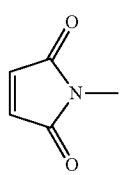

(P-14)

HS—

(P-15)

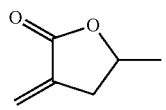

(P-16)

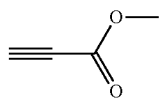

(P-17)

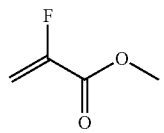

(P-18)

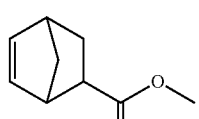

(P-19)

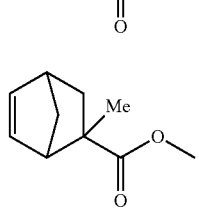

(P-20)

Exemplary compounds represented by General Formula (3-3) are shown below, but the exemplary compounds are not limited to these.

[Chem. 38]
(3-3-1)
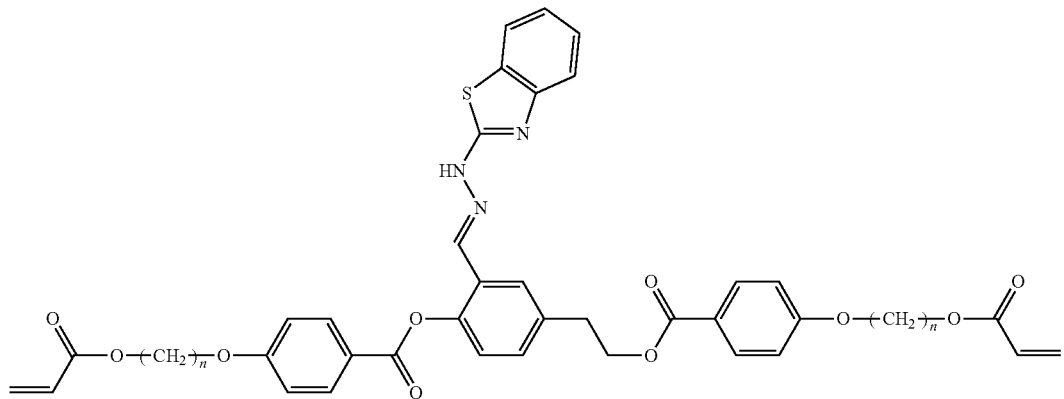
[Chem. 39]
(3-3-2)
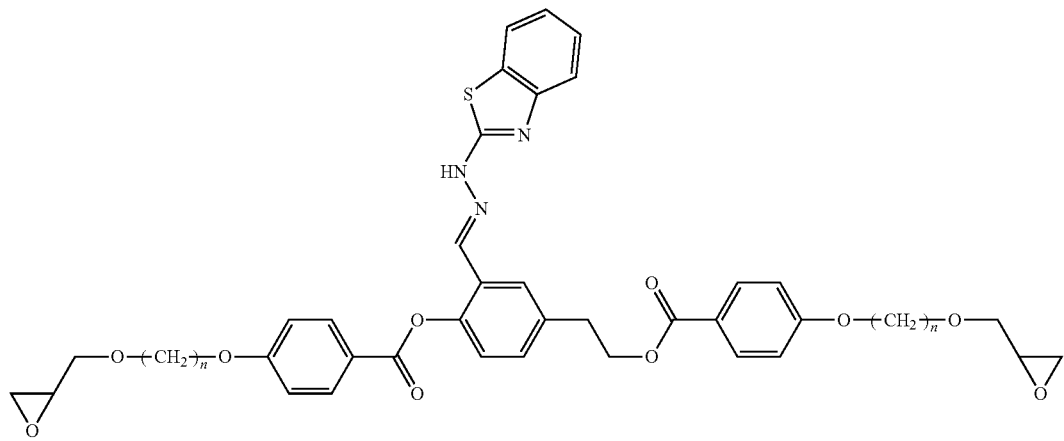
[Chem. 40]
(3-3-3)
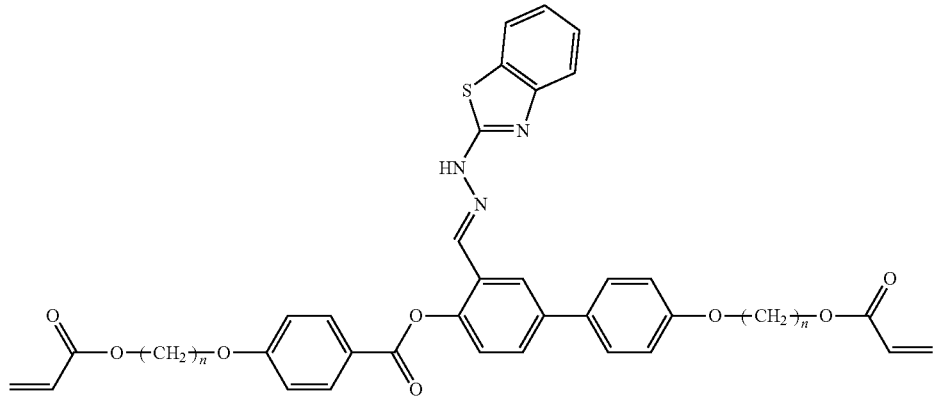

[Chem. 41]
(3-3-4)
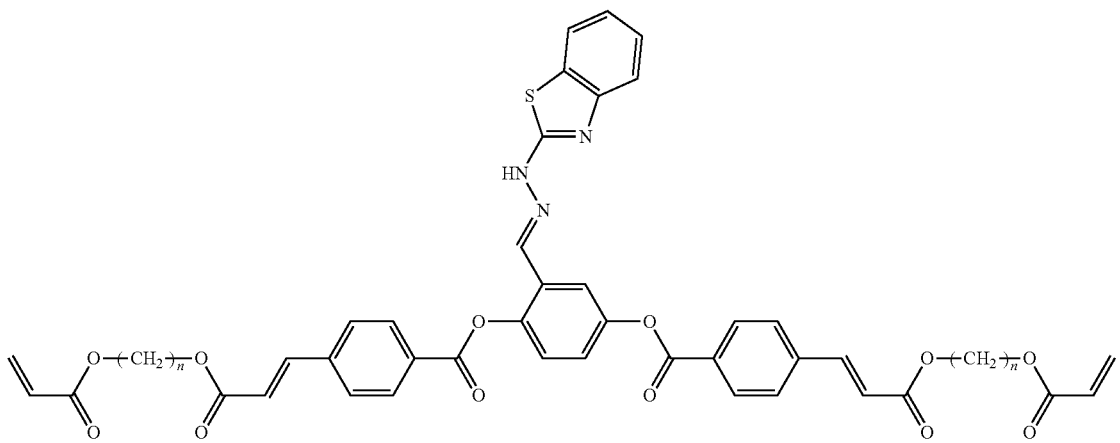
[Chem. 42]
(3-3-5)
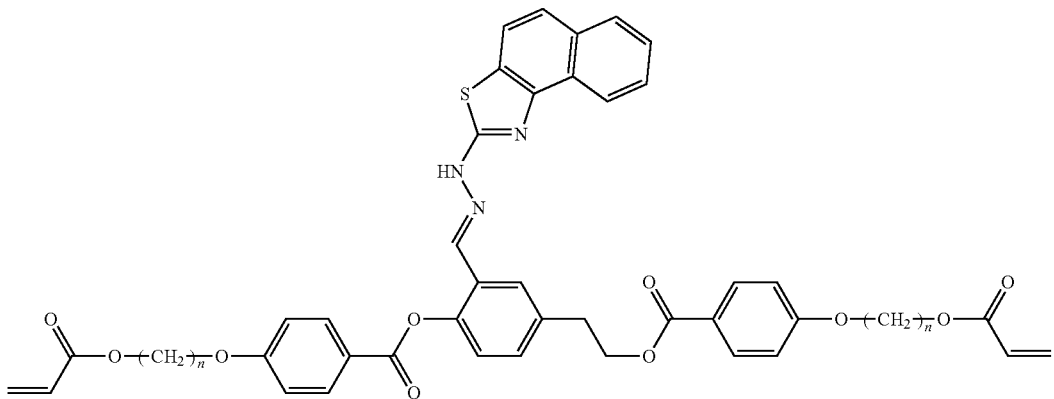
[Chem. 43]
(3-3-6)
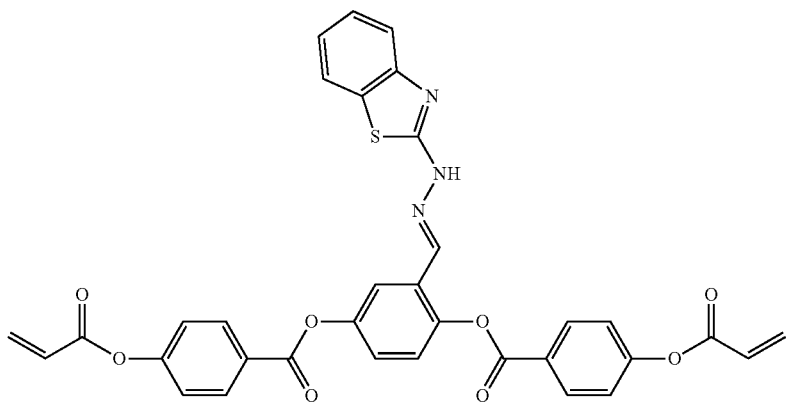

[Chem. 44]
(3-3-7)
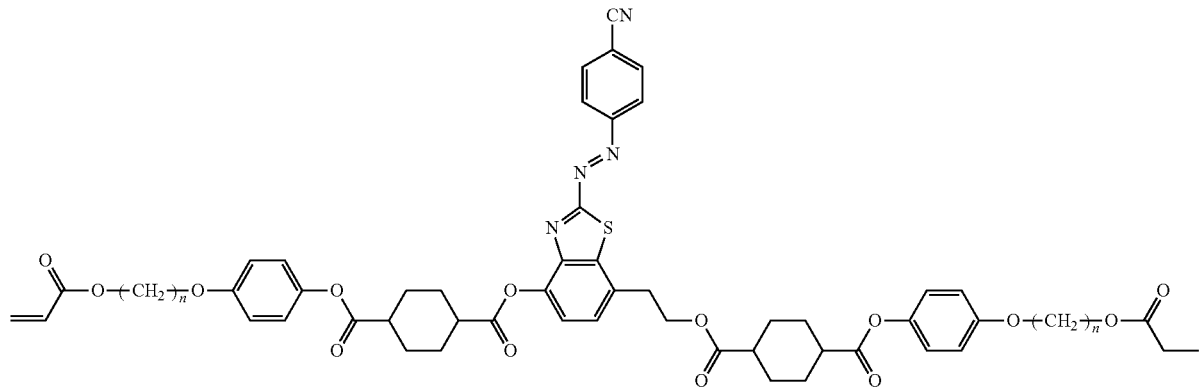
[Chem. 45]
(3-3-8)
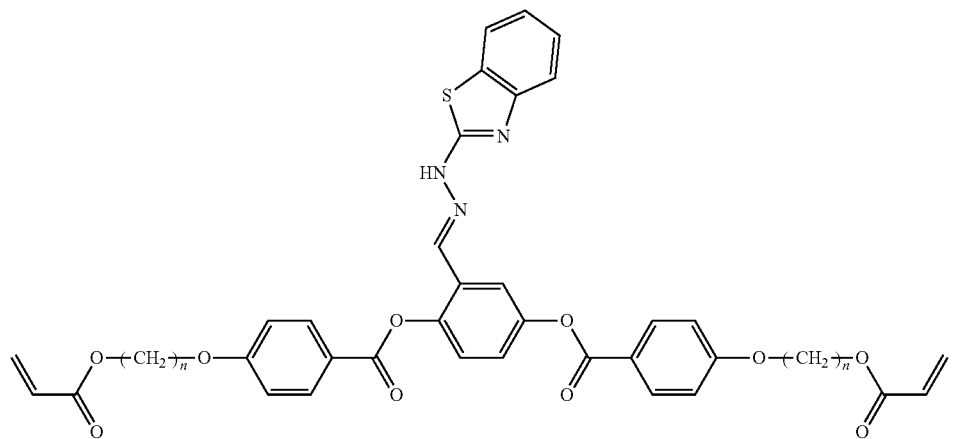
[Chem. 46]
(3-3-9)
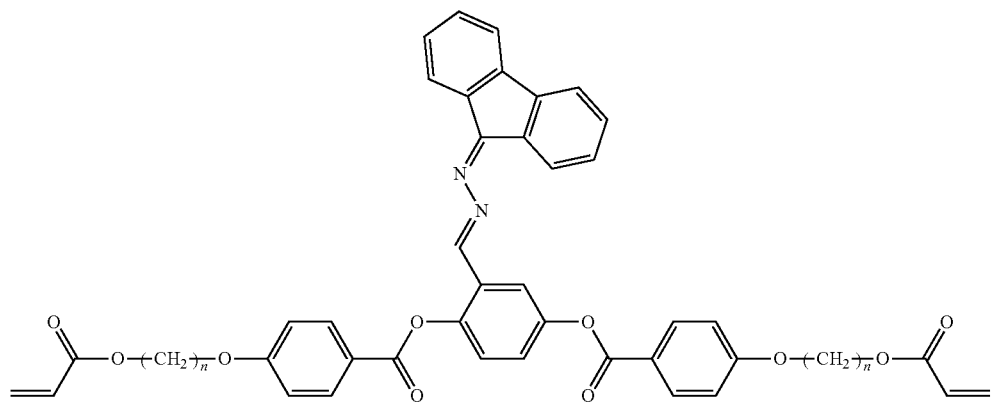

These liquid crystal compounds may be used alone or two or more thereof may be used in combination. In addition, monofunctional compounds represented by General Formula (1-1) and General Formula (1-2) and having one polymerizable functional group in a molecule, a bifunctional compound represented by General Formula (2-1) and having two polymerizable functional groups in a molecule, polyfunctional compounds represented by General Formula (4-1) to General Formula (4-7) shown below and having three or more polymerizable functional groups in a molecule can be used in combination.

The total content of the compounds represented by General Formulas (3-1), (3-2), and (3-3) is preferably 10 to 100% by mass, more preferably 20 to 100% by mass, and particularly preferably 30 to 100% by mass with respect to the total content of the polymerizable composition.

Among the compounds represented by General Formula (1), the following exemplary compound can be mentioned as the polyfunctional compound having three or more polymerizable functional groups in a molecule.

[Chem. 47]

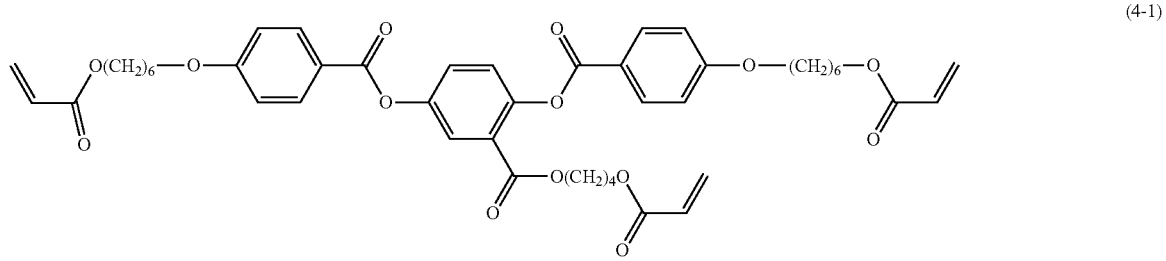

(4-1)

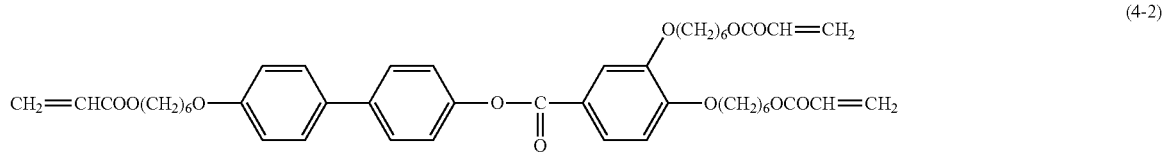

(4-2)

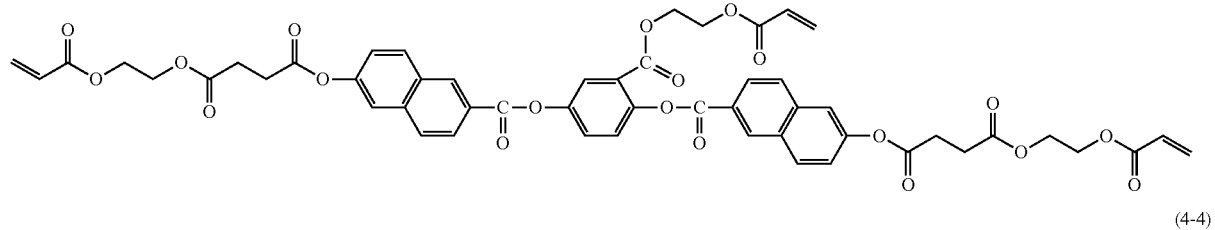

(4-3)

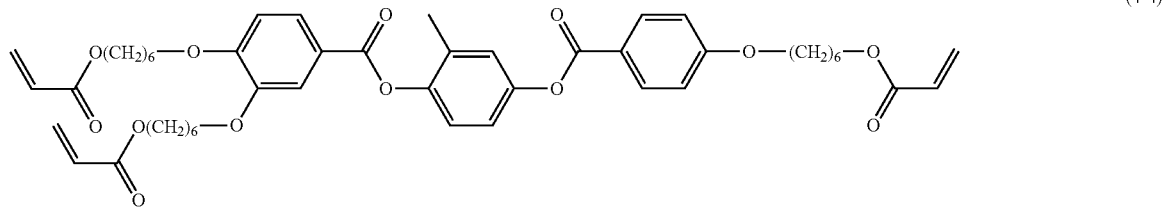

(4-4)

[Chem. 48]

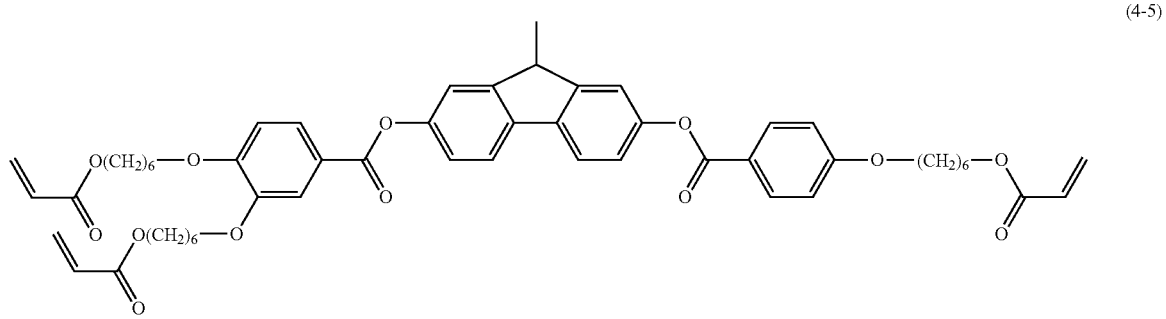

(4-5)

(4-6)

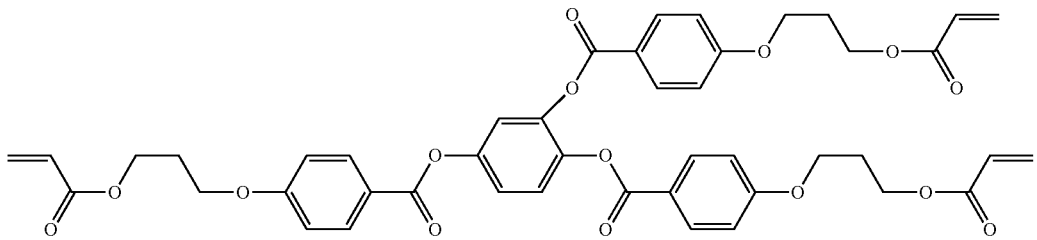

(4-7)

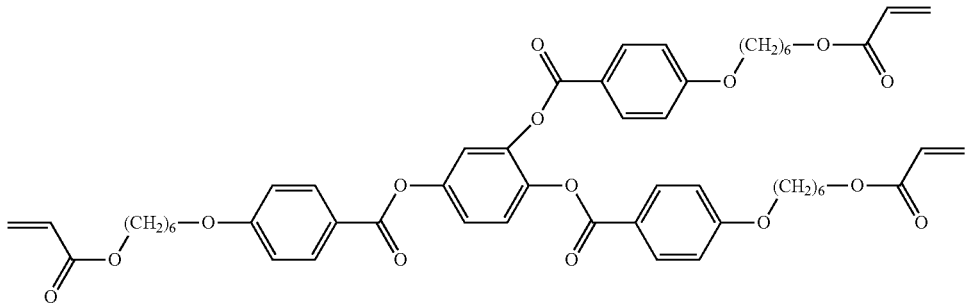

The total content of the polyfunctional compound having three or more polymerizable functional groups in a molecule is preferably 0 to 30% by mass, more preferably 0 to 25% by mass, and particularly preferably 0 to 20% by mass with respect to the total content of the polymerizable composition.

In addition, a compound containing a mesogenic group and not having a polymerization group may be added to the liquid crystal composition of the present invention, and a common compound used for a liquid crystal device such as STN (Super Twisted Nematic) liquid crystal, TN (Twisted Nematic) liquid crystal, and TFT (Thin Film Transistor) liquid crystal is exemplified.

Specifically, the compound containing a mesogenic group and not having a polymerizable functional group is preferably a compound represented by the following General Formula (5).

[Chem. 49]

$$R^1\text{-MG-}R^1 \quad (5)$$

As the mesogenic group represented by MG, a compound represented by General Formula (5-b) is exemplified.

[Chem. 50]

$$-Z0\text{-}(A1\text{-}Z1)_n\text{-}A2\text{-}Z2\text{-}A3\text{-}Z3- \quad (5\text{-}b)$$

In the formula, A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, and may have one or more F's, Cl's, $CF_3$'s, $OCF_3$'s, CN groups, alkyl groups having 1 to 8 carbon atoms, alkoxy groups, alkanoyl groups, alkanoyloxy groups, alkenyl groups having 2 to 8 carbon atoms, alkenyloxy groups, alkenoyl groups, or alkenoyloxy groups as a substituent, Z0, Z1, Z2, and Z3 each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2$COO—, —$CH_2CH_2$OCO—, —COO$CH_2CH_2$—, —OCO$CH_2CH_2$—, —CONH—, —NHCO—, an alkyl group having a halogen atom having 2 to 10 carbon atoms, or a single bond, n represents 0, 1, or 2, $R^1$ represents a hydrogen atom, a halogen atom, a cyano group, or an alkyl group having 1 to 18 carbon atoms, but the alkyl group may be substituted with one or more halogen atoms or CN's, and one $CH_2$ group or two or more $CH_2$ groups not adjacent to each other present in this group each independently may be substituted with —O—, —S—, —NH—, —N($CH_3$)—, —CO—, —COO—, —OCO—, —OCOO—, —SCO—, —COS—, or —C≡C— as long as oxygen atoms are not directly bonded to each other.

Specific compounds thereof are shown below, and the compounds are not limited to these.

[Chem. 51]

(5-1)

(5-2)

-continued (5-3)

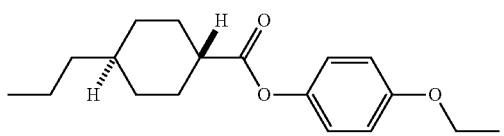

(Other Components)
(Chiral Compound)

A chiral compound may be blended in the polymerizable liquid crystal composition of the present invention, for the purpose of obtaining a chiral nematic phase. Among the chiral compounds, a compound having a polymerizable functional group in a molecule is particularly preferable.

As the polymerizable functional group in the chiral compound, an acryloyloxy group is particularly preferable. It is necessary to appropriately adjust the blending amount of the chiral compound depending on a spiral induction force of the compound, but the blending amount is preferably 0 to 85% by mass, more preferably 0 to 80% by mass, and particularly preferably 0 to 75% by mass with respect to the total amount of the chiral compound and the polymerizable compound to be used.

Specific examples of the chiral compound include compounds of Formulas (6-1) to (6-8).

[Chem. 52]

(6-1)

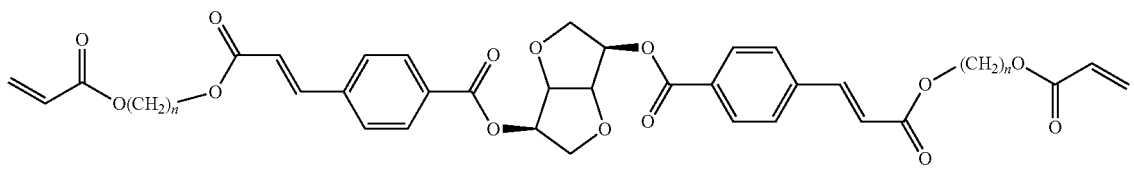

(6-2)

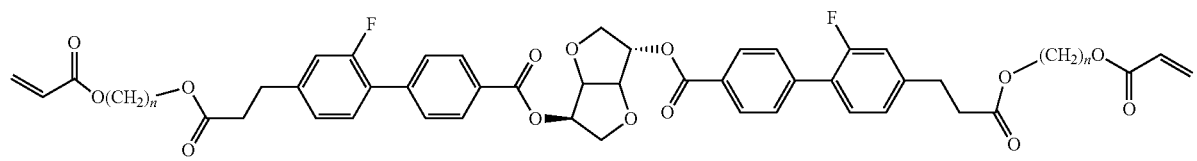

(6-3)

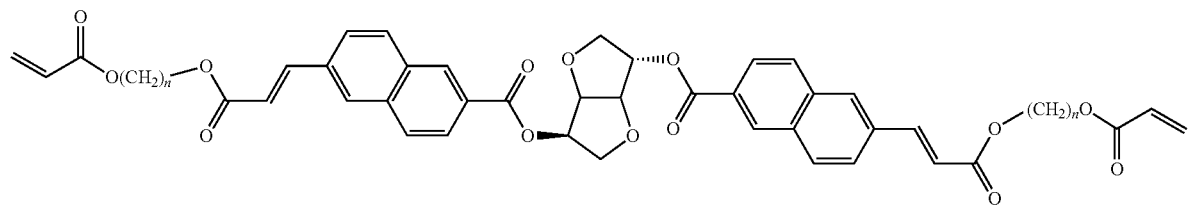

(6-4)

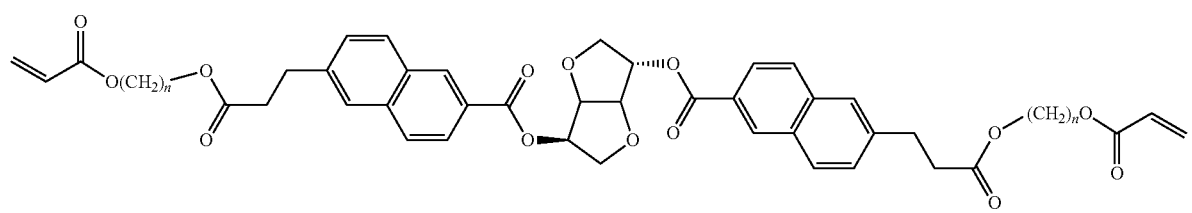

(6-5)

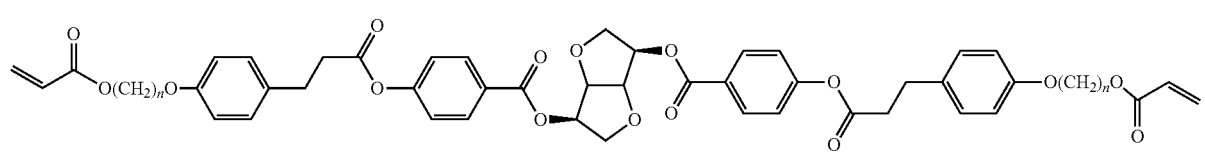

(6-6)

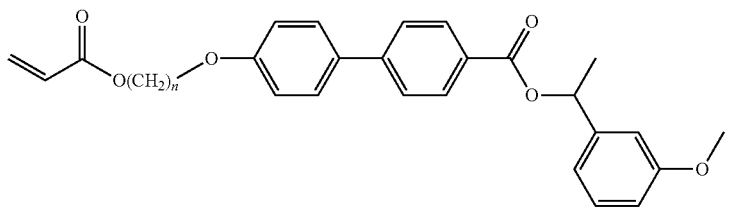

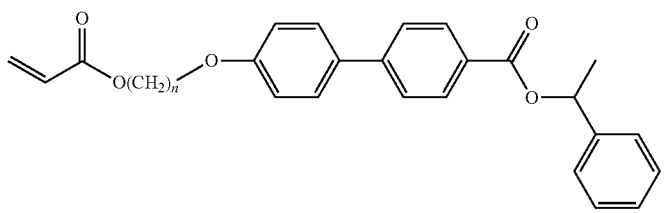

(6-7)

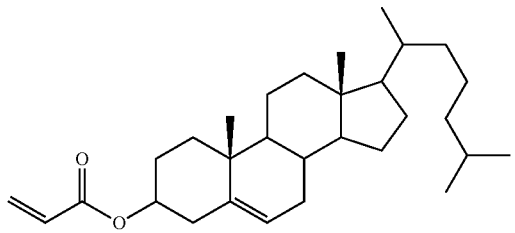

(6-8)

In the formulas, n represents an integer of 2 to 12.

In addition, specific examples of the chiral compound further include compounds of Formulas (6-9) to (6-12).

[Chem. 53]

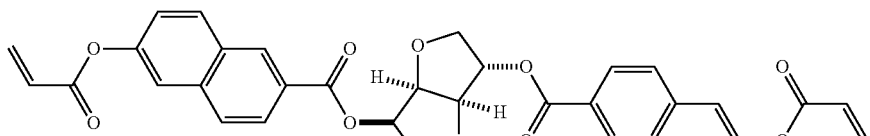

(6-9)

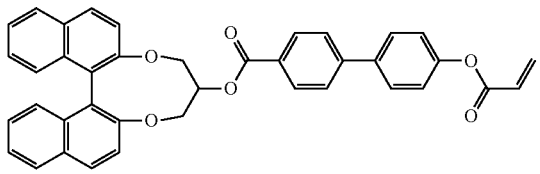

(6-10)

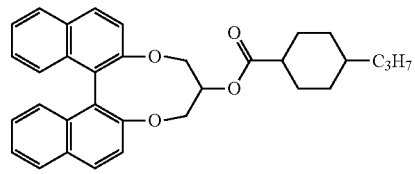

(6-11)

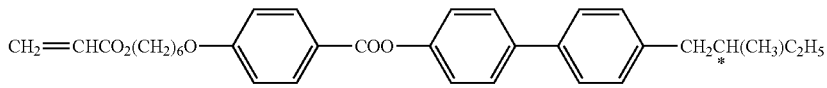

(6-12)

(Organic Solvent)

An organic solvent used in the polymerizable liquid crystal composition of the present invention is not particularly limited, an organic solvent in which the polymerizable compound to be used exhibits satisfactory solubility is preferable, and an organic solvent which can be dried at a temperature of 100° C. or lower is preferable. Examples of the solvent include aromatic hydrocarbon such as toluene, xylene, cumene, and mesitylene, an ester-based solvent such as methyl acetate, ethyl acetate, propyl acetate, and butyl acetate, a ketone-based solvent, such as methyl ethyl ketone, methyl isobutyl ketone, cyclohexnone, and cyclopentanone, an ether-based solvent such as tetrahydrofuran, 1,2-dimethoxyethane, and anisole, an amide-based solvent such as N,N-dimethylformamide and N-methyl-2-pyrrolidone, propylene glycol monomethyl ether acetate, diethylene glycol monomethyl ether acetate, γ-butyrolactone, and chlorobenzene. These may be used alone or two or more thereof may be used in combination, but it is preferable to use at least one of the ketone-based solvent, the ether-based solvent, the ester-based solvent, and aromatic hydrocarbon, from a viewpoint of solution stability.

The ratio of the organic solvent to be used is not particularly limited, as long as the solvent does not considerably impair the applied state of the polymerizable liquid crystal composition because the composition used in the present invention is normally applied. However, the content of the polymerizable compound included in the polymerizable liquid crystal composition is preferably 1 to 60% by mass, more preferably 3 to 55% by mass, and particularly preferably 5 to 50% by mass.

When the polymerizable compound is dissolved in an organic solvent, the compound is preferably heated and stirred in order to dissolve the compound uniformly. The heating temperature at the time of heating and stirring may be appropriately adjusted in consideration of solubility of the polymerizable compound to be used in an organic solvent, and the heating temperature is preferably 15° C. to 110° C., more preferably 15° C. to 105° C., still more preferably 15° C. to 100° C., and particularly preferably 20° C. to 90° C. from a viewpoint of productivity.

In addition, when the polymerizable liquid crystal composition is prepared, the composition is preferably stirred and mixed by a dispersion stirrer. As specific examples of the dispersion stirrer, a disperser having an impeller such as a disper, propeller, and turbine blade, a paint shaker, a planetary type stirrer, a shaking apparatus, a shaker, or rotary evaporator can be used. In addition to the above, an ultrasonic irradiation apparatus can be used.

It is preferable to appropriately adjust the number of revolution depending on a stirrer to be used in preparing a polymerizable solution. However, the number of stirring revolution is preferably 10 rpm to 1,000 rpm, more preferably 50 rpm to 800 rpm, and particularly preferably 150 rpm to 600 rpm, in order to obtain a uniform polymerizable solution.

(Polymerization Inhibitor and Antioxidant)

A polymerization inhibitor and/or an antioxidant are preferably added to the polymerizable liquid crystal composition in order to increase solution stability of the polymerizable liquid crystal composition of the present invention. Examples of such a compound include a hydroquinone derivative, a nitrosamine-based polymerization inhibitor, and a hindered phenol-based antioxidant and specific examples thereof include p-methoxyphenol, tert-butyl hydroquinone, methyl hydroquinone, "Q-1300" and "Q-1301" of Wako Pure Chemical Industries, Ltd., and "IRGANOX 1010", "IRGANOX 1035", "IRGANOX 1076", "IRGANOX 1098", "IRGANOX 1135", "IRGANOX 1330", "IRGANOX 1425", "IRGANOX 1520", "IRGANOX 1726", "IRGANOX 245", "IRGANOX 259", "IRGANOX 3114", "IRGANOX 3790", "IRGANOX 5057", "IRGANOX 565" of BASF SE.

The addition amount of the polymerization inhibitor and the antioxidant each is preferably 0.01 to 1.0% by mass and more preferably 0.05 to 0.5% by mass with respect to the polymerizable liquid crystal composition.

(Photopolymerization Initiator)

It is preferable to include at least one type of photopolymerization initiator. Specific examples thereof include "Irgacure 651", "Irgacure 184", "Irgacure 907", "Irgacure 127", "Irgacure 369", "Irgacure 379", "Irgacure 819", "Irgacure 2959", "Irgacure OXE01", "Irgacure OXE02", "Lucirin TPO", and "Darocur 1173" of BASF SE, "Esacure 1001M", "Esacure KIP150", "Speedcure BEM", "Speedcure BMS", "Speedcure MBP", "Speedcure PBZ", "Speedcure ITX", "Speedcure DETX", "Speedcure EBD", "Speedcure MBB", and "Speedcure BP" of LAMBSON, LTD., "Kayacure DMBI" of Nippon Kayaku Co., Ltd., and "TAZ-A" of Nihon Siberhegner K. K. (currently, DKSH Japan K.K.).

The use amount of the photopolymerization initiator is preferably 0.1 to 10% by mass and particularly preferably 0.5 to 5% by mass with respect to the polymerizable solution. These may be used alone or two or more types thereof may be used in combination. Also, a sensitizer or the like may be added.

(Thermal Polymerization Initiator)

A thermal polymerization initiator may be used in combination with the photopolymerization initiator in the polymerizable liquid crystal composition of the present invention. Specific examples thereof include "V-40" and "VF-096" manufactured by Wako Pure Chemical Industries, Ltd. and "Perhexyl D" and "Perhexyl I" manufactured by NOF corporation.

The use amount of the thermal polymerization initiator is preferably 0.1 to 10% by mass and particularly preferably 0.5 to 5% by mass with respect to the polymerizable liquid crystal composition. These may be used alone or two or more types thereof may be used in combination.

(Surfactant)

The polymerizable liquid crystal composition of the present invention may include at least one surfactant in order to reduce unevenness of the film thickness when the composition is made into an optically anisotropic body. Examples of the surfactant, which can be included include alkyl carboxylate, alkyl phosphate, alkyl sulfonate, fluoroalkyl carboxylate, fluoroalkyl phosphate, fluoroalkyl sulfonate, a polyoxyethylene derivative, a fluoroalkyl ethylene oxide derivative, a polyethylene glycol derivative, an alkyl ammonium salt, and a fluoroalkyl ammonium salt, with a fluorine-containing surfactant being particularly preferable. Further specific examples thereof include "Megaface F-251", "Megaface F-444", "Megaface F-477", "Megaface F-510", "Megaface F-552", "Megaface F-553", "Megaface F-554", "Megaface F-555", "Megaface F-558", "Megaface F-560", "Megaface F-561", "Megaface F-563", "Megaface F-569", "Megaface F-570", "Megaface R-40", "Megaface R-41", "Megaface R-43", "Megaface R-94", "Megaface RS-72-K", "Megaface RS-75", "Megaface RS-76-E", and "Megaface RS-90", (the above are manufactured by DIC Corporation), BYK-3440 (the above are manufactured by BYK Japan K.K.), "N215", "N535", "N605K", and "N935" (the above are manufactured by Solvay Solexis K.K.), EFKA-3277, EFKA-3500, EFKA-3600, and EFKA-3777 (the above are manufactured by Lamberti Co.).

The addition amount of the surfactant is preferably 0.01 to 2% by mass and more preferably 0.05 to 0.5% by mass with respect to the polymerizable liquid crystal composition.

The polymerizable liquid crystal composition of the present invention can include at least one compound having a weight average molecular weight of 100 or more and a repeating unit represented by the following General Formula (7), in order to effectively reduce a tilt angle of an air interface when the composition is made into an optically anisotropic body.

[Chem. 54]

(7)

In the formula, $R^{11}$, $R^{12}$, $R^{13}$, and $R^{14}$ each independently represent a hydrogen atom, a halogen atom, or a hydrocarbon group having 1 to 20 carbon atoms, and a hydrogen atom in the hydrocarbon group may be substituted with one or more halogen atoms.

Preferred examples of the compound represented by General Formula (7) include polyethylene, polypropylene, polyisobutylene, paraffin, liquid paraffin, chlorinated polypropylene, chlorinated paraffin, and chlorinated liquid paraffin.

The compound represented by General Formula (7) is preferably added in the step of mixing the polymerizable compound with an organic solvent, heating, and stirring to prepare a polymerizable solution, but the compound may be added in the step of mixing the photopolymerization initiator to the polymerizable solution after that, or may be added in both steps.

The addition amount of the compound represented by General Formula (7) is preferably 0.01 to 1% by mass and more preferably 0.05 to 0.5% by mass with respect to the polymerizable solution.

A chain-transfer agent is preferably added to the polymerizable composition solution of the present invention, in order to improve adhesion to the base material when the polymerizable composition solution is made into an optically anisotropic body. As the chain-transfer agent, a thiol compound is preferable, monothiol, dithiol, trithiol, and tetrathiol compounds are more preferable, and a trithiol compound is still more preferable. Specifically, compounds represented by the following General Formulas (7-1) to (7-12) are preferable.

sulfur atom, —CO—, —OCO—, —COO—, or —C=CH— as long as an oxygen atom and a sulfur atom are not directly bonded to each other.

The chain-transfer agent is preferably added in the step of mixing the polymerizable compound with an organic solvent, heating, and stirring to prepare a polymerizable solution, but the chain-transfer agent may be added in the step

[Chem. 55]

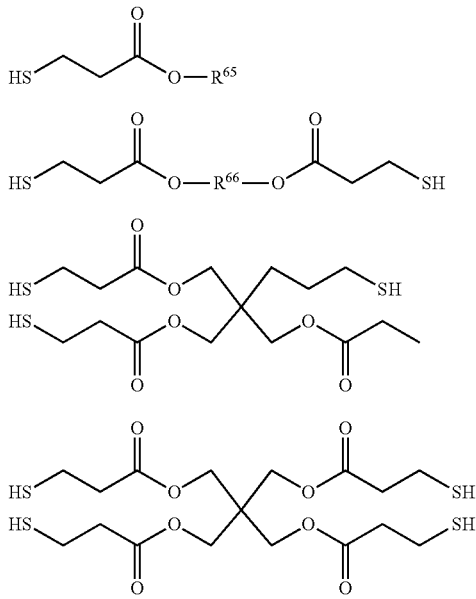

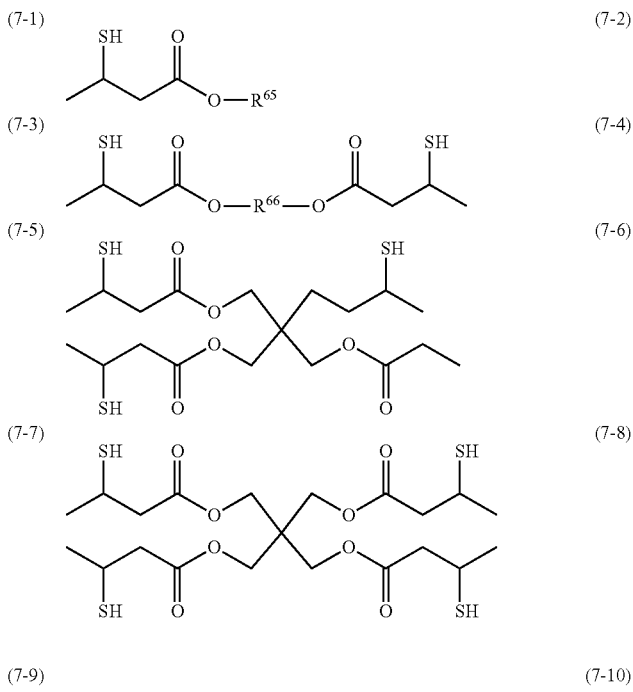

[Chem. 56]

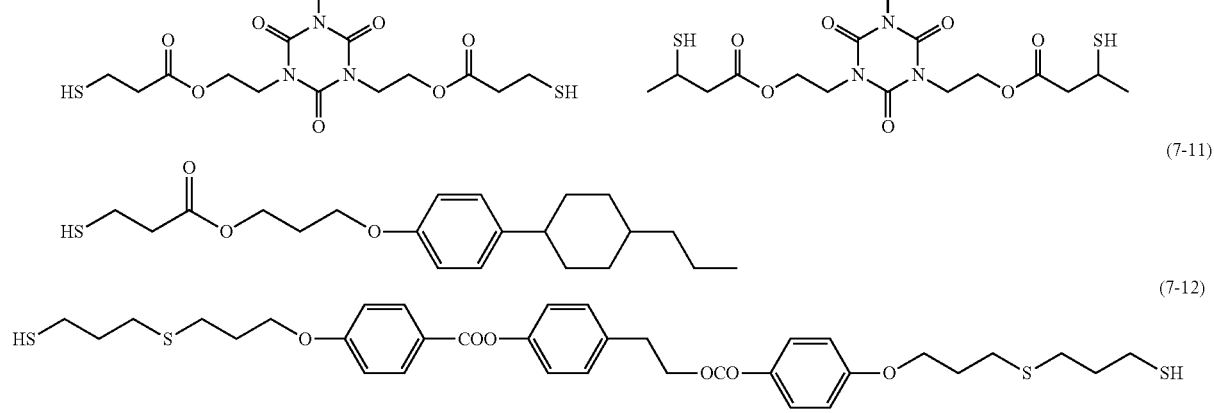

In the formulas, $R^{65}$ represents an alkyl group having 2 to 18 carbon atoms, the alkyl group may be linear or branched, one or more methylene groups in the alkyl group may be substituted with an oxygen atom, a sulfur atom, —CO—, —OCO—, —COO—, or —CH=CH— as long as an oxygen atom and a sulfur atom are not directly bonded to each other, $R^{66}$ represents an alkylene group having 2 to 18 carbon atoms, and one or more methylene groups in the alkylene group may be substituted with an oxygen atom, a of mixing the polymerization initiator to the polymerizable solution after that, or may be added in both steps.

The addition amount of the chain-transfer agent is preferably 0.5 to 10% by mass and more preferably 1.0 to 5.0% by mass with respect to the polymerizable liquid crystal composition.

Further, a non-polymerizable liquid crystal compound or a polymerizable compound having no crystallinity may be added if necessary, in order to adjust physical properties.

The polymerizable compound having no crystallinity is preferably added in the step of mixing the polymerizable compound with an organic solvent, heating, and stirring to prepare a polymerizable solution, but the non-polymerizable liquid crystal compound may be added in the step of mixing the polymerization initiator to the polymerizable solution after that, or may be added in both steps. The addition amount of these compounds is preferably 20% by mass or less, more preferably 10% by mass or less, and still more preferably 5% by mass or less with respect to the polymerizable liquid crystal composition.

Other additives, for example, a thixotropic agent, an ultraviolet ray absorbing agent, an infrared ray absorbing agent, an antioxidant, or a surface treating agent, may be added to the polymerizable mixture or the polymerizable composition of the present invention according to the purpose, to the extent that an aligning ability of the liquid crystal is not remarkably deteriorated.

(Method for Preparing, Purifying, and Filtering a Mixture and a Composition)

In the present invention, a mixture having the content of a silicon compound at a low concentration in a particular range and containing two or more types of the compound containing a mesogenic group, and a composition obtained by mixing the two or more types of the compound containing a mesogenic group in an organic solvent can be obtained by using a compound obtained by performing purification using an adsorbent other than the silicon compound such as a silica gel and mixing a particular amount of the silicon compound with the mixture or the composition, in the step of synthesizing the compound containing a mesogenic group. However, all of the compounds containing a mesogenic group to be used are necessarily purified by using an adsorbent other than the silicon compound. Here, examples of the adsorbent other than the silicon compound include alumina and activated carbon, and examples of the adsorbent of the silicon compound, include a silica gel, florisil, diatom earth, and zeolite.

In the present invention, as another method for preparing the mixture having the content of a silicon compound at a low concentration in a particular range and having two or more types of the compound containing a mesogenic group, and the composition obtained by mixing the two or more types of the compound containing a mesogenic group in an organic solvent, exemplified is a method for filtering the mixture obtained by mixing two or more types of raw material compounds containing a mesogenic group and going through the purification step using the silicon compound such as a silica gel, or the composition having the two or more types of raw material compounds containing a mesogenic group dissolved in an organic solvent, using a filter. The pore diameter of the filter is preferably 0.1 µm to 1 µm, more preferably 0.1 µm to 0.45 µm, and still more preferably 0.1 µm to 0.22 µm. The film thickness of the filter is preferably 60 µm to 100 µm. In addition, the content of the silicon compound in the mixture and the composition can be reduced by increasing the number of the filtration step from one to a plurality. For example, after filtering the mixture and composition using a filter having a pore diameter of 0.1 µm and by using the mixture or the composition obtained by filtering with the filter having a pore diameter of 0.1 µm, an optically anisotropic body having satisfactory scratch resistance and adhesion can be obtained. In addition, in the case where the composition having the raw material compounds dissolved in an organic solvent is filtered, by allowing the organic solvent to pass through the filter to be used in advance so as to cause the raw material compounds to pass through the pore easily, before performing filtration, the content of the silicon compound in the composition can be reduced effectively. Further, depending on pressurizing conditions at the time of filtration, the content of the silicon compound after the filtration can be adjusted. Therefore, the pore diameter of the filter to be used is preferably and appropriately adjusted in consideration of a purification cost and purification time, in addition to the pressurizing conditions at the time of filtration and the number of filtration.

Examples of the material of the filter include a paper, a cloth, a non-woven fabric, cellulose, nitrocellulose, ester mixed with cellulose, cellulose acetate, polypropylene, nylon, polytetrafluoroethylene (PTFE), hydrophilic PTFE, polyvinylidene fluoride, polyether sulfone (PES), and a glass fiber, with PTFE or polyvinylidene fluoride being preferable.

(Method for Preparing Optically Anisotropic Body)
(Optically Anisotropic Body)

An optically anisotropic body fabricated by using the polymerizable liquid crystal composition of the present invention is obtained by laminating a base material, if necessary, an alignment film, and a polymer of the polymerizable liquid crystal composition in an order.

The base material used for the optically anisotropic body of the present invention is a base material commonly used for a liquid crystal device, a display, an optical part, or an optical film. The base material is not particularly limited as long as the base material has thermal resistance against heating at the time of drying the applied polymerizable liquid crystal composition of the present invention. Examples of this base material include a glass base material, a metal base material, a ceramic base material, and an organic material such as a plastic base material. In particular, in the case where the base material is an organic material, examples thereof include a cellulose derivative, polyolefin, polyester, polyolefin, polycarbonate, polyacrylate, polyallylate, polyether sulfone, polyimide, polyphenylene sulfide, polyphenylene ether, nylon, and polystyrene. Among these, a plastic base material such as polyester, polystyrene, polyolefin, a cellulose derivative, polyallylate, and polycarbonate is preferable.

The base material may be surface treated in order to improve coating properties and adhesive properties of the polymerizable liquid crystal composition of the present invention. Examples of the surface treatment include an ozone treatment, a plasma treatment, a corona treatment, and a silane coupling treatment. Also, in order to adjust optical transmittivity or reflexibility, the base material may be a pickup lens, a rod lens, an optical disk, a phase difference film, a light diffusion film, or a color filter, in order to provide an organic thin film, an inorganic oxide thin film, or a metal thin film on the surface of the base material by a method such as deposition, or to provide optical added values. Among these, a pickup lens, a phase difference film, a light diffusion film, and a color filter are preferable, which further increases the added value.

In addition, the base material maybe commonly subjected to an aligning treatment or an alignment film may be provided such that the polymerizable liquid crystal composition is aligned when the polymerizable liquid crystal composition of the present invention is applied and dried. Examples of the aligning treatment include a stretching treatment, a rubbing treatment, an irradiation treatment with polarized a ultraviolet and visible ray, and an ion beam treatment. In the case where the alignment, film is used, the well-known alignment film is used. Examples of the well-known alignment film include polyimide, polysiloxane, polyamide, polyvinyl alcohol, polycarbonate, polystyrene, polyphenylene ether, polyallylate, polyethylene terephthalate, polyether sulfone, an epoxy resin, an epoxyacrylate resin, an acryl resin, and compounds such as a coumarin compound, a chalcone compound, a cinnamate compound, a fulgide compound, an anthraquinone compound, an azo compound, and an aryl ethene compound. As a compound for performing the aligning treatment by rubbing, a compound which promotes crystallinity of a material by the addition of the compound in the aligning treatment or the heating step after the aligning treatment is preferable. Among compounds for performing the aligning treatment other than rubbing, an optical aligning material is preferably used.

(Coating)

Examples of a coating method for obtaining the optically anisotropic body of the present invention include the well-known methods such as an applicator method, a bar coating method, a spin coating method, a roll coating method, a direct gravure coating method, a reverse gravure coating method, a flexo coating method, an ink jet method, a die coating method, a cap coating method, a dip coating method, and a slit coating method. After the polymerizable liquid crystal composition is applied, the composition is dried.

(Polymerization Step)

A polymerization operation of the polymerizable liquid crystal composition of the present invention is generally performed by irradiating the composition with an ultraviolet ray or heating the composition, in a state where the liquid crystal compound in the polymerizable liquid crystal composition is horizontally aligned, vertically aligned, or aligned in a hybrid manner or aligned in a cholesteric manner (plane alignment) with respect to the base material. In the case where polymerization is performed by irradiation with light, specifically, the composition is preferably irradiated with an ultraviolet ray of 390 nm or less and most preferably with light having a wavelength of 250 to 370 nm. However, in the case where the polymerizable composition is decomposed by an ultraviolet ray of 390 nm or less, it is preferable to perform polymerization with an ultraviolet ray of 390 nm or more. The ray is preferably a diffused and unpolarized ray.

(Polymerization Method)

Examples of the method for polymerizing the polymerizable liquid crystal composition of the present invention include a method for irradiating the composition with active energy rays or thermal polymerization. However, a method for irradiating the composition with active energy rays is preferable from a viewpoint of not requiring heating and proceeding the reaction at room temperature. Among these, a method for irradiating the composition with light such as an ultraviolet ray is preferable from a viewpoint of a simple operation. The temperature at the time of irradiation is a temperature in which the polymerizable liquid crystal composition of the present invention can retain a liquid crystal phase, and a temperature of 30° C. or lower is preferable as much as possible in order to avoid inducement of thermal polymerization of the polymerizable liquid crystal composition. In addition, the liquid crystal composition normally exhibits a liquid crystal phase within from C (solid phase)-N (nematic) transition temperature (hereinafter, abbreviated as a C-N transition temperature) to an N-I transition temperature range, in the step of increasing a temperature. Meanwhile, in the step of decreasing a temperature, since the composition takes a thermodynamically non-equilibrium state, the composition may retain a liquid crystal state, without being aggregated even in the C-N transition temperature or lower. This state is referred to as a supercooled state. In the present invention, the liquid crystal composition in a supercooled state is included in a state where the liquid crystal phase is retained. Specifically, the composition is preferably irradiated with an ultraviolet ray of 390 nm or less and most preferably irradiated with light having a wavelength of 250 to 370 nm. However, in the case where the polymerization composition is decomposed by irradiation with an ultraviolet ray of 350 nm or less, it is preferable to perform polymerization with an ultraviolet ray of 390 nm or more. The ray is preferably a diffused and unpolarized ray. The irradiation intensity of the ultraviolet ray is preferably in a range of 0.05 kW/m$^2$ to 10 kW/m$^2$. In particular, in a range of 0.2 kW/m$^2$ to 2 kW/m$^2$ is preferable. In the case where the intensity of the ultraviolet ray is less than 0.05 kW/m$^2$, it takes a great amount of time to complete the polymerization. Meanwhile, in the case where the intensity exceeds 2 kW/m$^2$, there is possibility that a liquid crystal molecule in the polymerizable liquid crystal composition tends to be photodecomposed or generation of a great amount of polymerization heat increases the temperature during the polymerization, and a change in an order parameter of the polymerizable liquid crystal causes a disorder of retardation of the polymerized film.

After only a particular portion is polymerized by irradiation with an ultraviolet ray using a mask, if an aligned state of the non-polymerized portion is changed by applying an electrical field, a magnetic field, or a temperature, and after that, the non-polymerized portion is polymerized, it is possible to obtain an optically anisotropic body having a plurality of areas with a different aligning direction.

In addition, when only the particular portion is polymerized by irradiation with an ultraviolet ray using a mask, if an electrical field, a magnetic field, or a temperature is applied to the polymerizable liquid crystal composition in the non-polymerized state in advance so as to control an alignment and the composition is polymerized by irradiating the mask with light, while the non-polymerized state is retained, it is possible to obtain an optically anisotropic body having a plurality of areas with a different aligning direction.

The optically anisotropic body obtained by polymerizing the polymerizable liquid crystal composition of the present invention can be used as a single optically anisotropic body by separating the optically anisotropic body from a substrate, or as an optically anisotropic body itself without being separated from the substrate. In particular, since the optically anisotropic body is difficult to contaminate other members, it is useful to use the optically anisotropic body as a substrate to be laminated, or to use by attaching the optically anisotropic body to other substrates.

(Use)

The polymer obtained by polymerizing the polymerizable liquid crystal composition of the present invention in a state where the composition is horizontally aligned, vertically aligned, or aligned in a hybrid manner or aligned in a cholesteric manner can be used as the optically anisotropic body having alignment performance, for example, as an optical compensation film, a phase difference film, a wide viewing angle film, a luminance-enhancing film, a reflective film, and a polarizing film. Also, the polymer can be used as an adhesive having heat-dissipating properties, a sealant, a heat-dissipating sheet, and an ink for security printing.

EXAMPLES

Hereinafter, the present invention will be described using Synthesis Examples, Examples, and Comparative Examples, but originally, the present invention is not limited to these. Also, "parts" and "%" are based on mass unless otherwise mentioned.

As the raw material compound of the compound containing a mesogenic group, compounds represented by the following Formulas (A1) to (A11), Formulas (B1) to (B12), and Formula (C1) were used. As a result of measuring the content (% by mass) of the silicon compound of each raw material compound by an ICP emission analyzer (measurement condition: measured by dissolving 0.03 g of each raw material compound in 10 g of xylene), each content was as follows. Formula (A1): 1250 ppm, Formula (A2): 1100 ppm, Formula (A3): 1465 ppm, Formula (A4): 1360 ppm, Formula (A5): 1340, Formula (A6): 1440, Formula (A7): 1330 ppm, Formula (A8): 1155 ppm, Formula (A9): 1570 ppm, Formula (A10): 1470 ppm, and Formula (A11): 1400 ppm. Formula (B1): 1500 ppm, Formula (B2): 1400 ppm, Formula (B3): 1340 ppm, Formula (B4): 1220 ppm, Formula (B5): 1160 ppm, Formula (B6): 1450 ppm, Formula (B7): 1560 ppm, Formula (B8): 1560 ppm, Formula (B9): 1350 ppm, Formula (B10): 1340 ppm, Formula (B11): 1260 ppm, (B12): 1430 ppm, Formula (B13): 1230 ppm, (B14): 1400 ppm, and Formula (B15): 1222 ppm.

[Chem. 57]

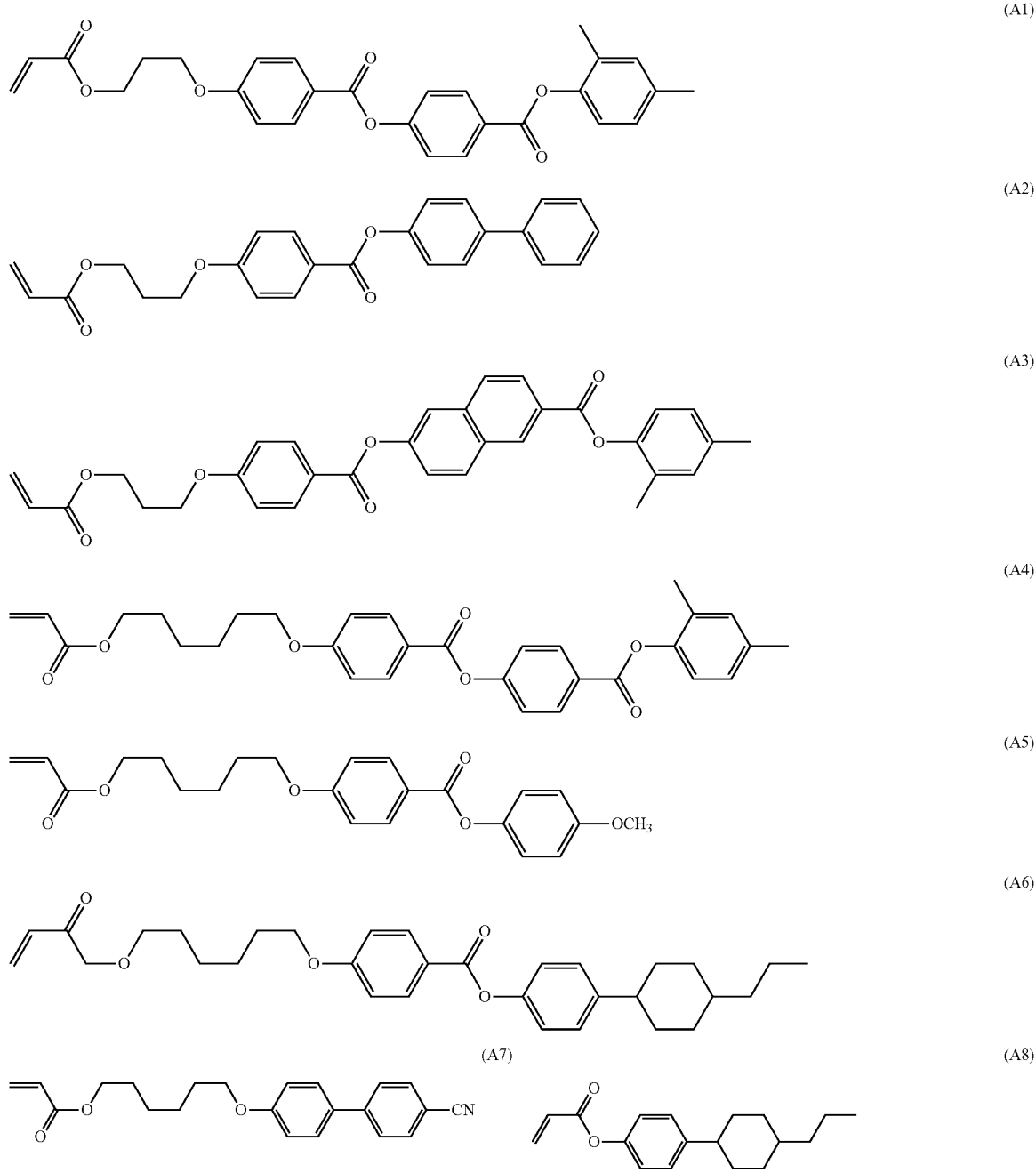

-continued
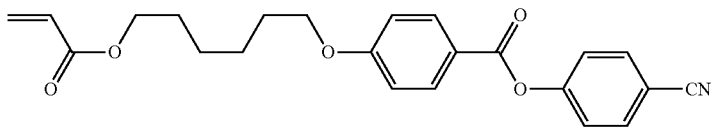
(A9)
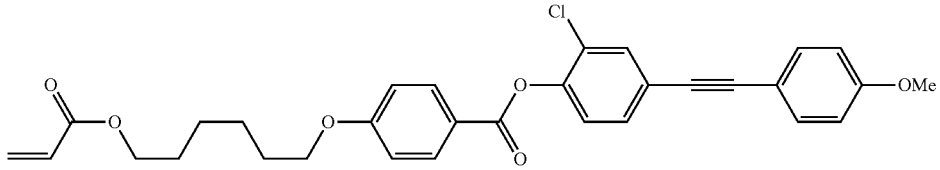
(A10)
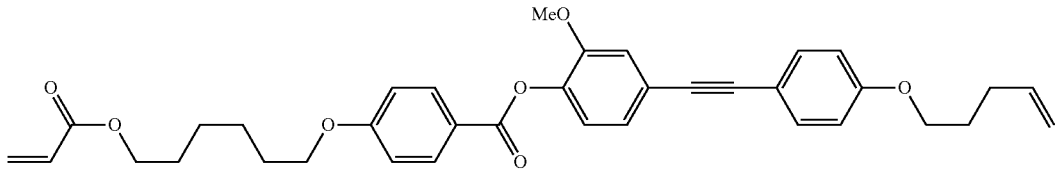
(A11)
[Chem. 58]
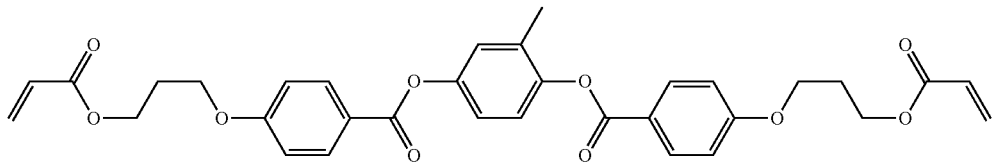
(B1)
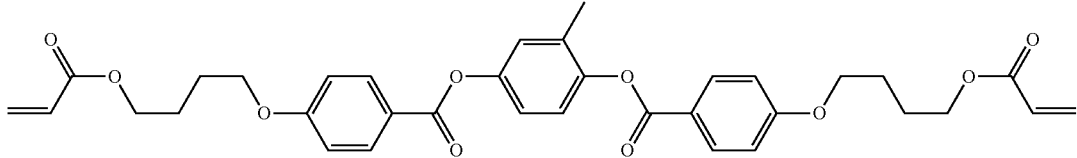
(B2)
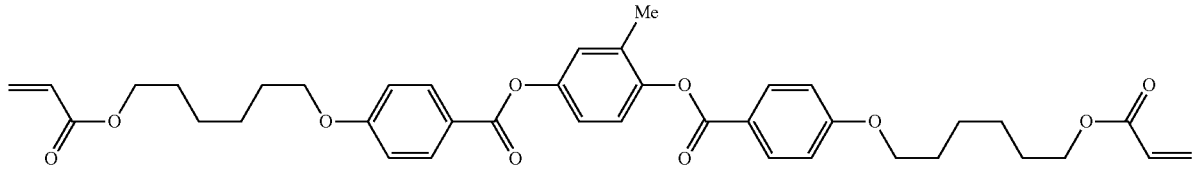
(B3)
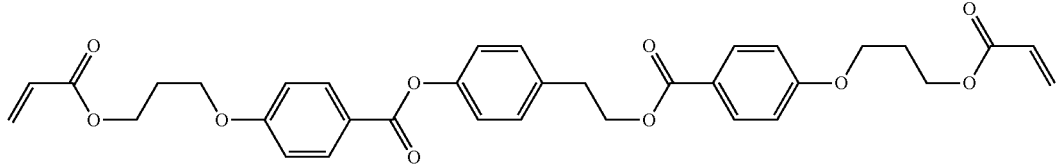
(B4)
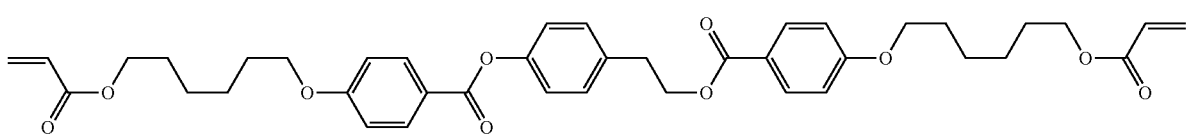
(B5)
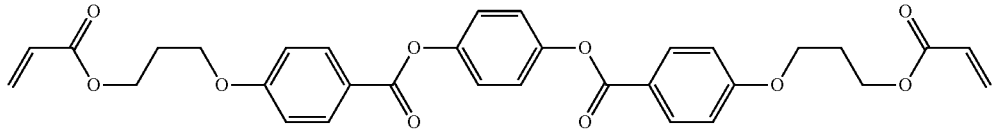
(B6)

(B7)
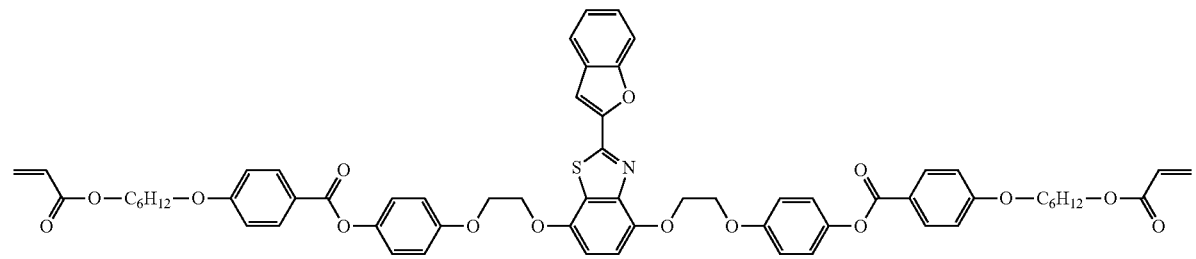
(B8)
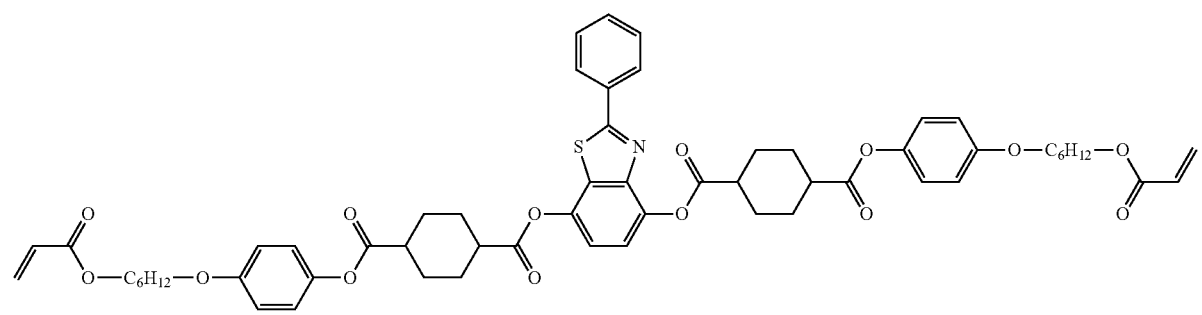
(B9)
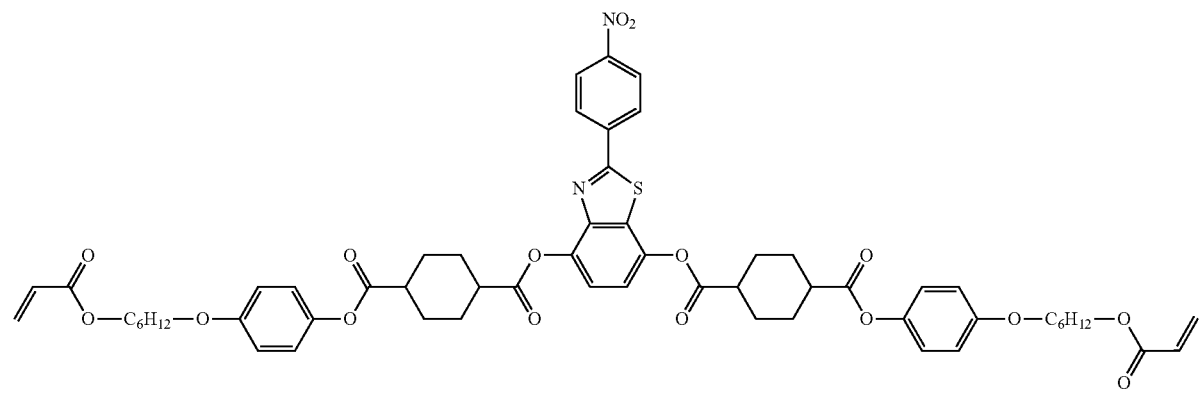
(B10)
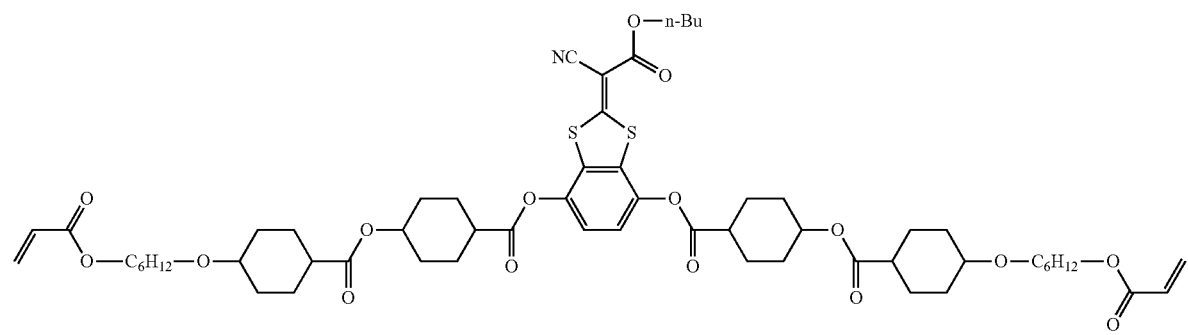

(B11)
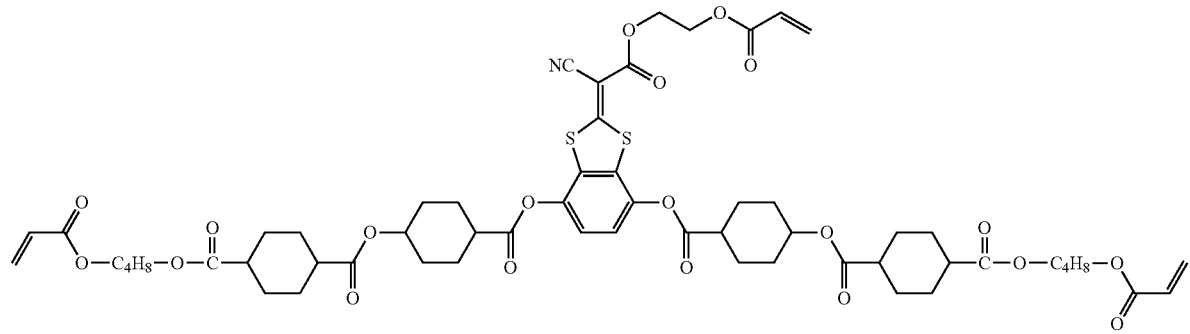
[Chem. 60]
(B12)
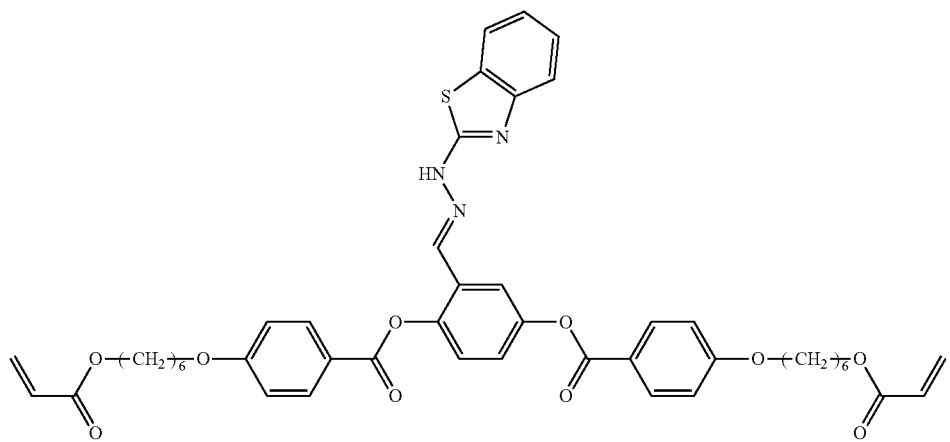
(B13)
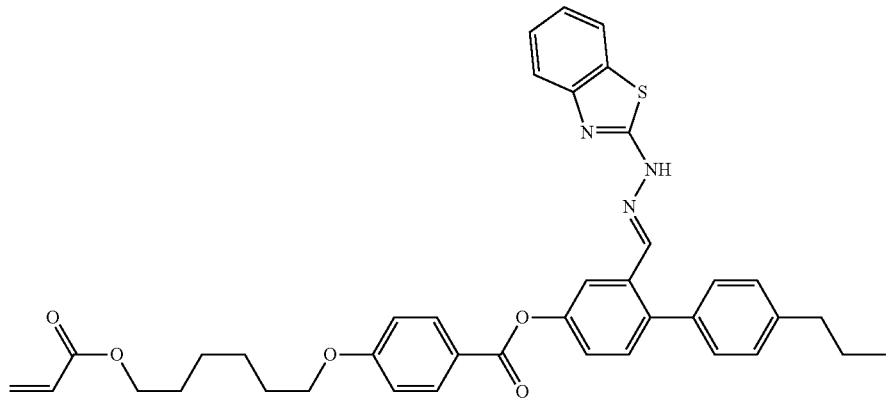
(B14)
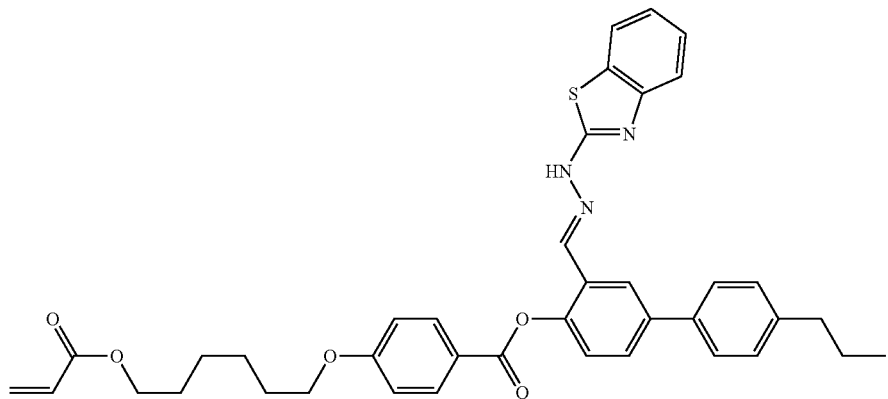

-continued

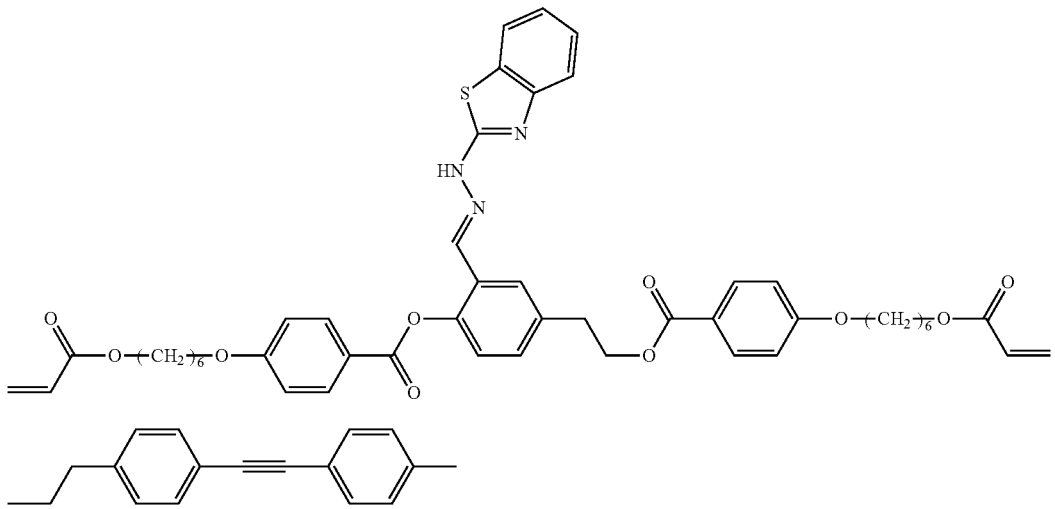

Irgacure 907 (D1)
Lucirin TPO (D2)
Irgacure 819 (D3)
TAZ-A (D4)
p-methoxyphenol (E1)
Polypropylene (weight average molecular weight (MW): 1275) (F1)
Liquid paraffin (F2)
Megaface F-554 (F3)
BYK 361N (F4)
Megaface FC-171 (F5)

Propylene glycol monomethyl ether acetate (H1)
Cyclopentanone (H2)
Toluene (H3)

(Preparation of Polymerizable Liquid Crystal Composition (1))

50 parts of the compound represented by Formula (A1), 10 parts of the compound represented by Formula (A2), 2.0 parts of the compound represented by Formula (A3), 10 parts of the compound represented by Formula (B1), and 10 parts of the compound represented by Formula (B2), which are raw material compounds (A1 to A11, B1 to B15, and

[Chem. 61]

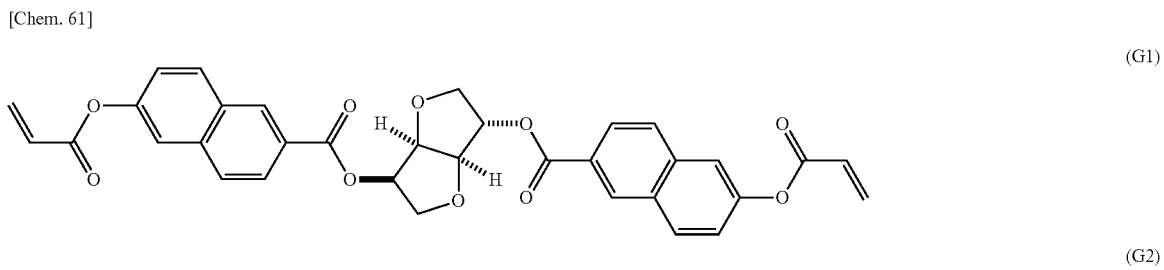

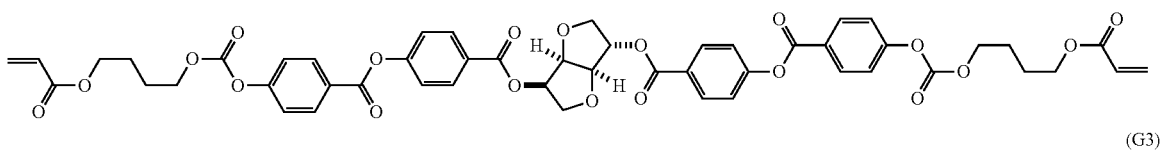

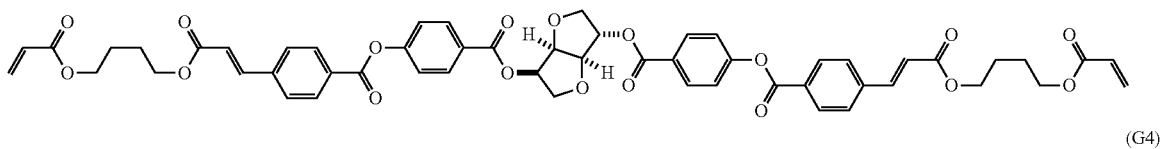

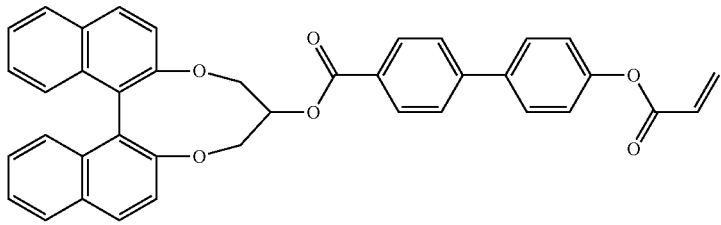

C1), were stirred with 400 parts of propylene glycol monomethyl ether acetate (PGMEA) (H1), which is an organic solvent, 0.1 parts of the compound represented by Formula (E1), 0.1 parts of the compound represented by Formula (F1), and 3 parts of the compound represented by Formula (D1), using a stirrer having a stirring propeller, under conditions of a stirring speed of 500 rpm and a solution temperature of 60° C., for 1 hour. After the resultant was filtrated by using 0.1 μm (PTFE, film thickness: 60 μm) membrane filter and adjusting filtration pressure to 0.20 MPa, the resultant was filtrated by using 0.1 μm membrane filter and adjusting filtration pressure to 0.20 MPa again to obtain a polymerizable liquid crystal composition (1).

(Preparation of Polymerizable Liquid Crystal Compositions (2) to (34) and Polymerizable Liquid Crystal Compositions (35) to (68) for Comparison)

In the same manner as the preparation of the polymerizable liquid crystal composition (1) of the present invention, the compounds represented by Formulas (A1 to A11, B1 to B15, and C1) shown in Table 1, Table 3, Table 5, Table 7, or Table 9, and Formulas (D1 to D4, E1, F1 to F5, and G1 to G4) shown in Table 2, Table 4, Table 6, Table 8, or Table 10 were stirred with an organic solvent selected from PGMEA (H1), cyclopentanone (H2), and toluene (H3) (according to the ratio shown in Table 1, Table 3, Table 5, Table 7, or Table 9) for 1 hour, by using a stirrer having a stirring propeller and setting the same stirring speed and the solution temperature as those of the case of obtaining the polymerizable liquid crystal composition (1). Then, the resultant was filtrated by a membrane filter (PTFE, pore diameter: 0.1 to 1 μm, film thickness: 60 to 100 μm) having a pore diameter shown in Table 1, Table 3, Table 5, Table 7, or Table 9 according to each filtration pressure and the number of filtration to obtain polymerizable liquid crystal compositions (2) to (34) and polymerizable liquid crystal compositions (35) to (68) for comparison, respectively.

The numerical values shown in the portions of "pore diameter 1", "pore diameter 2", and "pore diameter 3" in Table 1, Table 3, Table 5, Table 7, or Table 9 represent a pore diameter (μm) of the used membrane filter, in the case where the filtration step was performed one time, a pore diameter (μm) of the used membrane filter is shown in the portion of "pore diameter 1", the portions of "pore diameter 2" and "pore diameter 3" show [-], and in the case where the filtration step was performed two times, a pore diameter (μm) of the used membrane filters is respectively shown in the portions of "pore diameter 1" and "pore diameter 2". In the same manner, in the case where the filtration step was performed for three times, a pore diameter (μm) of the used membrane filters is respectively shown in the portions of "pore diameter 1", "pore diameter 2", and "pore diameter 3". Also, the description of "filtration pressure (MPa)" in Table 1, Table 3, Table 5, Table 7, or Table 9 represents pressure at the time of filtration, and in the case where the filtration step is performed a plurality of times, the filtration was performed under the same pressure in both steps. Further, with regard to "whether or not to allow a liquid to pass" in Table 1, Table 3, Table 5, Table 7, or Table 9, the case where a step of allowing an organic solvent used at the time of preparing the polymerizable liquid crystal composition to pass through a filter in advance before performing the filtration has been performed is regarded as "Yes", and the case where a step of allowing the organic solvent to pass through a filter has not been performed is regarded as "No". In addition, in all of the cases where the step of allowing the organic solvent to pass "has been performed" and the filtration step has been performed a plurality of times, the operation of allowing the organic solvent to pass was performed before the filtration step.

TABLE 1

| | Composition Compound | | | | | | | | | | | | | |
|---|---|---|---|---|---|---|---|---|---|---|---|---|---|---|
| | (1) | (2) | (3) | (4) | (5) | (6) | (7) | (8) | (9) | (10) | (11) | (12) | (13) | (14) |
| (A1) | 50 | 50 | 30 | 40 | 15 | | | | | 50 | | | | |
| (A2) | 10 | 10 | 10 | | | | | | | | | | | |
| (A3) | 20 | 20 | 20 | | | | | | | 20 | | | | |
| (A4) | | | 20 | 40 | 15 | | | | 15 | | | | 25 | |
| (A5) | | | | | | | 29 | 13 | 40 | | | | | |
| (A6) | | | | | | | | 30 | 10 | | | | | |
| (A7) | | | | | | | | | | | | | 14 | |
| (A8) | | | | | | | | | | | | | | |
| (A9) | | | | | | | 29 | 2 | | | | | | |
| (A10) | | | | | | | | | | | | | | |
| (A11) | | | | | | | | | | | | | | |
| (B1) | 10 | 10 | 10 | 10 | 35 | 10 | 32 | | 35 | 10 | | | 42 | |
| (B2) | 10 | | 10 | 10 | 35 | 40 | | 10 | 32 | | 10 | 40 | 33 | |
| (B3) | | 10 | | | | | 10 | 32 | | | | | | |
| (B4) | | | | | | 25 | | | | | | 25 | 43 | 50 |
| (B5) | | | | | | 25 | | | | | | 25 | 43 | 50 |
| (B6) | | | | | | | | | | | 10 | | | |
| (B7) | | | | | | | | | | | | | | |
| (B8) | | | | | | | | | | | | | | |
| (B9) | | | | | | | | | | | | | | |
| (B10) | | | | | | | | | | | | | | |
| (B11) | | | | | | | | | | | | | | |
| (B12) | | | | | | | | | | | | | | |
| (B13) | | | | | | | | | | | | | | |
| (B14) | | | | | | | | | | | | | | |
| (B15) | | | | | | | | | | | | | | |
| (C1) | | | | | | | | | | 10 | | | | |
| (H1) | 400 | 400 | 400 | 400 | 400 | 400 | 400 | 400 | 400 | 400 | 400 | 450 | 450 | 400 |
| (H2) | | | | | | | | | | | | | | |
| (H3) | | | | | | | | | | | | | | |
| Pore diameter 1 | 0.1 | 0.22 | 0.45 | 0.1 | 0.1 | 0.1 | 0.1 | 0.1 | 0.22 | 0.1 | 0.1 | 0.45 | 0.1 | 0.22 |

TABLE 1-continued

| | Composition Compound | | | | | | | | | | | | | |
|---|---|---|---|---|---|---|---|---|---|---|---|---|---|---|
| | (1) | (2) | (3) | (4) | (5) | (6) | (7) | (8) | (9) | (10) | (11) | (12) | (13) | (14) |
| Pore diameter 2 | 0.1 | — | — | — | 0.1 | — | 0.1 | — | — | 0.1 | 0.1 | — | — | — |
| Pore diameter 3 | — | — | — | — | — | — | — | — | — | — | — | — | — | — |
| Filtration pressure | 0.20 | 0.20 | 0.20 | 0.20 | 0.10 | 0.20 | 0.10 | 0.20 | 0.20 | 0.20 | 0.10 | 0.20 | 0.20 | 0.20 |
| whether or not to allow a liquid to pass | No | No | No | No | Yes | No | No | No | No | No | Yes | No | No | No |

TABLE 2

| | Composition Compound | | | | | | | | | | | | | |
|---|---|---|---|---|---|---|---|---|---|---|---|---|---|---|
| | (1) | (2) | (3) | (4) | (5) | (6) | (7) | (8) | (9) | (10) | (11) | (12) | (13) | (14) |
| (D1) | 3 | 3 | 3 | 3 | 3 | 3 | 3 | 0.9 | 3 | 3 | 3 | 3 | 3 | 3 |
| (D2) | | | | | | | | | | | | | | 0.1 |
| (D3) | | | | | | | | | | | | | | |
| (D4) | | | | | | | | | | | | | | |
| (E1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F1) | 0.1 | 0.1 | 0.1 | 0.1 | 0.1 | 0.1 | 0.1 | 0.1 | 0.1 | 0.1 | 0.1 | | | |
| (F2) | | | | | | | | | | | | | 0.2 | |
| (F3) | | | | | | | | | | | | 0.1 | | 0.1 |
| (F4) | | | | | | | | | | | | | | |
| (F5) | | | | | | | | | | | | | | |
| (G1) | | | | | | | | | | | | | 8.5 | |
| (G2) | | | | | | | | | | | | | | |
| (G3) | | | | | | | | | | | | | | |
| (G4) | | | | | | | | | | | | | | |

TABLE 3

| | Composition Compound | | | | | | | | | | | | | |
|---|---|---|---|---|---|---|---|---|---|---|---|---|---|---|
| | (15) | (16) | (17) | (18) | (19) | (20) | (21) | (22) | (23) | (24) | (25) | (26) | (27) | (28) |
| (A1) | | | | | | | | | | | | | | |
| (A2) | | | | | | | | | | | | | | |
| (A3) | | | | | | | | | | | | | | |
| (A4) | | | | | | | | | | | | | | |
| (A5) | | 36 | | | | | | | | | | | | 24 |
| (A6) | | | | | | | | | | | | | 40 | |
| (A7) | | | | | | | | | | | | | | 9 |
| (A8) | 30 | | | | | | | | | | | | | |
| (A9) | | 21 | | | | | | | | | | | 20 | |
| (A10) | | | | | | | | | | | | | | |
| (A11) | | | | | | | | | | | | | | |
| (B1) | | 21 | 5 | | | 10 | | | | | | | 40 | 55 |
| (B2) | | | 5 | 5 | | 10 | | | | | | | | |
| (B3) | | 22 | | | | | | | | | | | | 12 |
| (B4) | 20 | | | | | | | | | | | | | |
| (B5) | 50 | | | | | | | | | | | | | |
| (B6) | | | | | | | | | | | | | | |
| (B7) | | | | 50 | | | | 50 | | | | | | |
| (B8) | | | 45 | 95 | | | 50 | 100 | | | | | | |
| (B9) | | | | | 95 | | | 100 | 100 | | | | | |
| (B10) | | | | | 90 | | | | 100 | 100 | | | | |
| (B11) | | | | | | 90 | | | | 100 | 100 | | | |
| (B12) | | | | | | | | | | | | | | |
| (B13) | | | | | | | | | | | | | | |
| (B14) | | | | | | | | | | | | | | |
| (B15) | | | | | | | | | | | | | | |
| (C1) | 400 | | | | | | | | | | | | 550 | 400 |
| (H1) | | | 500 | 500 | 500 | 430 | 350 | 500 | 500 | 500 | 430 | 350 | | |
| (H2) | | 400 | | | | | | | | | | | | |

TABLE 3-continued

| | Composition Compound | | | | | | | | | | | | | |
|---|---|---|---|---|---|---|---|---|---|---|---|---|---|---|
| | (15) | (16) | (17) | (18) | (19) | (20) | (21) | (22) | (23) | (24) | (25) | (26) | (27) | (28) |
| (H3) | 0.1 | 0.1 | 0.22 | 0.1 | 0.1 | 0.1 | 0.22 | 0.22 | 0.1 | 0.1 | 0.1 | 0.1 | 0.1 | 0.1 |
| Pore diameter 1 | 0.1 | 0.1 | — | — | — | — | — | — | — | 0.1 | — | — | 0.1 | — |
| Pore diameter 2 | — | — | — | — | — | — | — | — | — | — | — | — | — | — |
| Pore diameter 3 | 0.20 | 0.20 | 0.20 | 0.20 | 0.20 | 0.20 | 0.20 | 0.20 | 0.20 | 0.20 | 0.20 | 0.20 | 0.20 | 0.20 |
| Filtration pressure whether or to allow a liquid to pass | No | No | No | No | No | No | No | No | No | No | No | No | No | No |

TABLE 5

| | Composition Compound | | | | | | | | | | | | | |
|---|---|---|---|---|---|---|---|---|---|---|---|---|---|---|
| | (15) | (16) | (17) | (18) | (19) | (20) | (21) | (22) | (23) | (24) | (25) | (26) | (27) | (28) |
| (D1) | 3 | 3 | | | | | | | | | | | 3 | 4 |
| (D2) | 0.1 | | | | | | | | | | | | | |
| (D3) | | | 0.45 | | | 3 | 3 | 0.45 | | | 3 | 3 | | |
| (D4) | | | | 0.75 | 0.75 | | | | 0.75 | 0.75 | | | | |
| (E1) | 0.1 | 0.1 | 0.1 | 0.1 | 0.1 | 0.1 | 0.1 | 0.1 | 0.1 | 0.1 | 0.1 | 0.1 | 0.1 | |
| (F1) | | | | | | | | | | | | | | |
| (F2) | | | | | | | | | | | | | | |
| (F3) | 0.1 | | | | | 0.1 | 0.1 | | | | 0.1 | 0.1 | | |
| (F4) | | | 0.05 | 0.05 | 0.05 | | | 0.05 | 0.05 | 0.05 | | | | |
| (F5) | | | | | | | | | | | | | | 0.5 |
| (G1) | | | | | | | | | | | | | | |
| (G2) | | | 3 | 3 | | | | 3 | 3 | | | | | 7.5 |
| (G3) | | | | | | | | | | | | | | |
| (G4) | | | | | | | | | | | | | | |

TABLE 5

| | Composition Compound | | | | | | | | | | | | | |
|---|---|---|---|---|---|---|---|---|---|---|---|---|---|---|
| | (29) | (30) | (31) | (32) | (33) | (34) | (35) | (36) | (37) | (38) | (39) | (40) | (41) | (42) |
| (A1) | | | | | | | 50 | 50 | 30 | 50 | | | | |
| (A2) | | | | | | | 10 | 10 | 10 | | | | | |
| (A3) | 15 | | | | | | 20 | 20 | 20 | 20 | | | | |
| (A4) | 25 | | | | | | | | 20 | | | | | |
| (A5) | | | | | | | | | | | | | | |
| (A6) | | 12 | | | | | | | | | | | | 40 |
| (A7) | | | | | | | | | | | | | | |
| (A8) | | | | | | | | | | | | | | |
| (A9) | | | | | | | | | | | | | | 20 |
| (A10) | | 75 | | | | | | | | | | | | |
| (A11) | 47 | | | | | | | | | | | | | |
| (B1) | 9 | 9 | | | | | 10 | 10 | 10 | 10 | 5 | | | 40 |
| (B2) | 4 | | | | | | 10 | | 10 | 10 | | 5 | | |
| (B3) | | 4 | | | | | | 10 | | | | | | |
| (B4) | | | | | | | | | | | | | | |
| (B5) | | | | | | | | | | | | | | |
| (B6) | | | | | | | | | | | | | | |
| (E7) | | | | | | | | | | | 50 | | | |
| (B8) | | | | | | | | | | | 45 | | | |
| (B9) | | | | | | | | | | | | 95 | | |
| (B10) | | | | | | | | | | | | | 100 | |
| (B11) | | | | | | | | | | | | | | |
| (B12) | | | | 50 | | 50 | | | | | | | | |
| (B13) | | | 50 | 50 | 30 | | | | | | | | | |
| (E14) | | | | 50 | 50 | 50 | | | | | | | | |
| (B15) | | | | | 20 | | | | | | | | | |

TABLE 5-continued

| | Composition Compound | | | | | | | | | | | | | |
|---|---|---|---|---|---|---|---|---|---|---|---|---|---|---|
| | (29) | (30) | (31) | (32) | (33) | (34) | (35) | (36) | (37) | (38) | (39) | (40) | (41) | (42) |
| (C1) | | | | | | | | | | 10 | | | | |
| (H1) | | | | | | | 400 | 400 | 400 | 400 | | | | 550 |
| (H2) | 500 | 500 | 500 | 500 | 500 | 500 | | | | | 500 | 500 | 430 | |
| (H3) | | | | | | | | | | | | | | |
| Pore diameter 1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pore diameter 2 | — | 0.1 | — | 0.1 | — | 0.1 | — | — | — | — | — | — | — | — |
| Pore diameter 3 | — | — | — | — | — | — | — | — | — | — | — | — | — | — |
| Filtration pressure | 0.20 | 0.10 | 0.20 | 0.20 | 0.20 | 0.20 | 0.25 | 0.25 | 0.25 | 0.25 | 0.25 | 0.25 | 0.25 | 0.25 |
| whether or not to allow a liquid to pass | No | Yes | No | No | No | No | No | No | No | No | No | No | No | No |

TABLE 6

| | Composition Compound | | | | | | | | | | | | | |
|---|---|---|---|---|---|---|---|---|---|---|---|---|---|---|
| | 29 | 30 | 31 | 32 | 33 | 34 | 35 | 36 | 37 | 38 | 39 | 40 | 41 | 42 |
| (D1) | | | 3 | 3 | 3 | 3 | 3 | 3 | 3 | 3 | | | | 3 |
| (D2) | | | | | | | | | | | | | | |
| (D3) | | | | | | | | | | | 0.45 | | 3 | |
| (D4) | | | | | | | | | | | | 0.75 | | |
| (E1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F1) | 0.1 | 0.1 | | | | | 0.1 | 0.1 | 0.1 | 0.1 | | | | |
| (F2) | | | | | | | | | | | | | | |
| (E3) | | | 0.1 | 0.1 | 0.1 | 0.1 | | | | | | | 0.1 | |
| (F4) | | | | | | | | | | | 0.05 | 0.05 | | |
| (F5) | | | | | | | | | | | | | | |
| (G1) | | | | | | | | | | | | | | |
| (G2) | | | | | | | | | | | | 3 | | |
| (G3) | 5 | | | | | | | | | | | | | |
| (G4) | | 5 | | | | | | | | | | | | |

TABLE 7

| | Composition Compound | | | | | | | | | | | | | |
|---|---|---|---|---|---|---|---|---|---|---|---|---|---|---|
| | (43) | (44) | (45) | (46) | (47) | (48) | (49) | (50) | (51) | (52) | (53) | (54) | (55) | (56) |
| (A1) | | | | | | 50 | 50 | 30 | 50 | | | | | |
| (A2) | | | | | | 10 | 10 | 10 | | | | | | |
| (A3) | | 15 | | | | 20 | 20 | 20 | | | | | | |
| (A4) | | 25 | | | | | | 20 | | | | | | |
| (A5) | 24 | | | | | | | | | | | | | 24 |
| (A6) | | | 12 | | | | | | | | | | 40 | |
| (A7) | 9 | | | | | | | | | | | | | 9 |
| (A8) | | | | | | | | | | | | | | |
| (A9) | | | | | | | | | | | | | 20 | |
| (A10) | | | 75 | | | | | | | | | | | |
| (A11) | | 47 | | | | | | | | | | | | |
| (B1) | 55 | 9 | 9 | | | 10 | 10 | 10 | 10 | 5 | | | 40 | 55 |
| (B2) | | 4 | | | | 10 | | 10 | 10 | | 5 | | | |
| (B3) | 12 | | 4 | | | | 10 | | | | | | | 12 |
| (B4) | | | | | | | | | | | | | | |
| (B5) | | | | | | | | | | | | | | |
| (B6) | | | | | | | | | | | | | | |
| (B7) | | | | | | | | | | 50 | | | | |
| (B8) | | | | | | | | | | 45 | | | | |
| (B9) | | | | | | | | | | | 95 | | | |
| (B10) | | | | | | | | | | | | 100 | | |
| (B11) | | | | | | | | | | | | | | |
| (B12) | | | | 50 | | | | | | | | | | |

TABLE 7-continued

| | Composition Compound | | | | | | | | | | | | | |
|---|---|---|---|---|---|---|---|---|---|---|---|---|---|---|
| | (43) | (44) | (45) | (46) | (47) | (48) | (49) | (50) | (51) | (52) | (53) | (54) | (55) | (56) |
| (B13) | | | | 50 | 50 | | | | | | | | | |
| (B14) | | | | | 50 | | | | | | | | | |
| (B15) | | | | | | | | | | | | | | |
| (C1) | | | | | | | | | | 10 | | | | |
| (H1) | | | | | | 400 | 400 | 400 | 400 | | | | 550 | 400 |
| (H2) | 500 | 500 | 500 | 500 | 500 | | | | | 500 | 500 | 430 | | |
| (H3) | | | | | | | | | | | | | | |
| Pore diameter 1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pore diameter 2 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pore diameter 3 | 0.1 | 0.1 | 0.1 | 0.1 | 0.1 | 0.1 | 0.1 | 0.1 | 0.1 | 0.1 | 0.1 | 0.1 | 0.1 | 0.1 |
| Filtration pressure | 0.05 | 0.05 | 0.05 | 0.05 | 0.05 | 0.05 | 0.05 | 0.05 | 0.05 | 0.05 | 0.05 | 0.05 | 0.05 | 0.05 |
| whether or not to allow a liquid to pass | Yes | Yes | Yes | Yes | Yes | Yes | Yes | Yes | Yes | Yes | Yes | Yes | Yes | Yes |

TABLE 8

| | Composition Compound | | | | | | | | | | | | | |
|---|---|---|---|---|---|---|---|---|---|---|---|---|---|---|
| | (43) | (44) | (45) | (46) | (47) | (48) | (49) | (50) | (51) | (52) | (53) | (54) | (55) | (56) |
| (D1) | 4 | | | 3 | 3 | 3 | 3 | 3 | 3 | | | | 3 | 4 |
| (D2) | | | | | | | | | | | | | | |
| (D3) | | | | | | | | | | 0.45 | | 3 | | |
| (D4) | | | | | | | | | | | 0.75 | | | |
| (E1) | | 0.1 | 0.1 | 0.1 | 0.1 | 0.1 | 0.1 | 0.1 | 0.1 | 0.1 | 0.1 | 0.1 | 0.1 | |
| (F1) | | 0.1 | 0.1 | | | 0.1 | 0.1 | 0.1 | 0.1 | | | | | |
| (F2) | | | | | | | | | | | | | | |
| (F3) | | | | 0.1 | 0.1 | | | | | | | 0.1 | | |
| (F4) | | | | | | | | | | 0.05 | 0.05 | | | |
| (F5) | 0.5 | | | | | | | | | | | | | 0.5 |
| (G1) | | | | | | | | | | | | | | |
| (G2) | 7.5 | | | | | | | | | | 3 | | | 7.5 |
| (G3) | | 5 | | | | | | | | | | | | |
| (G4) | | | 5 | | | | | | | | | | | |

TABLE 9

| Composition Compound | (57) | (58) | (59) | (60) |
|---|---|---|---|---|
| (A1) | | | | |
| (A2) | | | | |
| (A3) | 15 | | | |
| (A4) | 25 | | | |
| (A5) | | | | |
| (A6) | | 12 | | |
| (A7) | | | | |
| (A8) | | | | |
| (A9) | | | | |
| (A10) | | 75 | | |
| (A11) | 47 | | | |
| (B1) | 9 | 9 | | |
| (B2) | 4 | | | |
| (B3) | | 4 | | |
| (B4) | | | | |
| (B5) | | | | |
| (B6) | | | | |
| (B7) | | | | |
| (B8) | | | | |
| (B9) | | | | |
| (B10) | | | | |
| (B11) | | | | |
| (B12) | | | | 50 |
| (B13) | | | 50 | 50 |
| (B14) | | | | 50 |
| (B15) | | | | |
| (C1) | | | | |
| (H1) | | | | |
| (H2) | 500 | 500 | 500 | 500 |
| (H3) | | | | |
| Pore diameter 1 | 0.1 | 0.1 | 0.1 | 0.1 |
| Pore diameter 2 | 0.1 | 0.1 | 0.1 | 0.1 |
| Pore diameter 3 | 0.1 | 0.1 | 0.1 | 0.1 |
| Filtration pressure | 0.05 | 0.05 | 0.05 | 0.05 |
| whether or not to allow a liquid to pass | Yes | Yes | Yes | Yes |

TABLE 10

| Composition Compound | (57) | (58) | (59) | (60) |
|---|---|---|---|---|
| (D1) | | | 3 | 3 |
| (D2) | | | | |
| (D3) | | | | |
| (D4) | | | | |
| (E1) | 0.1 | 0.1 | 0.1 | 0.1 |
| (F1) | 0.1 | 0.1 | | |
| (F2) | | | | |
| (F3) | | | 0.1 | 0.1 |
| (F4) | | | | |
| (F5) | | | | |
| (G1) | | | | |
| (G2) | | | | |
| (G3) | 5 | | | |
| (G4) | | 5 | | |

Examples 1 to 34 and Comparative Examples 1 to 26

(Content of a Silicon Compound)

The content of the silicon compound included in each polymerizable liquid crystal composition obtained by the aforementioned method was measured, and in the case where the composition is made into a mixture only including two or more compounds containing a mesogenic group (that is, a mixture only including the compounds represented by Formulas (A1) to (A11), Formulas (B1) to (B15), and Formula (C1)), the content (% by mass) of the silicon compound included in the mixture after filtration was calculated.

(Scratch Resistance)

After a polyimide solution for an alignment film was applied onto a glass substrate having a thickness of 0.7 mm at room temperature using a spin coating method, and dried at a temperature of 100° C. for 10 minutes, a coating film was obtained by baking the applied solution at a temperature of 200° C. for 60 minutes and the obtained coating film was subjected to a rubbing treatment to obtain a base material. After the prepared polymerizable liquid crystal composition was applied onto the base material at room temperature by a spin coater, the base material was dried at a temperature of 80° C. for 2 minutes. After that, the base material was left at room temperature for 2 minutes. Then, the base material was irradiated with UV light using a conveyor type high pressure mercury lamp which was set such that the irradiation intensity is 500 mJ/cm². The pencil hardness of the coating film was measured based on JIS K5600-5-4.

(Adhesion)

After a polyimide solution for an alignment film was applied onto a glass substrate having a thickness of 0.7 mm at room temperature using a spin coating method, and dried at a temperature of 100° C. for 10 minutes, a coating film was obtained by baking the applied solution at a temperature of 200° C. for 60 minutes and the obtained coating film was subjected to a rubbing treatment to obtain a base material. After the prepared polymerizable liquid crystal composition was applied onto the base material at room temperature by a spin coater (film thickness: 2 μm), the base material was dried at a temperature of 80° C. for 2 minutes. After that, the base material was left at room temperature for 2 minutes. Then, the base material was irradiated with UV light using a conveyor type high pressure mercury lamp which was set such that the irradiation intensity is 500 mJ/cm². An UV coating agent (UNIDIC V-4025) was applied on the surface obtained by polymerizing the polymerizable liquid crystal composition. Cuts were made on the coating film in a grid shape using a cutter according to a crosscut method using a cutter based on JIS K5600-5-6, the cuts were made as a grid of 2 mm square, and adhesion of the multiple-layered coating film was measured.

Classification 0: Any of the grids are not peeled.

Classification 1: It is confirmed that the coating film is slightly peeled at a crossing point of the cuts (less than 5%).

Classification 2: The coating film is peeled at a crossing point along the line of the cuts (equal to or more than 5% and less than 15%).

Classification 3: A part or the entirety of the coating film is peeled along the line of the cuts (equal to or more than 15% and less than 35%).

Classification 4: A part or the entirety of the coating film is greatly peeled along the line of the cuts (equal to or more than 35% and less than 65%).

Classification 5: More than Classification 4

(Aligning Properties 1 and Aligning Properties 2)

After the prepared polymerizable liquid crystal composition was applied on a triacetyl cellulose (TAC) film at room temperature using a bar coater #4, the film was dried at a temperature of 80° C. for 2 minutes. After that, the film was left at room temperature for 15 minutes. Then, the film was irradiated with UV light using a conveyor type high pressure mercury lamp which was set such that the irradiation intensity is 500 mJ/cm² (Aligning properties 1).

After a polyimide solution for an alignment film was applied on a glass substrate having a thickness of 0.7 mm at room temperature using a spin coating method, and dried at a temperature of 100° C. for 10 minutes, a coating film was obtained by baking the applied solution at a temperature of 200° C. for 60 minutes and the obtained coating film was subjected to a rubbing treatment to obtain a base material. After the prepared polymerizable liquid crystal composition was applied onto the base material by a spin coater, the base material was dried at a temperature of 80° C. for 2 minutes. After that, the base material was left at room temperature for 2 minutes. Then, the base material was irradiated with UV light which was set such that the irradiation intensity is 500 mJ/cm² (Aligning properties 2).

In the test of aligning properties 2 of the polymerizable liquid crystal compositions (12) and (16), after a polyimide solution for an alignment film was applied on a glass substrate having a thickness of 0.7 mm at room temperature using a spin coating method, and dried at a temperature of 100° C. for 10 minutes, a coating film was obtained by baking the applied solution at a temperature of 200° C. for 60 minutes and the polymerizable liquid crystal composition (12) or (16) was applied onto the base material by a spin coater. Then, the base material was dried at a temperature of 80° C. for 2 minutes. After that, the base material was left at room temperature for 2 minutes. Then, the base material was irradiated with UV light which was set such that the irradiation intensity is 500 mJ/cm² (not having the rubbing treatment performed on the coating film).

A: A defect is not visually observed at all and a defect is not observed at all by a polarizing microscope.

B: A defect is partially and visually observed and the unaligned portion entirely exists even by the observation of the polarizing microscope.

The obtained results are shown in the following Tables.

TABLE 11

|  | Composition | Silicon compound | Scratch resistance | Adhesion | Aligning properties 1 | Aligning properties 2 |
|---|---|---|---|---|---|---|
| Example 1 | Composition (1) | 38 ppm | 5 B | 2 | A | A |
| Example 2 | Composition (2) | 400 ppm | 4 B | 1 | A | A |
| Example 3 | Composition (3) | 800 ppm | 4 B | 1 | A | A |
| Example 4 | Composition (4) | 189 ppm | 4 B | 1 | A | A |
| Example 5 | Composition (5) | 3 ppm | 5 B | 3 | A | A |
| Example 6 | Composition (6) | 171 ppm | 4 B | 1 | A | A |
| Example 7 | Composition (7) | 40 ppm | 5 B | 2 | A | A |
| Example 8 | Composition (8) | 192 ppm | 4 B | 1 | A | A |
| Example 9 | Composition (9) | 415 ppm | 4 B | 1 | A | A |
| Example 10 | Composition (10) | 34 ppm | 5 B | 2 | A | A |
| Example 11 | Composition (11) | 2 ppm | 5 B | 3 | A | A |
| Example 12 | Composition (12) | 789 ppm | 4 B | 2 | A | A |
| Example 13 | Composition (13) | 195 ppm | 4 B | 1 | A | A |
| Example 14 | Composition (14) | 375 ppm | 4 B | 1 | A | A |
| Example 15 | Composition (15) | 24 ppm | 5 B | 2 | A | A |
| Example 16 | Composition (16) | 38 ppm | 5 B | 2 | A | A |
| Example 17 | Composition (17) | 428 ppm | 4 B | 1 | A | A |
| Example 18 | Composition (18) | 168 ppm | 5 B | 1 | A | A |
| Example 19 | Composition (19) | 190 ppm | 4 B | 1 | A | A |
| Example 20 | Composition (20) | 192 ppm | 4 B | 1 | A | A |
| Example 21 | Composition (21) | 382 ppm | 4 B | 1 | A | A |
| Example 22 | Composition (22) | 430 ppm | 4 B | 1 | A | A |
| Example 23 | Composition (23) | 20 ppm | 5 B | 2 | A | A |
| Example 24 | Composition (24) | 190 ppm | 4 B | 1 | A | A |
| Example 25 | Composition (25) | 187 ppm | 4 B | 1 | A | A |
| Example 26 | Composition (26) | 189 ppm | 4 B | 1 | A | A |
| Example 27 | Composition (27) | 40 ppm | 5 B | 2 | A | A |
| Example 28 | Composition (28) | 193 ppm | 4 B | 1 | A | A |
| Example 29 | Composition (29) | 188 ppm | 4 B | 1 | A | A |
| Example 30 | Composition (30) | 3 ppm | 5 B | 3 | A | A |
| Example 31 | Composition (31) | 190 ppm | 4 B | 1 | A | A |
| Example 32 | Composition (32) | 42 ppm | 5 B | 2 | A | A |
| Example 33 | Composition (33) | 188 ppm | 4 B | 1 | A | A |
| Example 34 | Composition (34) | 46 ppm | 5 B | 2 | A | A |

TABLE 12

|  | Composition | Silicon compound | Scratch resistance | Adhesion | Aligning properties 1 | Aligning properties 2 |
|---|---|---|---|---|---|---|
| Comparative Example 1 | Composition (35) | 1118 ppm | 3 B | 1 | B | B |
| Comparative Example 2 | Composition (36) | 1116 ppm | 3 B | 1 | B | B |
| Comparative Example 3 | Composition (37) | 1204 ppm | 2 B | 1 | B | B |
| Comparative Example 4 | Composition (38) | 1120 ppm | 3 B | 1 | B | B |
| Comparative Example 5 | Composition (39) | 1345 ppm | 2 B | 1 | B | B |
| Comparative Example 6 | Composition (40) | 1210 ppm | 2 B | 1 | B | B |
| Comparative Example 7 | Composition (41) | 1114 ppm | 3 B | 1 | B | B |
| Comparative Example 8 | Composition (42) | 1360 ppm | 2 B | 1 | B | B |
| Comparative Example 9 | Composition (43) | 1333 ppm | 2 B | 1 | B | B |
| Comparative Example 10 | Composition (44) | 1315 ppm | 2 B | 1 | B | B |
| Comparative Example 11 | Composition (45) | 1340 ppm | 2 B | 1 | B | B |
| Comparative Example 12 | Composition (46) | 1100 ppm | 3 B | 1 | B | B |
| Comparative Example 13 | Composition (47) | 1124 ppm | 3 B | 1 | B | B |
| Comparative Example 14 | Composition (48) | 0.5 ppm | 6 B | 5 | A | A |
| Comparative Example 15 | Composition (49) | 0.5 ppm | 6 B | 5 | A | A |

TABLE 12-continued

| | Composition | Silicon compound | Scratch resistance | Adhesion | Aligning properties 1 | Aligning properties 2 |
|---|---|---|---|---|---|---|
| Comparative Example 16 | Composition (50) | 0.5 ppm | 6 B | 5 | A | A |
| Comparative Example 17 | Composition (51) | 0.5 ppm | 6 B | 5 | A | A |
| Comparative Example 18 | Composition (52) | 0.8 ppm | 6 B | 4 | A | A |
| Comparative Example 19 | Composition (53) | 0.5 ppm | 6 B | 5 | A | A |
| Comparative Example 20 | Composition (54) | 0.5 ppm | 6 B | 5 | A | A |
| Comparative Example 21 | Composition (55) | 0.7 ppm | 6 B | 4 | A | A |
| Comparative Example 22 | Composition (56) | 0.7 ppm | 6 B | 4 | A | A |
| Comparative Example 23 | Composition (57) | 0.7 ppm | 6 B | 4 | A | A |
| Comparative Example 24 | Composition (58) | 0.7 ppm | 6 B | 4 | A | A |
| Comparative Example 25 | Composition (59) | 0.5 ppm | 6 B | 5 | A | A |
| Comparative Example 26 | Composition (60) | 0.5 ppm | 6 B | 5 | A | A |

From the above results, it is understood that an optically anisotropic body having excellent scratch resistance, adhesion, and aligning properties is obtained from the polymerizable liquid crystal composition of the present invention, which uses a compound containing a mesogenic group with a silicon compound being present therein at a low concentration. In particular, in the case where the composition is made a mixture only including two or more compounds containing a mesogenic group and the content of the silicon compound included in the mixture is 50 ppm or less, an optically anisotropic body having excellent aligning properties and excellent balance between scratch resistance and adhesion can be obtained. However, in the case where the composition is made a mixture only including two or more compounds containing a mesogenic group, in the case where the content of the silicon compound included in the mixture is 1 ppm or less, an optically anisotropic body having deteriorated scratch resistance and adhesion is only obtained.

The invention claimed is:

1. A compound comprising a group selected from the group consisting of an acryloyl group and a methacryloyl group; and a mesogenic group,
wherein a content of a silicon compound in the compound is 1 ppm % by weight or more to 1,000 ppm % by weight or less, and
the compound is represented by general formula (1);

P-(Sp)$_m$-MG-R$^1$ (1)

wherein in the general formula (1) P represents a polymerizable functional group,
Sp represents an alkylene group having 0 to 18 carbon atoms, wherein the alkylene group may be substituted with one or more halogen atoms or CN, and one CH$_2$ group or two or more CH$_2$ groups not adjacent to each other, which are present in the alkylene group, each independently may be substituted with —O—, —S—, —NH—, —N(CH$_3$)—, —CO—, —COO—, —OCO—, —OCOO—, —SCO—, —COS—, or —C≡C— as long as oxygen atoms are not directly bonded to each other,
m represents 1, MG represents the mesogenic group represented by General Formula (1 -b);

-Z0-(A1-Z1)$_n$-A2-Z2-A3-Z3- (1-b);

in the general formula (1-b), A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl-group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diylgroup, a 1,4-naphthylene group, a benzo[1,2-b:4,5-b']dithiophene-2,6-diyl group, a benzo[1,2-b:4,5-b'] diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, and may have, as a substituent, one or more F's, Cl's, CF$_3$'s, OCF$_3$'s, CN groups, alkyl groups having 1 to 8 carbon atoms, alkoxy groups, alkanoyl groups, alkanoyloxy groups, alkenyl groups having 2 to 8 carbon atoms, alkenyloxy groups, alkenoyl groups, alkenoyloxy groups, or General Formula (1-c):

—(A)$_n$—(Sp)$_m$P (1-c)

wherein in the general formula (1-c), P represents a reactive functional group, A represents —O—, —COO—, —OCO—, —OCH$_2$—, —CH$_2$O—, —CH$_2$CH$_2$OCO—, —COOCH$_2$CH$_2$—, —OCOCH$_2$CH$_2$—, or a single bond, Sp represents a spacer group having 0 to 18 carbon atoms, n represents 0 or 1, and m represents 0 or 1, in the general formula (1-b), Z0, Z1, Z2, and Z3 each independently represent —COO—, —OCO—, —CH$_2$CH$_2$—, —OCH$_2$—, —CH$_2$O—, —CH═CH—, —C≡C—, —CH═CHCOO—, —CF═CF—, —CF$_2$O—, —OCOCH═CH—, —CH$_2$CH$_2$COO—, —CH$_2$CH$_2$OCO—, —COOCH$_2$CH$_2$—, —CONH—, —NHCO—, an alkyl group which may have a halogen atom having 2 to 10 carbon atoms, or a single bond, and n represents 0, or 1, and in the general formula (1) $R^1$ represents general formula (1-a);

in the general formula (1-a) P represents a reactive functional group, Sp represents a spacer group having 1 to 18 carbon atoms, and m represents 1, wherein the polymerizable functional group P of general formula (1), the reactive functional group P of general formula (1-c) and the reactive functional group P of general formula (1-a) are each independently selected from a group consisting of an acryloyl group and a methacryloyl group.

2. A mixture comprising at least two compounds according to claim 1.

3. A mixture comprising the compound according to claim 1.

4. A composition according to claim 3 comprising the mixture dissolved in an organic solvent.

5. A polymer obtained by polymerizing the composition according to claim 4.

6. An optically anisotropic body obtained by polymerizing the composition according to claim 4.

7. A phase difference film obtained by polymerizing the composition according to claim 4.

8. A polymer obtained by polymerizing the mixture according to claim 3.

9. An optically anisotropic body obtained by polymerizing the mixture according to claim 3.

10. A phase difference film obtained by polymerizing the mixture according to claim 3.

11. A polymerizable composition comprising the mixture according to claim 3 dissolved in an organic solvent.

* * * * *